United States Patent
Noguera Serra et al.

(10) Patent No.: US 10,824,584 B1
(45) Date of Patent: Nov. 3, 2020

(54) DEVICE WITH DATA PROCESSING ENGINE ARRAY THAT ENABLES PARTIAL RECONFIGURATION

(71) Applicant: Xilinx, Inc., San Jose, CA (US)

(72) Inventors: Juan J. Noguera Serra, San Jose, CA (US); Sneha Bhalchandra Date, Santa Clara, CA (US); Jan Langer, Chemnitz (DE); Baris Ozgul, Dublin (IE); Goran H K Bilski, Molndal (SE)

(73) Assignee: XILINX, INC., San Jose, CA (US)

( * ) Notice: Subject to any disclaimer, the term of this patent is extended or adjusted under 35 U.S.C. 154(b) by 289 days.

(21) Appl. No.: 15/944,295

(22) Filed: Apr. 3, 2018

(51) Int. Cl.
    G06F 9/24       (2006.01)
    G06F 15/177     (2006.01)
    G06F 15/173     (2006.01)
    G06F 15/80      (2006.01)
    G06F 9/4401     (2018.01)

(52) U.S. Cl.
    CPC ...... G06F 15/177 (2013.01); G06F 15/17306 (2013.01); G06F 15/80 (2013.01); *G06F 9/4401* (2013.01)

(58) Field of Classification Search
    CPC ... G06F 15/177; G06F 15/17306; G06F 15/80
    USPC .......................................................... 713/1
    See application file for complete search history.

(56) References Cited

U.S. PATENT DOCUMENTS

| | | |
|---|---|---|
| 3,776,137 A | 12/1973 | Abbott |
| 6,091,263 A | 7/2000 | New et al. |
| 6,150,839 A | 11/2000 | New et al. |
| 6,204,687 B1 | 3/2001 | Schultz et al. |
| 6,462,579 B1 | 10/2002 | Camilleri et al. |
| 6,526,557 B1 | 2/2003 | Young et al. |
| 6,759,869 B1 | 7/2004 | Young et al. |
| 6,810,514 B1 * | 10/2004 | Alfke .................. G06F 30/34 326/38 |
| 6,836,842 B1 | 12/2004 | Guccione et al. |
| 6,907,595 B2 | 6/2005 | Curd et al. |
| 7,024,651 B1 | 4/2006 | Camilleri et al. |
| 7,057,413 B1 | 6/2006 | Young et al. |
| 7,124,338 B1 | 10/2006 | Mark et al. |
| 7,224,184 B1 | 5/2007 | Levi et al. |
| 7,302,625 B1 | 11/2007 | Payakapan et al. |
| 7,477,072 B1 | 1/2009 | Kao et al. |
| 7,478,357 B1 | 1/2009 | Mason et al. |

(Continued)

OTHER PUBLICATIONS

Mellanox, "BlueField Multicore System on Chip," copyright 2017, 4 pp., Mellanox Technologies, Sunnyvale, California, USA.

(Continued)

*Primary Examiner* — Volvick Derose
(74) *Attorney, Agent, or Firm* — Patterson + Sheridan, LLP

(57) ABSTRACT

A device may include a processor system and an array of data processing engines (DPEs) communicatively coupled to the processor system. Each of the DPEs includes a core and a DPE interconnect. The processor system is configured to transmit configuration data to the array of DPEs, and each of the DPEs is independently configurable based on the configuration data received at the respective DPE via the DPE interconnect of the respective DPE. The array of DPEs enable, without modifying operation of a first kernel of a first subset of the DPEs of the array of DPEs, reconfiguration of a second subset of the DPEs of the array of DPEs.

20 Claims, 24 Drawing Sheets

(56) References Cited

U.S. PATENT DOCUMENTS

| | | | |
|---|---|---|---|
| 7,482,836 | B2 | 1/2009 | Levi et al. |
| 7,509,617 | B1 | 3/2009 | Young |
| 7,518,396 | B1 | 4/2009 | Kondapalli et al. |
| 7,546,572 | B1 | 6/2009 | Ballagh et al. |
| 7,619,442 | B1 | 11/2009 | Mason et al. |
| 7,640,527 | B1 | 12/2009 | Dorairaj et al. |
| 7,724,815 | B1 | 5/2010 | Raha et al. |
| 7,746,099 | B1 * | 6/2010 | Chan .......... H03K 19/1776 326/38 |
| 8,102,188 | B1 | 1/2012 | Chan et al. |
| 8,250,342 | B1 | 8/2012 | Kostamov et al. |
| 8,359,448 | B1 * | 1/2013 | Neuendorffer .......... G06F 30/34 711/170 |
| 8,415,974 | B1 * | 4/2013 | Lysaght .......... H03K 19/17756 326/39 |
| 8,719,750 | B1 * | 5/2014 | Balzli, Jr. .......... G06F 30/34 716/113 |
| 8,796,539 | B2 | 8/2014 | Asaumi et al. |
| 8,928,351 | B1 * | 1/2015 | Konduru .......... H03K 19/17756 326/38 |
| 9,081,634 | B1 | 7/2015 | Simkins et al. |
| 9,722,613 | B1 | 8/2017 | Schultz et al. |
| 2019/0043737 | A1 * | 2/2019 | Hutton .......... G06F 1/20 |

OTHER PUBLICATIONS

Mellanox, "NP-5 Network Processor," copyright 2107, 2 pp., Mellanox Technologies, Sunnyvale, California, USA.

Mellanox, "Tile-Gx672 Processor," PB041, Feb. 14, 2015, 2 pp., Mellanox Technologies, Sunnyvale, California, USA.

Kalray, "Kalray NVMe-oF Target Controller Solutions," Dec. 18, 2017, 14 pp., Kalray Inc., Los Altos, California, USA.

Ezchip, "Tile-Gx72 Processor," PB041, Feb. 14, 2015, 2 pp., EZchip Semiconductor, Inc., San Jose, California, USA.

Schooler, Richard, "Tile Processors: Many-Core for Embedded and Cloud Computing," Sep. 15, 2010, 35 pp., 14th Annual Workshop on High Performance Embedded Computing (HPEC '10).

Doud, Bob, "Accelerating the Data Plane with the Tile-Mx Manycore Processor," Feb. 25, 2015, 19 pp., Linley Data Center Conference, EZchip Semiconductor, Inc., San Jose, California, USA.

Wentzlaff, David et al., "On-Chip Interconnection Architecture of the Tile Processor," IEEE Micro, Nov. 12, 2007, pp. 15-31, vol. 27, Issue 5, IEEE Computer Society Press, Los Alamitos, California, USA.

Kalray, "MPPA Processors for Autonomous Driving," May 25, 2017, 18 pp., Kalray Inc., Los Altos, California, USA.

Kalray, "Deep Learning for High-Performance Embedded Applications," 19 pp., Kalray Inc., Los Altos, California, USA.

Xilinx, UltraScale Architecture DSP Slice, UG579, Oct. 18, 2017, 74 pp., Xilinx, Inc., San Jose, California, USA.

* cited by examiner

DEVICE WITH DATA PROCESSING ENGINE ARRAY THAT ENABLES PARTIAL RECONFIGURATION

TECHNICAL FIELD

This disclosure relates to integrated circuit devices (devices) and, more particularly, to devices that include data processing engines and/or a data processing engine array that enables partial reconfiguration.

BACKGROUND

A programmable integrated circuit (IC) refers to a type of IC that includes programmable circuitry. An example of a programmable IC is a field programmable gate array (FPGA). An FPGA is characterized by the inclusion of programmable circuit blocks. Examples of programmable circuit blocks include, but are not limited to, input/output blocks (IOBs), configurable logic blocks (CLBs), dedicated random access memory blocks (BRAM), digital signal processing blocks (DSPs), processors, clock managers, and delay lock loops (DLLs).

Circuit designs may be physically implemented within the programmable circuitry of a programmable IC by loading configuration data, sometimes referred to as a configuration bitstream, into the device. The configuration data may be loaded into internal configuration memory cells of the device. The collective states of the individual configuration memory cells determine the functionality of the programmable IC. For example, the particular operations performed by the various programmable circuit blocks and the connectivity between the programmable circuit blocks of the programmable IC are defined by the collective states of the configuration memory cells once loaded with the configuration data.

SUMMARY

Examples described herein relate to a device that includes an array of data processing engines (DPEs), where each DPE includes a core and a DPE interconnect. The DPEs are independently configurable, and various subsets of the array can implement different kernels. In some examples, such as described in reference to FIGS. 11A-11C through 14A-14C, a subset of the array can be reconfigured to implement a kernel without modifying operation of another kernel that is implemented in another subset of the array. This may be referred to as partially reconfiguring the array of DPEs.

In one or more embodiments, a device may include a processor system and an array of data processing engines (DPEs) communicatively coupled to the processor system. Each of the DPEs includes a core and a DPE interconnect. The processor system is configured to transmit configuration data to the array of DPEs, and each of the DPEs is independently configurable based on the configuration data received at the respective DPE via the DPE interconnect of the respective DPE. The array of DPEs enable, without modifying operation of a first kernel of a first subset of the DPEs of the array of DPEs, reconfiguration of a second subset of the DPEs of the array of DPEs.

One or more embodiments is a method for operating a device. A first subset of an array of data processing engines (DPEs) is configured, using a processor system, to implement a first kernel. Each of the DPEs includes a core and a DPE interconnect. Each of the DPEs is independently configurable based on configuration data received at the respective DPE via the DPE interconnect of the respective DPE. The first kernel is operated on the first subset of the array of DPEs. Without modifying operation of the first kernel on the first subset of the array of DPEs, a second subset of the array of DPEs is configured, using the processor system, to implement a second kernel.

In one or more embodiments, a device may include an array of data processing engines (DPEs), a system interface circuit comprising tiles, and a processor system coupled to the system interface circuit. Each of the DPEs includes a core, program memory, a DPE interconnect, and configuration registers. The program memory is configured to store executable program code that is executable by the core of the respective DPE. The DPE interconnect includes a stream switch and a memory mapped switch. The configuration registers are configured to store interconnect data that configures the stream switch of the respective DPE for routing communications via the stream switch of the respective DPE. Each tile is connected to a respective adjacent DPE of the array of DPEs. The processor system is operable to configure a first subset of the DPEs independently of a second subset of the DPEs. The processor system is operable to transmit configuration data to the system interface circuit. The system interface circuit is operable to propagate the configuration data to one or more of the tiles that provide an interface for the first subset of the DPEs. The one or more of the tiles is operable to direct the configuration data to target ones of the DPEs of the first subset of the DPEs via the memory mapped switches of the target ones of the DPEs and intervening DPEs between the target ones of the DPEs and the respective one or more of the tiles. Executable program code of the configuration data is written to the program memory of the target ones of the DPEs. Interconnect data of the configuration data is written to the configuration registers of the target ones of the DPEs.

This Summary section is provided merely to introduce certain concepts and not to identify any key or essential features of the claimed subject matter. Other features of the example arrangements will be apparent from the accompanying drawings and from the following detailed description.

BRIEF DESCRIPTION OF THE DRAWINGS

The example arrangements are illustrated by way of example in the accompanying drawings. The drawings, however, should not be construed to be limiting of the example arrangements to only the particular implementations shown. Various aspects and advantages will become apparent upon review of the following detailed description and upon reference to the drawings.

DETAILED DESCRIPTION

Figure 1:
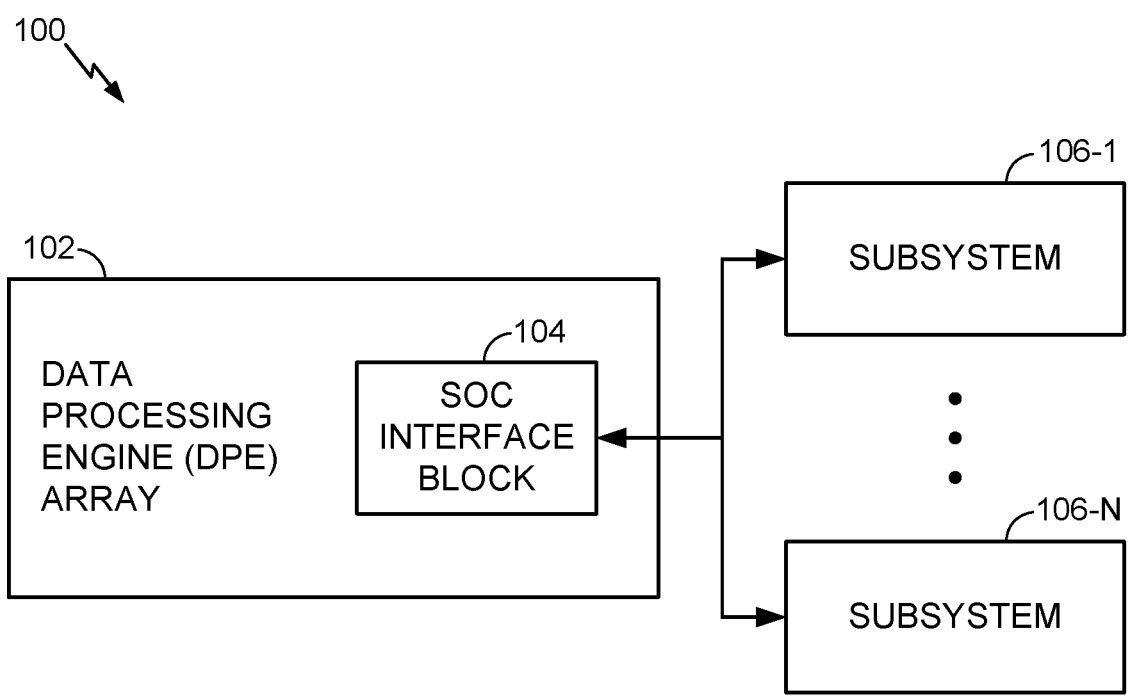
FIG. 1 illustrates an example of a device including a data processing engine (DPE) array.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuit devices (devices) that include one or more data processing engines (DPEs) and/or DPE arrays. A DPE array refers to a plurality of hardwired circuit blocks. The plurality of circuit blocks may be programmable. A DPE array may include a plurality of DPEs and a System-on-Chip (SoC) interface block. In general, a DPE includes a core that is capable of providing data processing capabilities. A DPE may also include a memory module that is accessible by the core. In some embodiments, the memory module of a DPE may also be accessed by one or more other cores in different DPEs of the DPE array. A DPE further may include a DPE interconnect. The DPE interconnect refers to circuitry that is capable of implementing communications with other DPEs of a DPE array and/or communications with different subsystems of the device including the DPE array. The DPE interconnect further may support configuration of the DPE.

In one or more examples, the DPE interconnect can be implemented to partially reconfigure the DPE array. For example, a subset of DPEs in the DPE array can be operating a kernel while another subset of DPEs in the DPE array is to be reconfigured. In other examples, operation of a subset of DPEs in the DPE array can be stalled from operating a kernel while another subset of DPEs in the DPE array is to be reconfigured. By implementing a DPE interconnect, such as described herein, that permit communication between DPEs for application data (e.g., via stream switches) separate from communication between DPEs for configuration data (e.g., via memory mapped switches), one or more subsets of a DPE array can be reconfigured without reconfiguring components of another subset of the DPE array that affects the operation of the kernel of that subset of the DPE array, such as while that subset of the DPE array remains in operation in some examples.

A DPE array may be utilized with, and coupled to, any of a variety of different subsystems within the device. Such subsystems may include, but are not limited to, processor systems and/or programmable logic, which may be interconnected via a Network-on-Chip (NoC). In particular embodiments, the NoC may be programmable. Further examples of subsystems that may be included in a device and coupled to a DPE array may include, but are not limited to, an application-specific integrated circuit (ASIC), hardwired circuit blocks, analog and/or mixed signal circuitry, graphics processing units (GPUs), and/or general-purpose processors (e.g., central processing units or CPUs). An example of a CPU is a processor having an x86 type of architecture. Within this specification, the term "ASIC" may refer to an IC, a die, and/or a portion of a die that includes application-specific circuitry in combination with another type or types of circuitry; and/or to an IC and/or die that is formed entirely of application-specific circuitry.

A DPE array as described within this disclosure as an example, but not by way of limitation, is capable of implementing an optimized digital signal processing (DSP) architecture. The DSP architecture is capable of efficiently performing any of a variety of different operations. Examples of the types of operations that may be performed by the architecture include, but are not limited to, operations relating to wireless radio, decision feedback equalization (DFE), 5G/baseband, wireless backhaul, machine learning, automotive driver assistance, embedded vision, cable access, and/or radar. A DPE array as described herein is capable of performing such operations while consuming less power than other solutions that utilize conventional programmable (e.g., FPGA type) circuitry. Further, a DPE array-based solution may be implemented using less area of a die than other solutions that utilize conventional programmable circuitry. The DPE array is further capable of performing operations as described herein while meeting predictable and guaranteed data throughput and latency metrics.

Further aspects of the example arrangements are described below in greater detail with reference to the figures. For purposes of simplicity and clarity of illustration, elements shown in the figures have not necessarily been drawn to scale. Further, where considered appropriate, reference numbers are repeated among the figures to indicate corresponding, analogous, or like features.

FIG. 1 illustrates an example of a device 100 including a DPE array 102. In the example of FIG. 1, DPE array 102 includes a SoC interface block 104. Device 100 also includes one or more subsystems 106-1 through 106-N. In one or more embodiments, device 100 is implemented as a SoC type of device. In general, a SoC refers to an IC that includes two or more subsystems capable of interacting with one another. As an example, a SoC may include a processor that executes program code and one or more other circuits. The other circuits may be implemented as hardwired circuitry, programmable circuitry, other subsystems, and/or any combination thereof. The circuits may operate cooperatively with one another and/or with the processor.

DPE array 102 is formed of a plurality of interconnected DPEs. Each of the DPEs is a hardwired circuit block. Each DPE may be programmable. SoC interface block 104 may include one or more tiles. Each of the tiles of SoC interface block 104 may be hardwired. Each tile of SoC interface block 104 may be programmable. SoC interface block 104 provides an interface between DPEs of DPE array 102 and other portions of a SoC such as subsystems 106 of device 100. Subsystems 106-1 through 106-N may represent, for example, one or more or any combination of processors and/or processor systems (e.g., CPUs, general-purpose processors, and/or GPUs), programmable logic, ASICs, analog and/or mixed signal circuitry, and/or hardwired circuit blocks.

In one or more embodiments, device 100 is implemented using a single die architecture. In that case, DPE array 102 and at least one subsystem 106 may be included or implemented in a single die. In one or more other embodiments, device 100 is implemented using a multi-die architecture. In that case, DPE array 102 and subsystems 106 may be implemented across two or more dies. For example, DPE array 102 may be implemented in one die while subsystems 106 are implemented in one or more other dies. In another example, SoC interface block 104 may be implemented in a different die than the DPEs of DPE array 102. In yet another example, DPE array 102 and at least one subsystem 106 may be implemented in a same die while other subsystems and/or other DPE arrays are implemented in other dies.

Figure 2:
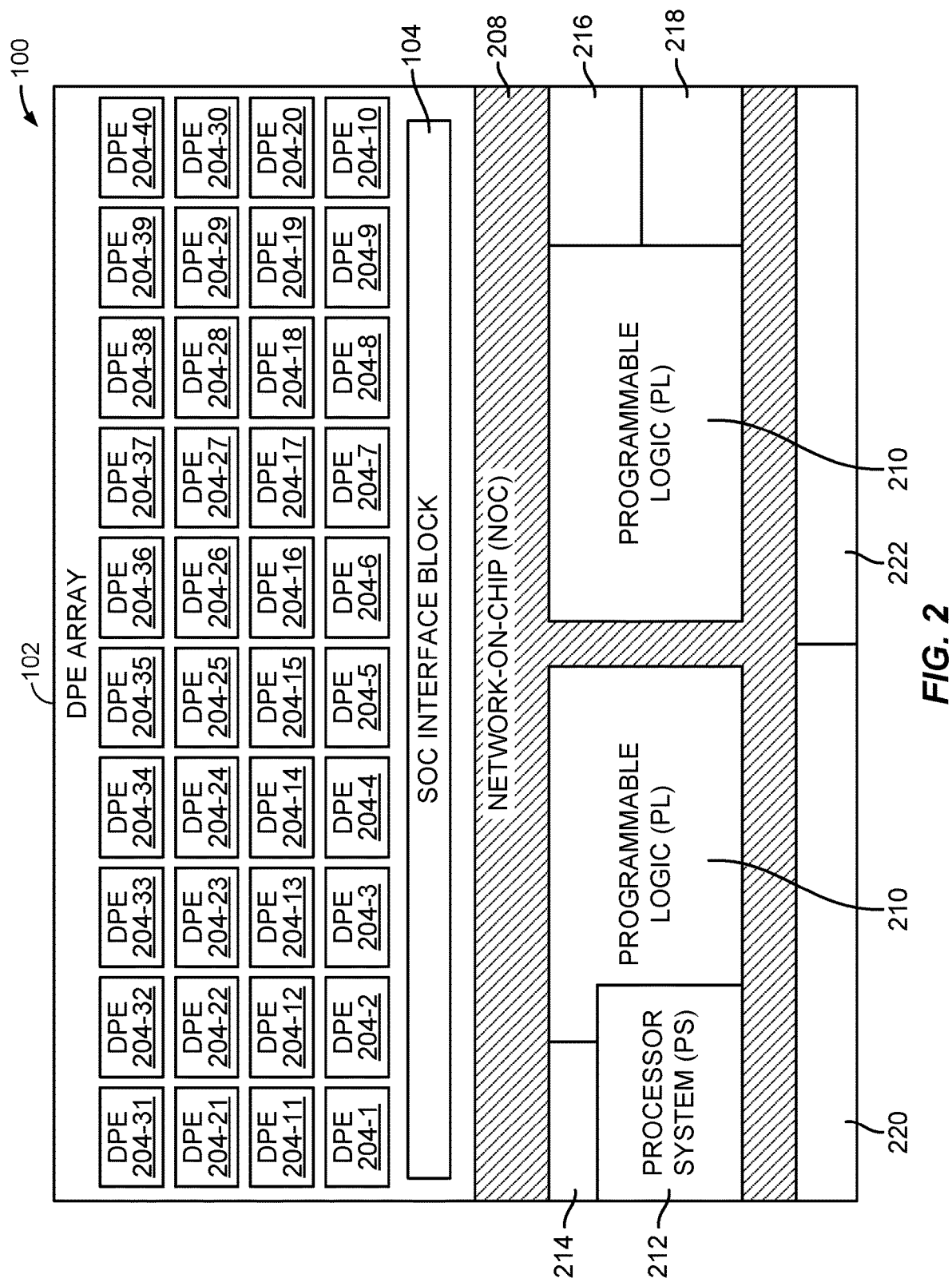
FIG. 2 illustrates another example architecture for a device including a DPE array.

FIG. 2 illustrates another example architecture for device 100. In the example of FIG. 2, DPE array 102 is implemented as a two-dimensional array of DPEs 204 that includes SoC interface block 104. DPE array 102 may be implemented using any of a variety of different architectures to be described herein in greater detail below. For purposes of illustration and not limitation, FIG. 2 illustrates DPEs 204 arranged in aligned rows and aligned columns. In other embodiments, however, DPEs 204 may be arranged where DPEs in selected rows and/or columns are horizontally inverted or flipped relative to DPEs in adjacent rows and/or columns. In one or more other embodiments, rows and/or columns of DPEs may be offset relative to adjacent rows and/or columns. One or more or all DPEs 204 may be implemented as generally described in connection with FIGS. 3, 5, and 6.

SoC interface block 104 is capable of coupling DPEs 204 to one or more other subsystems of device 100. In one or more embodiments, SoC interface block 104 is coupled to adjacent DPEs 204. For example, SoC interface block 104 may be directly coupled to each DPE 204 in the bottom row of DPEs in DPE array 102. In illustration, SoC interface block 104 may be directly connected to DPE 204-1, 204-2, 204-3, 204-4, 204-5, 204-6, 204-7, 204-8, 204-9, and 204-10.

FIG. 2 is provided for purposes of illustration. In other embodiments, SoC interface block 104 may be located at the top of DPE array 102, to the left of DPE array 102 (e.g., as a column), to the right of DPE array 102 (e.g., as a column), or at multiple locations in and around DPE array 102 (e.g., as one or more intervening rows and/or columns within DPE array 102). Depending upon the layout and location of SoC interface block 104, the particular DPEs coupled to SoC interface block 104 may vary.

For purposes of illustration and not limitation, if SoC interface block 104 is located to the left of DPEs 204, SoC interface block 104 may be directly coupled to the left column of DPEs including DPE 204-1, DPE 204-11, DPE 204-21, and DPE 204-31. If SoC interface block 104 is located to the right of DPEs 204, SoC interface block 104 may be directly coupled to the right column of DPEs including DPE 204-10, DPE 204-20, DPE 204-30, and DPE 204-40. If SoC interface block 104 is located at the top of DPEs 204, SoC interface block 104 may be coupled to the top row of DPEs including DPE 204-31, DPE 204-32, DPE 204-33, DPE 204-34, DPE 204-35, DPE 204-36, DPE 204-37, DPE 204-38, DPE 204-39, and DPE 204-40. If SoC interface block 104 is located at multiple locations, the particular DPEs that are directly connected to SoC interface block 104 may vary. For example, if SoC interface block is implemented as a row and/or column within DPE array 102, the DPEs that are directly coupled to SoC interface block 104 may be those that are adjacent to SoC interface block 104 on one or more or each side of SoC interface block 104.

DPEs 204 are interconnected by DPE interconnects (not shown), which, when taken collectively, form a DPE interconnect network. As such, SoC interface block 104 is capable of communicating with any DPE 204 of DPE array 102 by communicating with one or more selected DPEs 204 of DPE array 102 directly connected to SoC interface block 104 and utilizing the DPE interconnect network formed of DPE interconnects implemented within each DPE 204.

SoC interface block 104 is capable of coupling each DPE 204 within DPE array 102 with one or more other subsystems of device 100. For purposes of illustration, device 100 includes subsystems (e.g., subsystems 106) such as programmable logic (PL) 210, a processor system (PS) 212, and/or any of hardwired circuit blocks 214, 216, 218, 220, and/or 222, which can be interconnected via a NoC 208. SoC interface block 104 is capable of establishing connections between selected DPEs 204 and PL 210. SoC interface block 104 is also capable of establishing connections between selected DPEs 204 and NoC 208. Through NoC 208, the selected DPEs 204 are capable of communicating with PS 212 and/or hardwired circuit blocks 220 and 222. Selected DPEs 204 are capable of communicating with hardwired circuit blocks 214-218 via SoC interface block 104 and PL 210. In particular embodiments, SoC interface block 104 may be coupled directly to one or more subsystems of device 100. For example, SoC interface block 104 may be coupled directly to PS 212 and/or to other hardwired circuit blocks. In particular embodiments, hardwired circuit blocks 214-222 may be considered examples of ASICs.

In one or more embodiments, DPE array 102 includes a single clock domain. Other subsystems such as NoC 208, PL 210, PS 212, and the various hardwired circuit blocks may be in one or more separate or different clock domain(s). Still, DPE array 102 may include additional clocks that may be used for interfacing with other ones of the subsystems. In particular embodiments, SoC interface block 104 includes a clock signal generator that is capable of generating one or more clock signals that may be provided or distributed to DPEs 204 of DPE array 102.

DPE array 102 may be programmed by loading configuration data into internal configuration memory cells (also referred to herein as "configuration registers") that define connectivity among DPEs 204 and SoC interface block 104 and how DPEs 204 and SoC interface block 104 operate. For example, for a particular DPE 204 or group of DPEs 204 to communicate with a subsystem, the DPE(s) 204 and SoC interface block 104 are programmed to do so. Similarly, for one or more particular DPEs 204 to communicate with one or more other DPEs 204, the DPEs are programmed to do so. DPE(s) 204 and SoC interface block 104 may be programmed by loading configuration data into configuration registers within DPE(s) 204 and SoC interface block 104, respectively. In another example, the clock signal generator, being part of SoC interface block 104, may be programmable using configuration data to vary the clock frequencies provided to DPE array 102.

NoC 208 provides connectivity to PL 210, PS 212, and to selected ones of the hardwired circuit blocks (e.g., circuit blocks 220 and 222). In the example of FIG. 2, NoC 208 is programmable. In the case of a programmable NoC used with other programmable circuitry, the nets that are to be routed through NoC 208 are unknown until a user circuit design is created for implementation within device 100. NoC 208 may be programmed by loading configuration data into internal configuration registers that define how elements within NoC 208 such as switches and interfaces are configured and operate to pass data from switch to switch and among the NoC interfaces.

NoC 208 is fabricated as part of device 100 and while not physically modifiable, may be programmed to establish connectivity between different master circuits and different slave circuits of a user circuit design. In this regard, NoC 208 is capable of adapting to different circuit designs, where each different circuit design has different combinations of master circuits and slave circuits implemented at different locations in device 100 that may be coupled by NoC 208. NoC 208 may be programmed to route data, e.g., application data and/or configuration data, among the master and slave circuits of the user circuit design. For example, NoC 208 may be programmed to couple different user-specified circuitry implemented within PL 210 with PS 212, with different ones of DPEs 204 via SoC interface block 104, with different hardwired circuit blocks, and/or with different circuits and/or systems external to device 100.

PL 210 is circuitry that may be programmed to perform specified functions. As an example, PL 210 may be implemented as field programmable gate array (FPGA) circuitry. PL 210 may include an array of programmable circuit blocks. Examples of programmable circuit blocks within PL 210 include, but are not limited to, input/output blocks (IOBs), configurable logic blocks (CLBs), dedicated random access memory blocks (BRAM), digital signal processing blocks (DSPs), clock managers, and/or delay lock loops (DLLs).

Each programmable circuit block within PL 210 typically includes both programmable interconnect circuitry and programmable logic circuitry. The programmable interconnect circuitry typically includes a large number of interconnect wires of varying lengths interconnected by programmable interconnect points (PIPs). Typically, the interconnect wires are configured (e.g., on a per wire basis) to provide connectivity on a per-bit basis (e.g., where each wire conveys a single bit of information). The programmable logic circuitry implements the logic of a user design using programmable elements that may include, for example, look-up tables, registers, arithmetic logic, and so forth. The programmable interconnect and programmable logic circuitries may be programmed by loading configuration data into internal configuration memory cells that define how the programmable elements are configured and operate.

In the example of FIG. 2, PL 210 is shown in two separate sections. In another example, PL 210 may be implemented as a unified region of programmable circuitry. In still another example, PL 210 may be implemented as more than two different regions of programmable circuitry. The particular organization of PL 210 is not intended as a limitation.

In the example of FIG. 2, PS 212 is implemented as hardwired circuitry that is fabricated as part of device 100. PS 212 may be implemented as, or include, any of a variety of different processor types. For example, PS 212 may be implemented as an individual processor, e.g., a single core capable of executing program code. In another example, PS 212 may be implemented as a multi-core processor. In still another example, PS 212 may include one or more cores, modules, co-processors, interfaces, and/or other resources. PS 212 may be implemented using any of a variety of different types of architectures. Example architectures that may be used to implement PS 212 may include, but are not limited to, an ARM processor architecture, an x86 processor architecture, a GPU architecture, a mobile processor architecture, a DSP architecture, or other suitable architecture that is capable of executing computer-readable instructions or program code.

Circuit blocks 214-222 may be implemented as any of a variety of different hardwired circuit blocks. Hardwired circuit blocks 214-222 may be customized to perform specialized functions. Examples of circuit blocks 214-222 include, but are not limited to, input/output blocks (IOBs), transceivers, or other specialized circuit blocks. As noted, circuit blocks 214-222 may be considered examples of ASICs.

The example of FIG. 2 illustrates an architecture that may be implemented in a device that includes a single die. While DPE array 102 is illustrated as occupying the entire width of device 100, in other embodiments, DPE array 102 may occupy less than the entire width of device 100 and/or be located in a different region of device 100. Further, the number of DPEs 204 included may vary. As such, the particular number of columns and/or rows of DPEs 204 may vary from that illustrated in FIG. 2.

In one or more other embodiments, a device such as device 100 may include two or more DPE arrays 102 located in different regions of device 100. For example, an additional DPE array may be located below circuit blocks 220 and 222.

As noted, FIG. 2 illustrates an example architecture for a device that includes a single die. In one or more other embodiments, device 100 may be implemented as a multi-die device including one or more DPE arrays 102.

Using a DPE array as described herein in combination with one or more other subsystems, whether implemented in a single die device or a multi-die device, increases the processing capabilities of the device while keeping area usage and power consumption low. For example, one or more DPE array(s) may be used to hardware accelerate particular operations and/or to perform functions offloaded from one or more of the subsystems of the device described herein. When used with a PS, for example, the DPE array may be used as a hardware accelerator. The PS may offload operations to be performed by the DPE array or a portion thereof. In other examples, the DPE array may be used to perform computationally resource intensive operations such as generating digital pre-distortion to be provided to analog/mixed signal circuitry.

It should be appreciated that any of the various combinations of DPE array(s) and/or other subsystems described herein in connection with FIGS. 1 and/or 2 may be implemented in either a single die type of device or a multi-die type of device.

In the various examples described herein, the SoC interface block is implemented within the DPE array. In one or more other embodiments, the SoC interface block may be implemented external to the DPE array. For example, the SoC interface block may be implemented as a circuit block, e.g., a standalone circuit block, that is separate from the circuit block implementing the plurality of DPEs.

Figure 3:
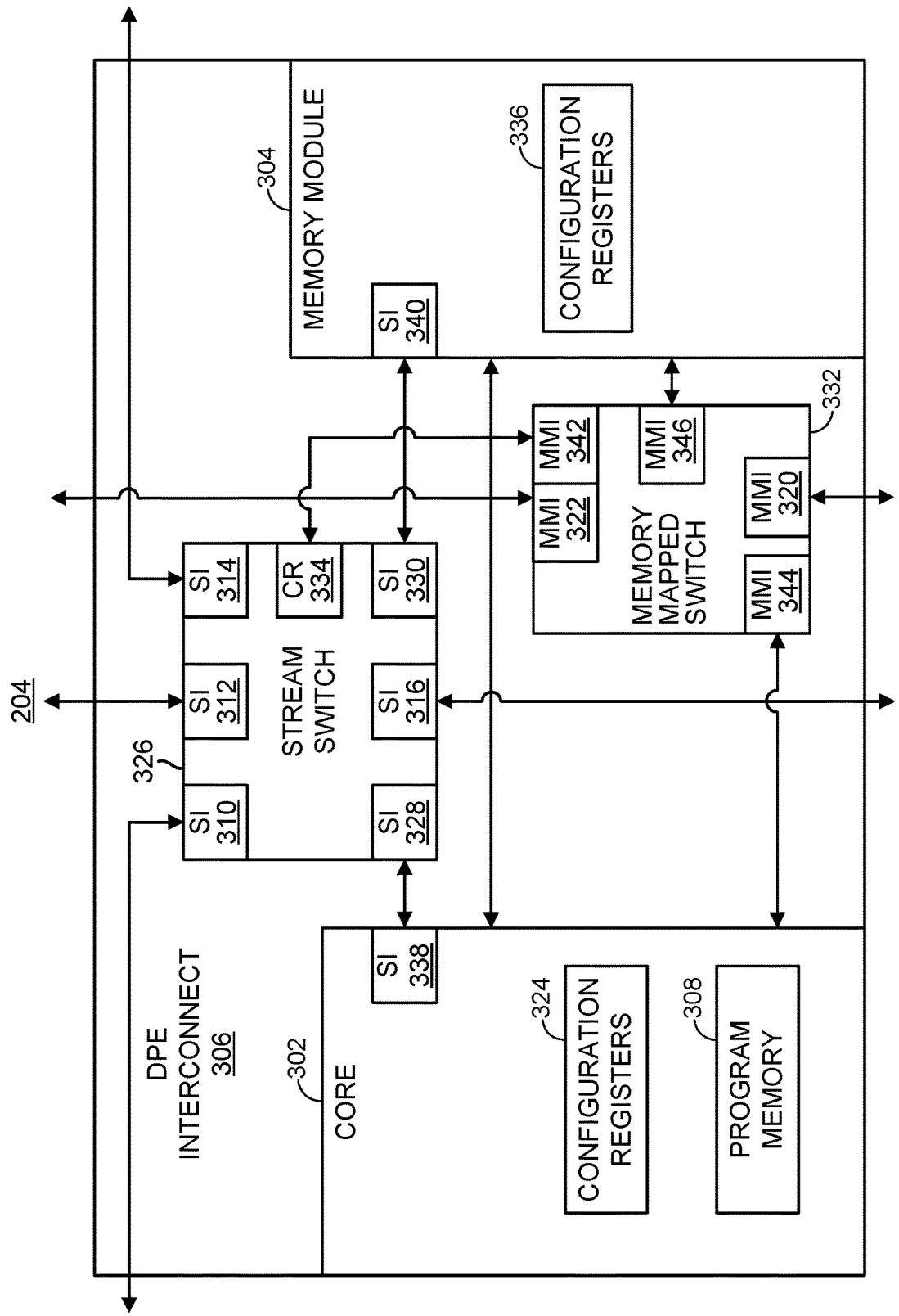
FIG. 3 illustrates an example architecture for a DPE of a DPE array.

FIG. 3 illustrates an example architecture for a DPE 204 of DPE array 102. In the example of FIG. 3, DPE 204 includes a core 302, a memory module 304, and DPE interconnect 306.

Core 302 provides the data processing capabilities of DPE 204. Core 302 may be implemented as any of a variety of different processing circuits. In the example of FIG. 3, core 302 includes an optional program memory 308. In one or more embodiments, core 302 is implemented as a processor that is capable of executing program code, e.g., computer readable instructions. In that case, program memory 308 is included and is capable of storing instructions that are executed by core 302. Core 302, for example, may be implemented as a CPU, a GPU, a DSP, a vector processor, or another type of processor that is capable of executing instructions. The core may be implemented using any of the various CPU and/or processor architectures described herein. In another example, core 302 is implemented as a very long instruction word (VLIW) vector processor or DSP.

In particular embodiments, program memory 308 is implemented as a dedicated program memory that is private to core 302. Program memory 308 may only be used by the core of the same DPE 204. Thus, program memory 308 may only be accessed by core 302 and is not shared with any other DPE or component of another DPE. Program memory 308 may include a single port for read and write operations. Program memory 308 may support program compression and is addressable using the memory mapped network portion of DPE interconnect 306 described in greater detail below. Via the memory mapped network of DPE interconnect 306, for example, program memory 308 may be loaded with program code that may be executed by core 302.

In one or more embodiments, program memory 308 is capable of supporting one or more error detection and/or error correction mechanisms. For example, program memory 308 may be implemented to support parity checking through the addition of parity bits. In another example, program memory 308 may be error-correcting code (ECC) memory that is capable of detecting and correcting various types of data corruption. In another example, program memory 308 may support both ECC and parity checking. The different types of error detection and/or error correction described herein are provided for purposes of illustration and are not intended to be limiting of the embodiments described. Other error detection and/or error correction technologies may be used with program memory 308 other than those listed.

In one or more embodiments, core 302 may have a customized architecture to support an application-specific instruction set. For example, core 302 may be customized for wireless applications and be configured to execute wireless-specific instructions. In another example, core 302 may be customized for machine learning and be configured to execute machine learning-specific instructions.

In one or more other embodiments, core 302 is implemented as hardwired circuitry such as a hardened Intellectual Property (IP) core that is dedicated for performing a particular operation or operations. In that case, core 302 may not execute program code. In embodiments where core 302 does not execute program code, program memory 308 may be omitted. As an illustrative and non-limiting example, core 302 may be implemented as a hardened forward error correction (FEC) engine or other circuit block.

Core 302 may include configuration registers 324. Configuration registers 324 may be loaded with configuration data to control operation of core 302. In one or more embodiments, core 302 may be activated and/or deactivated based upon configuration data loaded into configuration registers 324. In the example of FIG. 3, configuration registers 324 are addressable (e.g., may be read and/or written) via the memory mapped network of DPE interconnect 306 described in greater detail below.

In one or more embodiments, memory module 304 is capable of storing data that is used by and/or generated by core 302. For example, memory module 304 is capable of storing application data. Memory module 304 may include a read/write memory such as a random-access memory. Accordingly, memory module 304 is capable of storing data that may be read and consumed by core 302. Memory module 304 is also capable of storing data (e.g., results) that are written by core 302.

In one or more other embodiments, memory module 304 is capable of storing data, e.g., application data, that may be used by and/or generated by one or more other cores of other DPEs within the DPE array. One or more other cores of DPEs may also read from and/or write to memory module 304. In particular embodiments, the other cores that may read from and/or write to memory module 304 may be cores of one or more neighboring DPEs. Another DPE that shares a border or boundary with DPE 204 (e.g., that is adjacent) is said to be a "neighboring" DPE relative to DPE 204. By allowing core 302 and one or more other cores from neighboring DPEs to read and/or write to memory module 304, memory module 304 implements a shared memory that supports communication among the different DPEs and/or cores capable of accessing memory module 304.

Referring to FIG. 2, for example, DPEs 204-14, 204-16, 204-5, and 204-25 are considered neighboring DPEs of DPE 204-15. In one example, the core within each of DPEs 204-16, 204-5, and 204-25 is capable of reading and writing to the memory module within DPE 204-15. In particular embodiments, only those neighboring DPEs that are adjacent to the memory module may access the memory module of DPE 204-15. For example, DPE 204-14, while adjacent to DPE 204-15, may not be adjacent to the memory module of DPE 204-15 since the core of DPE 204-15 may be located between the core of DPE 204-14 and the memory module of DPE 204-15. As such, in particular embodiments, the core of DPE 204-14 may not access the memory module of DPE 204-15.

In particular embodiments, whether a core of a DPE is able to access the memory module of another DPE depends upon the number of memory interfaces included in the memory module and whether such cores are connected to an available one of the memory interfaces of the memory module. In the example above and described in further detail below with respect to FIG. 5, the memory module of DPE 204-15 includes four memory interfaces, where the core of each of DPEs 204-16, 204-5, and 204-25 is connected to such a memory interface. Core 302 within DPE 204-15 itself is connected to the fourth memory interface. Each memory interface may include one or more read and/or write channels. In particular embodiments, each memory interface includes multiple read channels and multiple write channels so that the particular core attached thereto is capable of reading and/or writing to multiple banks within memory module 304 concurrently.

In other examples, more than four memory interfaces may be available. Such other memory interfaces may be used to allow DPEs on a diagonal to DPE 204-15 to access the memory module of DPE 204-15. For example, if the cores in DPEs such as DPEs 204-14, 204-24, 204-26, 204-4, and/or 204-6 are also coupled to an available memory interface of the memory module in DPE 204-15, such other DPEs would also be capable of accessing the memory module of DPE 204-15.

Memory module 304 may include configuration registers 336. Configuration registers 336 may be loaded with configuration data to control operation of memory module 304. In the example of FIG. 3, configuration registers 336 are addressable (e.g., may be read and/or written) via the memory mapped network of DPE interconnect 306 described in greater detail below.

In the example of FIG. 3, DPE interconnect 306 is specific to DPE 204. DPE interconnect 306 facilitates various operations including communication between DPE 204 and one or more other DPEs of DPE array 102 and/or communication with other subsystems of device 100. DPE interconnect 306 further enables configuration, control, and debugging of DPE 204.

In particular embodiments, DPE interconnect 306 is implemented as an on-chip interconnect. An example of an on-chip interconnect is an Advanced Microcontroller Bus Architecture (AMBA) eXtensible Interface (AXI) bus (e.g., or switch). An AXI bus is an embedded microcontroller bus interface for use in establishing on-chip connections between circuit blocks and/or systems. An AXI bus is provided herein as an example of interconnect circuitry that may be used with the example arrangements described within this disclosure and, as such, is not intended as a limitation. Other examples of interconnect circuitry may include other types of buses, crossbars, and/or other types of switches.

In one or more embodiments, DPE interconnect 306 includes two different networks. The first network is capable of exchanging data with other DPEs of DPE array 102 and/or other subsystems of device 100. For example, the first network is capable of exchanging application data. The second network is capable of exchanging data such as configuration, control, and/or debugging data for the DPE(s).

In the example of FIG. 3, the first network of DPE interconnect 306 is formed of stream switch 326 and one or more stream interfaces. As pictured, stream switch 326 includes a plurality of stream interfaces (abbreviated as "SI" in FIG. 3). In one or more embodiments, each stream interface may include one or more masters (e.g., master interfaces or outputs) and/or one or more slaves (e.g., slave interfaces or inputs). Each master may be an independent output having a particular bit-width. For example, each master included in a stream interface may be an independent AXI master. Each slave may be an independent input having a particular bit-width. For example, each slave included in a stream interface may be an independent AXI slave.

Stream interfaces 310, 312, 314, and 316 are used to communicate with other DPEs in DPE array 102 and/or with SoC interface block 104. For example, each of stream interfaces 310, 312, 314, and 316 is capable of communicating in a different cardinal direction. In the example of FIG. 3, stream interface 310 communicates with a DPE to the left. Stream interface 312 communicates with a DPE above. Stream interface 314 communicates with a DPE to the right. Stream interface 316 communicates with a DPE or a tile of SoC interface block 104 below.

Stream interface 328 is used to communicate with core 302. Core 302, for example, includes a stream interface 338 that connects to stream interface 328 thereby allowing core 302 to communicate directly with other DPEs 204 via DPE interconnect 306. For example, core 302 may include instructions or hardwired circuitry that enable core 302 to send and/or receive data directly via stream interface 338. Stream interface 338 may be blocking or non-blocking. In one or more embodiments, in cases where core 302 attempts to read from an empty stream or write to a full stream, core 302 may stall. In other embodiments, attempting to read from an empty stream or write to a full stream may not cause core 302 to stall. Rather, core 302 may continue execution or operation.

Stream interface 330 is used to communicate with memory module 304. Memory module 304, for example, includes a stream interface 340 that connects to stream interface 330 thereby allowing other DPEs 204 to communicate with memory module 304 via DPE interconnect 306. Stream switch 326 is capable of allowing non-neighboring DPEs and/or DPEs that are not coupled to a memory interface of memory module 304 to communicate with core 302 and/or memory module 304 via the DPE interconnect network formed by the DPE interconnects of the respective DPEs 204 of DPE array 102.

Referring again to FIG. 2 and using DPE 204-15 as a point of reference, stream interface 310 is coupled to, and capable of, communicating with another stream interface located in the DPE interconnect of DPE 204-14. Stream interface 312 is coupled to, and capable of, communicating with another stream interface located in the DPE interconnect of DPE 204-25. Stream interface 314 is coupled to, and capable of, communicating with another stream interface located in the DPE interconnect of DPE 204-16. Stream interface 316 is coupled to, and capable of, communicating with another stream interface located in the DPE interconnect of DPE 204-5. As such, core 302 and/or memory module 304 are also capable of communicating with any of the DPEs within DPE array 102 via the DPE interconnects in the DPEs.

Stream switch 326 may also be used to interface to subsystems, such as PL 210, and/or to NoC 208. In general, stream switch 326 may be programmed to operate as a circuit-switching stream interconnect or a packet-switched stream interconnect. A circuit-switching stream interconnect is capable of implementing point-to-point, dedicated streams that are suitable for high-bandwidth communication among DPEs. A packet-switching stream interconnect allows streams to be shared to time-multiplex multiple logical streams onto one physical stream for medium bandwidth communication.

Stream switch 326 may include configuration registers (abbreviated as "CR" in FIG. 3) 334. Configuration data may be written to configuration registers 334 by way of the memory mapped network of DPE interconnect 306. The configuration data loaded into configuration registers 334 dictates which other DPEs and/or subsystems (e.g., PL 210 and/or PS 212) DPE 204 will communicate with and whether such communications are established as circuit-switched point-to-point connections or as packet-switched connections.

It should be appreciated that the number of stream interfaces illustrated in FIG. 3 is for purposes of illustration and not limitation. In other embodiments, stream switch 326 may include fewer stream interfaces. In particular embodiments, stream switch 326 may include more stream interfaces that facilitate connections to other components and/or subsystems in the device. For example, additional stream interfaces may couple to other non-neighboring DPEs such as DPEs 204-24, 204-26, 204-4, and/or 204-6. In one or more other embodiments, stream interfaces may be included to couple a DPE such as DPE 204-15 to other DPEs located one or more DPEs away. For example, one or more stream interfaces may be included that allow DPE 204-15 to couple directly to a stream interface in DPE 204-13, in DPE 204-16, or other non-neighboring DPE.

The second network of DPE interconnect 306 is formed of memory mapped switch 332. Memory mapped switch 332 includes a plurality of memory mapped interfaces (abbreviated as "MMI" in FIG. 3). In one or more embodiments, each memory mapped interface may include one or more masters (e.g., master interfaces or outputs) and/or one or more slaves (e.g., slave interfaces or inputs). Each master may be an independent output having a particular bit-width. For example, each master included in a memory mapped interface may be an independent AXI master. Each slave may be an independent input having a particular bit-width. For example, each slave included in a memory mapped interface may be an independent AXI slave.

In the example of FIG. 3, memory mapped switch 332 includes memory mapped interfaces 320, 322, 342, 344, and 346. It should be appreciated that memory mapped switch 332 may include additional or fewer memory mapped interfaces. For example, for each component of a DPE that may be read and/or written using memory mapped switch 332, memory mapped switch 332 may include a memory mapped interface coupled to such component. Further, the component itself may include a memory mapped interface coupled to the corresponding memory mapped interface in memory mapped switch 332 to facilitate reading and/or writing of memory addresses.

Memory mapped interfaces 320 and 322 may be used to exchange configuration, control, and debugging data for DPE 204. In the example of FIG. 3, memory mapped interface 320 is capable of receiving configuration data that is used to configure DPE 204. Memory mapped interface 320 may receive configuration data from a DPE located below DPE 204 and/or from SoC interface block 104. Memory mapped interface 322 is capable of forwarding configuration data received by memory mapped interface 320 to one or more other DPEs above DPE 204, to core 302 (e.g., to program memory 308 and/or to configuration registers 324), to memory module 304 (e.g., to memory within memory module 304 and/or to configuration registers 336), and/or to configuration registers 334 within stream switch 326.

In particular embodiments, memory mapped interface 320 communicates with a DPE or tile of SoC interface block 104 below to be described herein. Memory mapped interface 322 communicates with a DPE above. Referring again to FIG. 2 and using DPE 204-15 as a point of reference, memory mapped interface 320 is coupled to, and capable of, communicating with another memory mapped interface located in the DPE interconnect of DPE 204-5. Memory mapped interface 322 is coupled to, and capable of, communicating with another memory mapped interface located in the DPE interconnect of DPE 204-25. In one or more embodiments, memory mapped switch 332 conveys control, and/or debug data above and/or below to a DPE or tile of SoC interface block 104 (e.g., in the vertical direction).

Memory mapped interface 346 may be coupled to a memory mapped interface (not shown) in memory module 304 to facilitate reading and/or writing of configuration registers 336 and/or memory within memory module 304. Memory mapped interface 344 may be coupled to a memory mapped interface (not shown) in core 302 to facilitate reading and/or writing of program memory 308 and/or configuration registers 324. Memory mapped interface 342 may be coupled to configuration registers 334 to read and/or write to configuration register 334.

In the example of FIG. 3, memory mapped switch 332 is capable of communicating with circuitry above and below. In one or more other embodiments, memory mapped switch 332 includes additional memory mapped interfaces that are coupled to memory mapped interfaces of memory mapped switches of DPEs to the left and/or to the right. Using DPE 204-15 as a point of reference, such additional memory mapped interfaces may connect to memory mapped switches located in DPE 204-14 and/or DPE 204-16 thereby facilitating communication of configuration, control, and debug data among DPEs in the horizontal direction as well as the vertical direction.

In other embodiments, memory mapped switch 332 may include additional memory mapped interfaces connected to memory mapped switches in DPEs that are diagonal relative to DPE 204. For example, using DPE 204-15 as a point of reference, such additional memory mapped interfaces may be coupled to memory mapped switches located in DPE 204-24, 204-26, 204-4, and/or 204-6 thereby facilitating communication of configuration, control, and debug information among DPEs diagonally.

DPE interconnect 306 is coupled to the DPE interconnect of each neighboring DPE and/or tile of the SoC interface block 104 depending upon the location of DPE 204. Taken collectively, DPE interconnects of DPEs 204 form a DPE interconnect network (which may include the stream network and/or the memory mapped network). The configuration registers of the stream switches of each DPE may be programmed by loading configuration data through the memory mapped switches. Through configuration, the stream switches and/or stream interfaces are programmed to establish connections, whether packet-switched or circuit-switched, with other endpoints, whether in one or more other DPEs 204 and/or in one or more tiles of SoC interface block 104.

In one or more embodiments, DPE array 102 is mapped to the address space of a processor system such as PS 212. Accordingly, any configuration registers and/or memories within DPE 204 may be accessed via a memory mapped interface. For example, memory in memory module 304, program memory 308, configuration registers 324 in core 302, configuration registers 336 in memory module 304, and/or configuration registers 334 in the stream switch 326 may be read and/or written via memory mapped switch 332.

In the example of FIG. 3, memory mapped interfaces are capable of receiving configuration data for DPE 204. The configuration data may include program code that is loaded into program memory 308 (if included), configuration data for loading into configuration registers 324, 334, and/or 336, and/or data to be loaded into memory (e.g., memory banks) of memory module 304. In the example of FIG. 3, configuration registers 324, 334, and 336 are shown as being located within the particular circuit structures that the configuration registers are intended to control, e.g., core 302, stream switch 326, and memory module 304, respectively. The example of FIG. 3 is for purposes of illustration and illustrates that elements within core 302, memory module 304, and/or stream switch 326 may be programmed by way of loading configuration data into the corresponding configuration registers. In other embodiments, the configuration registers may be consolidated within a particular region of DPE 204 despite controlling operation of components distributed throughout DPE 204.

Accordingly, stream switch 326 may be programmed by loading configuration data into configuration registers 334. The configuration data programs stream switch 326 and/or stream interfaces 310-316 and/or 328, 330 to operate as circuit-switching stream interfaces between two different DPEs and/or other subsystems or as packet-switching stream interfaces coupled to selected DPEs and/or other subsystems. Thus, connections established by stream switch 326 to other stream interfaces are programmed by loading suitable configuration data into configuration registers 334 to establish actual connections or application data paths within DPE 204, with other DPEs, and/or with other subsystems of device 100.

Figure 4:
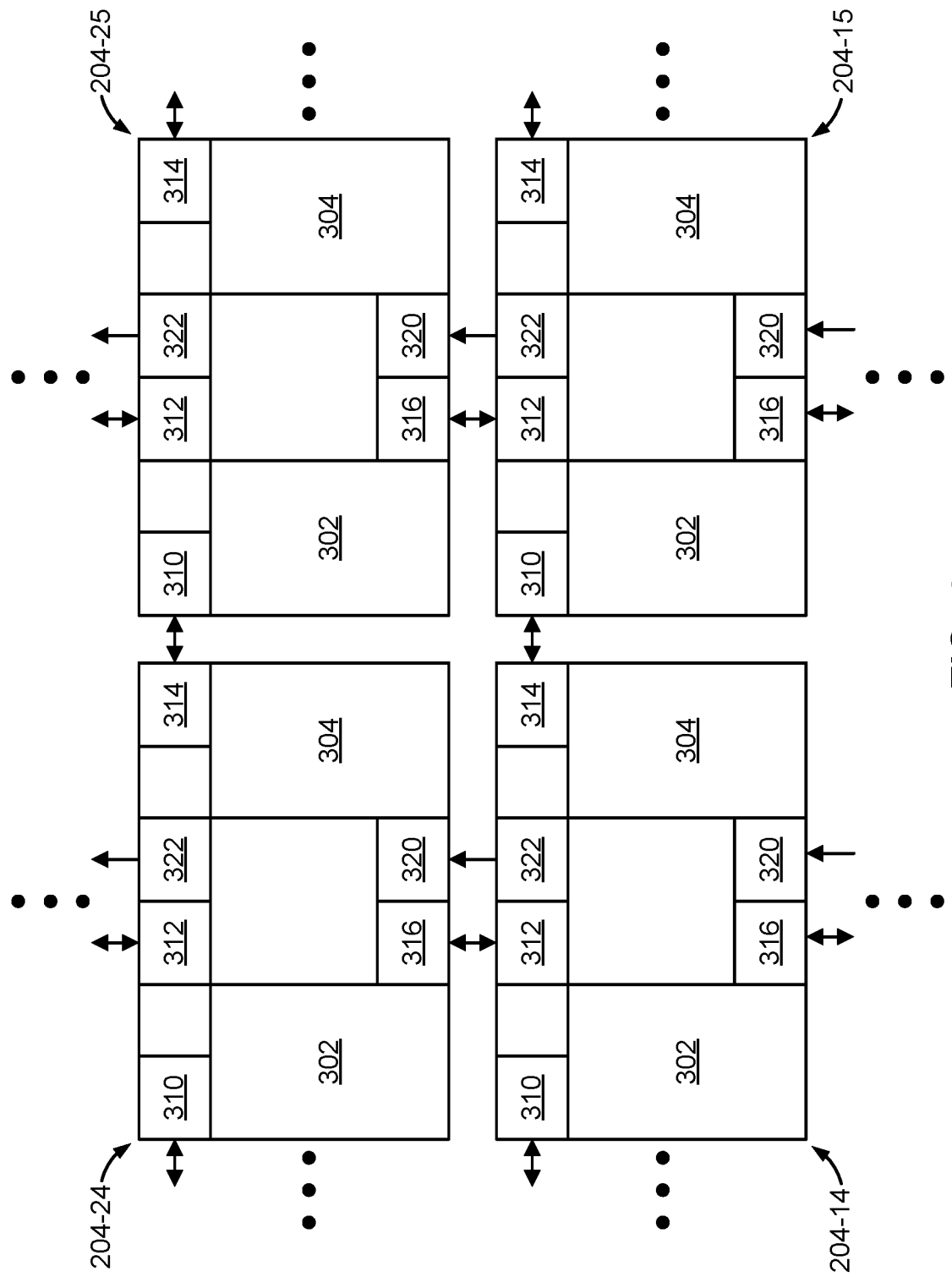
FIG. 4 illustrates example connectivity between multiple DPEs.

FIG. 4 illustrates example connectivity between multiple DPEs 204. In the example of FIG. 4, the architecture illustrated in FIG. 3 is used to implement each of DPEs 204-14, 204-15, 204-24, and 204-25. FIG. 4 illustrates an embodiment where stream interfaces are interconnected among neighboring DPEs (on each side and above and below) and where memory mapped interfaces are connected to DPEs above and below. For purposes of illustration, the stream switches and the memory mapped switches are not shown.

As noted, in other embodiments, additional memory mapped interfaces may be included to couple DPEs in the vertical direction as pictured and in the horizontal direction. Further, memory mapped interfaces may support bi-directional communication in the vertical and/or horizontal directions.

Memory mapped interfaces 320 and 322 are capable of implementing a shared, transaction switched network where transactions propagate from memory mapped switch to memory mapped switch. Each of the memory mapped switches, for example, is capable of dynamically routing transactions based upon addresses. Transactions may be stalled at any given memory mapped switch. Memory mapped switches allow other subsystems of device 100 to access resources (e.g., components) of DPEs 204.

In particular embodiments, subsystems of device 100 are capable of reading the internal state of any register and/or memory element of a DPE via memory mapped switches, which include memory mapped interfaces 320 and/or 322. Through memory mapped switches, which include memory mapped interfaces 320 and/or 322, subsystems of device 100 are capable of reading and/or writing to program memory 308 and to any configuration registers within DPEs 204.

Stream interfaces 310-316 (e.g., stream switch 326) are capable of providing deterministic throughput with a guaranteed and fixed latency from source to destination. In one or more embodiments, stream interfaces 310 and 314 are capable of receiving four 32-bit streams and outputting four 32-bit streams. In one or more embodiments, stream interface 314 is capable of receiving four 32-bit streams and outputting six 32-bit streams. In particular embodiments, stream interface 316 is capable of receiving four 32-bit streams and outputting four 32-bit streams. The numbers of streams and sizes of the streams of each stream interface are provided for purposes of illustration and are not intended as limitations.

Figure 5:
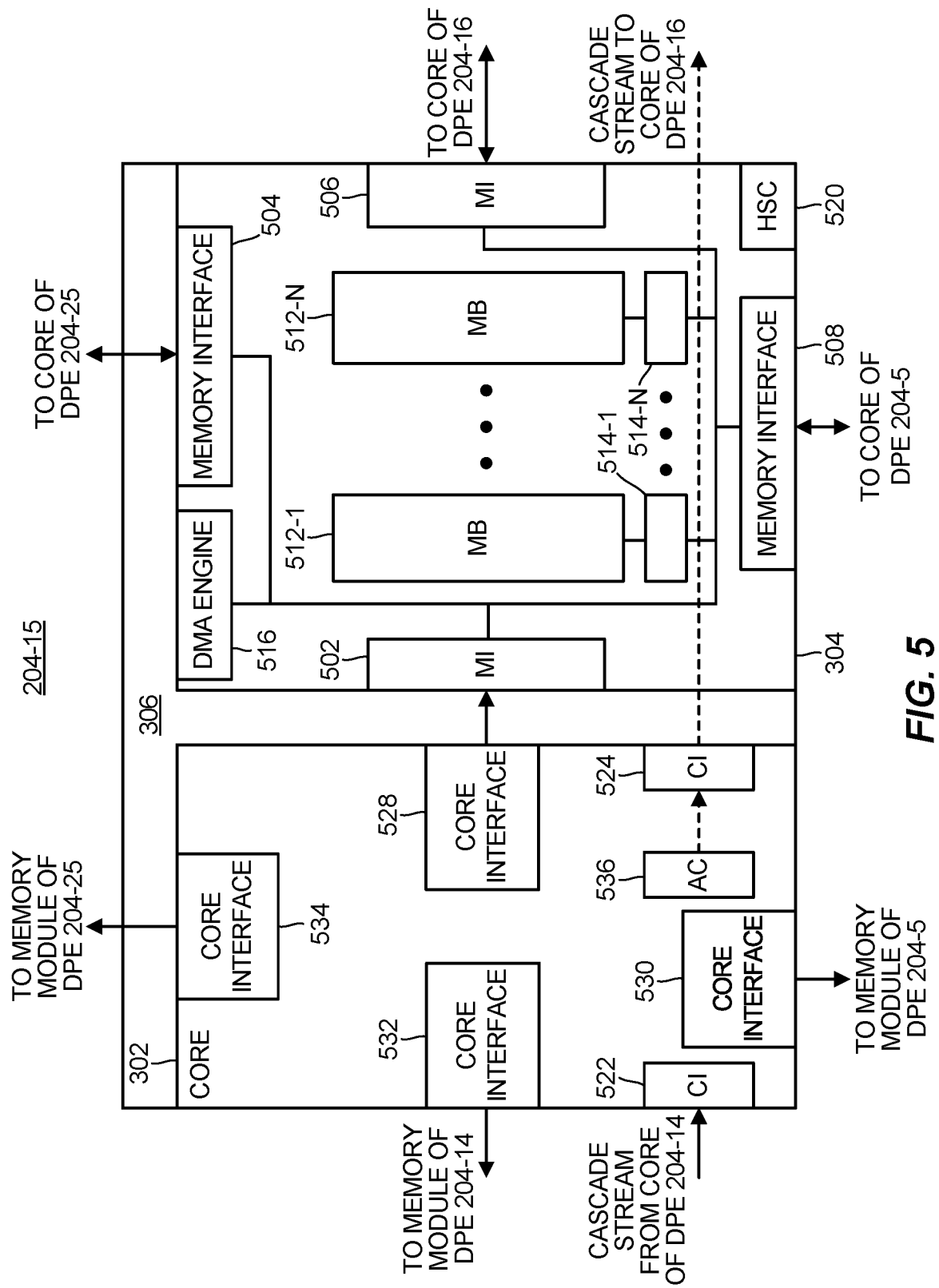
FIG. 5 illustrates further aspects of the example DPE architecture of FIG. 3.

FIG. 5 illustrates further aspects of the example architecture of FIG. 3. In the example of FIG. 5, details relating to DPE interconnect 306 are not shown. FIG. 5 illustrates connectivity of core 302 with other DPEs through shared memory. FIG. 5 also illustrates additional aspects of memory module 304. For purposes of illustration, FIG. 5 refers to DPE 204-15.

As pictured, memory module 304 includes a plurality of memory interfaces 502, 504, 506, and 508. Within FIG. 5, memory interfaces 502 and 508 are abbreviated as "MI." Memory module 304 further includes a plurality of memory banks 512-1 to 512-N. In particular embodiments, memory module 304 includes eight memory banks. In other embodiments, memory module 304 may include fewer or more memory banks 512. In one or more embodiments, each memory bank 512 is single-ported thereby allowing up to one access to each memory bank each clock cycle. In the case where memory module 304 includes eight memory banks 512, such a configuration supports eight parallel accesses each clock cycle. In other embodiments, each memory bank 512 is dual-ported or multi-ported thereby allowing a larger number of parallel accesses each clock cycle.

In one or more embodiments, memory module 304 is capable of supporting one or more error detection and/or error correction mechanisms. For example, memory banks 512 may be implemented to support parity checking through the addition of parity bits. In another example, memory banks 512 may be ECC memory that are capable of detecting and correcting various types of data corruption. In another example, memory banks 512 may support both ECC and parity checking. The different types of error detection and/or error correction described herein are provided for purposes illustration and are not intended to be limiting of the embodiments described. Other error detection and/or error correction technologies may be used with memory module 304 other than those listed.

In one or more other embodiments, error detection and/or error correction mechanisms may be implemented on a per-memory bank 512 basis. For example, one or more of memory banks 512 may include parity checking, while one or more other ones of memory banks 512 may be implemented as ECC memory. Still, other ones of memory banks 512 may support both ECC and parity checking. As such, different combinations of error detection and/or error correction may be supported by different memory banks 512 and/or combinations of memory banks 512.

In the example of FIG. 5, each of memory banks 512-1 through 512-N has a respective arbiter 514-1 through 514-N. Each of arbiters 514 is capable of generating a stall signal in response to detecting conflicts. Each arbiter 514 may include arbitration logic. Further, each arbiter 514 may include a crossbar. Accordingly, any master is capable of writing to any particular one or more of memory banks 512. As noted in connection with FIG. 3, memory module 304 may include a memory mapped interface (not shown) that communicates with memory mapped interface 346 of memory mapped switch 332. The memory mapped interface in memory module 304 may be connected to the communication lines in memory module 304 that couple direct memory access (DMA) engine 516, memory interfaces 502, 504, 506, and 508, and arbiters 514 in order to read and/or write to memory bank 512.

Memory module 304 further includes DMA engine 516. In one or more embodiments, DMA engine 516 includes at least two interfaces. For example, one or more interfaces are capable of receiving input data streams from DPE interconnect 306 and writing the received data to memory banks 512. One or more other interfaces are capable of reading data from memory banks 512 and sending the data out via a stream interface of DPE interconnect 306. For example, DMA engine 516 may include stream interface 340 of FIG. 3.

Memory module 304 is capable of operating as a shared memory that may be accessed by a plurality of different DPEs. In the example of FIG. 5, memory interface 502 is coupled to core 302 via core interface 528 included in core 302. Memory interface 502 provides core 302 with access to memory banks 512 through arbiters 514. Memory interface 504 is coupled to the core of DPE 204-25. Memory interface 504 provides the core of DPE 204-25 with access to memory banks 512. Memory interface 506 is coupled to the core of DPE 204-16. Memory interface 506 provides the core of DPE 204-16 with access to memory banks 512. Memory interface 508 is coupled to the core of DPE 204-5. Memory interface 508 provides the core of DPE 204-5 with access to memory banks 512. Accordingly, in the example of FIG. 5, each DPE that has a shared boundary with memory module 304 of DPE 204-15 is capable of reading and writing to memory banks 512. In the example of FIG. 5, the core of DPE 204-14 does not have direct access to memory module 304 of DPE 204-15.

Memory mapped switch 332 is capable of writing data to memory banks 512. For example, memory mapped switch 332 may be coupled to a memory mapped interface (not shown) located in memory module 304 that is in turn coupled to arbiters 514. As such, the particular data stored in memory module 304 may be controlled, e.g., written, as part of a configuration, control, and/or debugging process.

Core 302 is capable of accessing memory modules of other neighboring DPEs via core interfaces 530, 532, and 534. In the example of FIG. 5, core interface 534 is coupled to a memory interface of DPE 204-25. Accordingly, core 302 is capable of accessing the memory module of DPE 204-25 via core interface 534 and the memory interface contained within the memory module of DPE 204-25. Core interface 532 is coupled to a memory interface of DPE 204-14. Accordingly, core 302 is capable of accessing the memory module of DPE 204-14 via core interface 532 and the memory interface contained within the memory module of DPE 204-14. Core interface 530 is coupled to a memory interface within DPE 204-5. Accordingly, core 302 is capable of accessing the memory module of DPE 204-5 via core interface 530 and the memory interface contained within the memory module of DPE 204-5. As discussed, core 302 is capable of accessing memory module 304 within DPE 204-15 via core interface 528 and memory interface 502.

In the example of FIG. 5, core 302 is capable of reading and writing to any of the memory modules of DPEs that share a boundary with core 302 in DPE 204-15 (e.g., DPEs 204-25, 204-14, and 204-5). In one or more embodiments, core 302 is capable of viewing the memory modules within DPEs 204-25, 204-15, 204-14, and 204-5 as a single, contiguous memory. Core 302 is capable of generating addresses for reads and writes presuming this contiguous memory model. Core 302 is capable of directing the read and/or write requests to the appropriate core interface 528, 530, 532, and/or 534 based upon the addresses that are generated.

In one or more other embodiments, memory module 304 includes additional memory interfaces that may be coupled to other DPEs. For example, memory module 304 may include memory interfaces that are coupled to cores of DPEs 204-24, 204-26, 204-4, and/or 204-5. In one or more other embodiments, memory module 304 may include one or more memory interfaces that are used to connect to cores of DPEs that are not neighboring DPEs. For example, such additional memory interface(s) may be connected to cores of DPEs separated from DPE 204-15 by one or more other DPEs in a same row, in a same column, or in a diagonal direction. As such, the number of memory interfaces in memory module 304 and the particular DPEs to which such memory interfaces are connected as illustrated in FIG. 5 are for purposes of illustration and not limitation.

As noted, core 302 is capable of mapping read and/or write operations in the correct direction through core interface 528, 530, 532, and/or 534 based upon the addresses of such operations. When core 302 generates an address for a memory access, core 302 is capable of decoding the address to determine the direction (e.g., the particular DPE to be accessed) and forwards the memory operation to the correct core interface in the determined direction.

Accordingly, core 302 is capable of communicating with the core of DPE 204-25 via a shared memory which may be the memory module within DPE 204-25 and/or memory module 304 of DPE 204-15. Core 302 is capable of communicating with the core of DPE 204-14 via a shared memory which is the memory module within DPE 204-14. Core 302 is capable of communicating with the core of DPE 204-5 via a shared memory which may be the memory module within DPE 204-5 and/or memory module 304 of DPE 204-15. Further, core 302 is capable of communicating with the core of DPE 204-16 via a shared memory which is memory module 304 within DPE 204-15.

As discussed, DMA engine 516 may include one or more stream-to-memory interfaces (e.g., stream interface 340). Through DMA engine 516, application data may be received from other sources within device 100 and stored in memory module 304. For example, data may be received from other DPEs that do and/or do not share a boundary with DPE 204-15 by way of stream switch 326. Data may also be received from other subsystems of device 100 (e.g., NoC 208, hardwired circuit blocks, PL 210, and/or PS 212) by way of SoC interface block 104 through the stream switches of the DPEs. DMA engine 516 is capable of receiving such data from the stream switches and writing the data to an appropriate memory bank or memory banks 512 within memory module 304.

DMA engine 516 may include one or more memory-to-stream interfaces (e.g., stream interface 330). Through DMA engine 516, data may be read from memory bank or memory banks 512 of memory module 304 and sent to other destinations via the stream interfaces. For example, DMA engine 516 is capable of reading data from memory module 304 and sending such data to other DPEs that do and/or do not share a boundary with DPE 204-15 by way of the stream switches. DMA engine 516 is also capable of sending such data to other subsystems (e.g., NoC 208, hardwired circuit blocks, PL 210, and/or PS 212) by way of the stream switches and SoC interface block 104.

In one or more embodiments, DMA engine 516 may be programmed by memory mapped switch 332 within DPE 204-15. For example, DMA engine 516 may be controlled by configuration registers 336. Configuration registers 336 may be written using memory mapped switch 332 of DPE interconnect 306. In particular embodiments, DMA engine 516 may be controlled by the stream switch 326 within DPE 204-15. For example, DMA engine 516 may include control registers that may be written by stream switch 326 connected thereto (e.g., via stream interface 340). Streams received via stream switch 326 within DPE interconnect 306 may be connected to DMA engine 516 in memory module 304 and/or directly to core 302 depending upon the configuration data loaded into configuration registers 324, 334, and/or 336. Streams may be sent from DMA engine 516 (e.g., memory module 304) and/or core 302 depending upon the configuration data loaded into configuration registers 324, 334, and/or 336.

Memory module 304 further may include hardware synchronization circuitry 520 (abbreviated as "HSC" in FIG. 5). In general, hardware synchronization circuitry 520 is capable of synchronizing operation of different cores (e.g., cores of neighboring DPEs), core 302, DMA engine 516, and other external masters (e.g., PS 212) that may communicate via DPE interconnect 306. As an illustrative and non-limiting example, hardware synchronization circuitry 520 is capable of synchronizing two different cores in different DPEs accessing the same, e.g., a shared, buffer in memory module 304.

In one or more embodiments, hardware synchronization circuitry 520 may include a plurality of different locks. The particular number of locks included in hardware synchronization circuitry 520 may depend upon the number of entities able to access memory modules, but is not intended as a limitation. In particular embodiments, each different hardware lock may have an arbiter that is capable of handling simultaneous requests. Further, each hardware lock is capable of handling a new request each clock cycle. Hardware synchronization circuitry 520 may have a plurality of requestors such as core 302, the core from each of DPEs 204-25, 204-16, and 204-5, DMA engine 516, and/or a master that communicates via DPE interconnect 306. A requestor, for example, acquires a lock on a particular portion of memory in a memory module from the local hardware synchronization circuitry prior to accessing the portion of memory. The requestor may release the lock so that another requestor may acquire the lock prior to accessing the same portion of memory.

In one or more embodiments, hardware synchronization circuitry 520 is capable of synchronizing access by a plurality of cores to memory module 304 and, more particularly, to memory banks 512. For example, hardware synchronization circuitry 520 is capable of synchronizing access of core 302 illustrated in FIG. 5, the core of DPE 204-25, the core of DPE 204-16, and the core of DPE 204-5 to memory module 304 of FIG. 5. In particular embodiments, hardware synchronization circuitry 520 is capable of synchronizing access to memory banks 512 for any cores that are capable of directly accessing memory module 304 via memory interfaces 502, 504, 506, and/or 508. Each core that is capable of accessing memory module 304 (e.g., core 302 of FIG. 5 and the core of one or more of the neighboring DPEs), for example, may access hardware synchronization circuitry 520 to request and acquire a lock prior to accessing a particular portion of memory in memory module 304 and subsequently release the lock so as to allow another core to access the portion of memory once that core acquires a lock. In a similar manner, core 302 is capable of accessing hardware synchronization circuitry 520, the hardware synchronization circuitry within DPE 204-14, the hardware synchronization circuitry within DPE 204-25, and the hardware synchronization circuitry within DPE 204-5 to request and acquire a lock in order to access a portion of memory in the memory module of each respective DPE and subsequently release the lock. Hardware synchronization circuitry 520 effectively manages operation of the shared memory between DPEs by regulating and synchronizing access to the memory modules of the DPEs.

Hardware synchronization circuitry 520 may also be accessed via the memory mapped switch 332 of DPE interconnect 306. In one or more embodiments, a lock transaction is implemented as an atomic acquire (e.g., test if unlock and set lock) and release (e.g., unset lock) operation for a resource. Locks of hardware synchronization circuitry 520 provide a way to efficiently transfer ownership of a resource between two participants. The resource can be any of a variety of circuit components such as a buffer in local memory (e.g., a buffer in memory module 304).

While hardware synchronization circuitry 520 is capable of synchronizing access to memory to support communication through shared memory, hardware synchronization circuitry 520 is also capable of synchronizing any of a variety of other resources and/or agents including other DPEs and/or other cores. For example, since hardware synchronization circuitry 520 provides a shared pool of locks, the locks may be used by a DPE, e.g., a core of a DPE, to start and/or stop operation of another DPE or core. The locks of hardware synchronization circuitry 520 may be allocated, e.g., based upon configuration data, for different purposes such as synchronizing different agents and/or resources as may be required depending upon the particular application(s) implemented by DPE array 102.

In particular embodiments, DPE access and DMA access to the locks of hardware synchronization circuitry 520 are blocking. Such accesses are capable of stalling the requesting core or the DMA engine in cases where a lock cannot be immediately acquired. Once the hardware lock becomes available, the core or DMA engine acquires the lock and un-stalls automatically.

In an embodiment, memory mapped accesses may be non-blocking such that a memory mapped master is capable of polling the status of the locks of hardware synchronization circuitry 520. For example, a memory mapped switch can send a lock "acquire" request as a normal memory read operation to hardware synchronization circuitry 520. The read address may encode the identifier of the lock and other request data. The read data, e.g., response to the read request, may signal the success of the acquire request operation. The "acquire" sent as a memory read may be sent in a loop until successful. In another example, hardware synchronization circuitry 520 can issue an event such that the memory mapped master receives an interrupt when the status of the requested lock changes.

Accordingly, when two neighboring DPEs share a data buffer through memory module 304, hardware synchronization circuitry 520 within the particular memory module 304 that includes the buffer synchronizes the accesses. Typically, but not necessarily, the memory block may be double buffered to improve throughput.

In the case where two DPEs are not neighbors, the two DPEs do not have access to a common memory module. In that case, application data may be transferred via a data stream (the terms "data stream" and "stream" may be used interchangeably from time-to-time within this disclosure). As such, the local DMA engine is capable of converting the transfer from a local memory based transfer to a stream-based transfer. In that case, core 302 and DMA engine 516 are capable of synchronizing using hardware synchronization circuitry 520.

Core 302 further is capable of accessing hardware synchronization circuitry, e.g., locks of the hardware synchronization circuitry, of neighboring DPEs to facilitate communication by shared memories. As such, the hardware synchronization circuitry in such other or neighboring DPEs is capable of synchronizing access to resources, e.g., memory, between cores of neighboring DPEs.

PS 212 is capable of communicating with core 302 via memory mapped switch 332. PS 212, for example, is capable of accessing memory module 304 and hardware synchronization circuitry 520 by initiating memory reads and writes. In another embodiment, hardware synchronization circuitry 520 may also send an interrupt to PS 212 when status of a lock changes to avoid polling by PS 212 of hardware synchronization circuitry 520. PS 212 is also capable of communicating with DPE 204-15 via the stream interfaces.

The examples provided herein relating to entities sending memory mapped requests and/or transfers are for purposes of illustration and not limitation. In particular embodiments, any entity that is external to DPE array 102 is capable of sending memory mapped requests and/or transfers. For example, a circuit block implemented in PL 210, an ASIC, or other circuitry as described herein external to DPE array 102 is capable of sending memory mapped requests and/or transfers to DPEs 204 and accessing hardware synchronization circuitry of the memory module(s) within such DPEs.

In addition to communicating with neighboring DPEs through shared memory modules and neighboring and/or non-neighboring DPEs via DPE interconnect 306, core 302 may include cascade interfaces. In the example of FIG. 5, core 302 includes cascade interfaces 522 and 524 (abbreviated as "CI" in FIG. 5). Cascade interfaces 522 and 524 are capable of providing direct communication with other cores. As pictured, cascade interface 522 of core 302 receives an input data stream directly from the core of DPE 204-14. The data stream received via cascade interface 522 may be provided to the data processing circuitry within core 302. Cascade interface 524 of core 302 is capable of sending an output data stream directly to the core of DPE 204-16.

In the example of FIG. 5, each of cascade interface 522 and cascade interface 524 may include a first-in-first-out (FIFO) interface for buffering. In particular embodiments, cascade interfaces 522 and 524 are capable of conveying data streams that may be hundreds of bits in width. The particular bit width of cascade interfaces 522 and 524 is not intended as a limitation. In the example of FIG. 5, cascade interface 524 is coupled to an accumulator register 536 (abbreviated as "AC" within FIG. 5) within core 302. Cascade interface 524 is capable of outputting the contents of accumulator register 536 and may do so each clock cycle. Accumulator register 536 may store data that is generated and/or being operated upon by data processing circuitry within core 302.

In the example of FIG. 5, cascade interfaces 522 and 524 may be programmed based upon configuration data loaded into configuration registers 324. For example, based upon configuration registers 324, cascade interface 522 may be activated or deactivated. Similarly, based upon configuration registers 324, cascade interface 524 may be activated or deactivated. Cascade interface 522 may be activated and/or deactivated independently of cascade interface 524.

In one or more other embodiments, cascade interfaces 522 and 524 are controlled by core 302. For example, core 302 may include instructions to read/write to cascade interfaces 522 and/or 524. In another example, core 302 may include hardwired circuitry that is capable of reading and/or writing to cascade interfaces 522 and/or 524. In particular embodiments, cascade interfaces 522 and 524 may be controlled by an entity outside of core 302.

Within the embodiments described within this disclosure, DPEs 204 do not include cache memories. By omitting cache memories, DPE array 102 is capable of achieving predictable, e.g., deterministic, performance. Further, significant processing overhead is avoided since maintaining coherency among cache memories located in different DPEs is not required.

In accordance with one or more embodiments, cores 302 of DPEs 204 do not have input interrupts. Thus, cores 302 of DPEs 204 are capable of operating uninterrupted. Omitting input interrupts to cores 302 of DPEs 204 also allows DPE array 102 to achieve predictable, e.g., deterministic, performance.

In cases where one or more DPEs 204 communicate with an external agent implemented in PS 212, PL 210, a hardwired circuit block, and/or in another subsystem of device 100 (e.g., an ASIC) through a shared buffer in an external read-write (e.g., DDR) memory, coherency mechanisms may be implemented using a coherency interconnect in PS 212. In these scenarios, the application data transfer between DPE array 102 and the external agent may traverse both NoC 208 and/or PL 210.

In one or more embodiments, DPE array 102 may be functionally isolated into a plurality of groups of one or more DPEs. For example, specific memory interfaces may be enabled and/or disabled via configuration data to create one or more groups of DPEs, where each group includes one or more (e.g., a subset) of DPEs of DPE array 102. In another example, the stream interfaces may be configured independently per group so as to communicate with other cores of DPEs in the group and/or with a designated input source and/or output destination.

In one or more embodiments, core 302 is capable of supporting debug functions via the memory mapped interfaces. As discussed, program memory 308, memory module 304, core 302, DMA engine 516, stream switch 326, and other components of DPEs are memory mapped. The memory mapped registers may be read and/or written by any source that can produce memory mapped requests such as, for example, PS 212, PL 210, and/or a platform management controller within the IC. The requests may travel through SoC interface block 104 to the intended, or target, DPE within DPE array 102.

Via the memory mapped switch within a DPE, functions such as suspending the core, resuming the core, single-stepping the core, and/or resetting the core may be performed. Further, such operations may be initiated for a plurality of different DPEs. Other example debug operations that may be performed include, for example, reading status and/or setting the state of hardware synchronization circuitry 520 and/or DMA engine 516 via the memory mapped interfaces described herein.

In one or more embodiments, the stream interfaces of DPEs are capable of generating trace information that may be output from DPE array 102. Stream interfaces, for example, may be configured to extract trace information from DPE array 102. Trace information may be generated as packet-switched streams that contain time-stamped data marking event occurrences and/or a limited branch trace of an execution flow. In one aspect, traces generated by DPEs may be pushed to a local trace buffer implemented in PL 210 or to an external RAM using SoC interface block 104 and NoC 208. In another aspect, traces generated by DPEs may be sent to a debugging subsystem implemented on-chip.

In particular embodiments, each core 302 and memory module 304 of each DPE may include an additional stream interface that is capable of outputting trace data directly to stream switch 326. The stream interfaces for trace data may be in addition to those already discussed. Stream switch 326 may be configured to direct trace data onto a packet-switched stream such that trace information from multiple cores and memory modules of different DPEs can travel on a single data stream. As noted, the stream portion of the DPE interconnect network can be configured to send trace data to an on-chip debugging system via PL 210, to external memory via SoC interface block 104, or directly to gigabit transceivers via NoC 208. Examples of different types of trace streams that may be generated include program counter (PC) trace streams that produce the PC value at branch instructions as opposed to each change in the PC and application data trace streams including intermediate results within DPEs (e.g., from cores and/or memory modules via the respective trace data streams).

Figure 6:
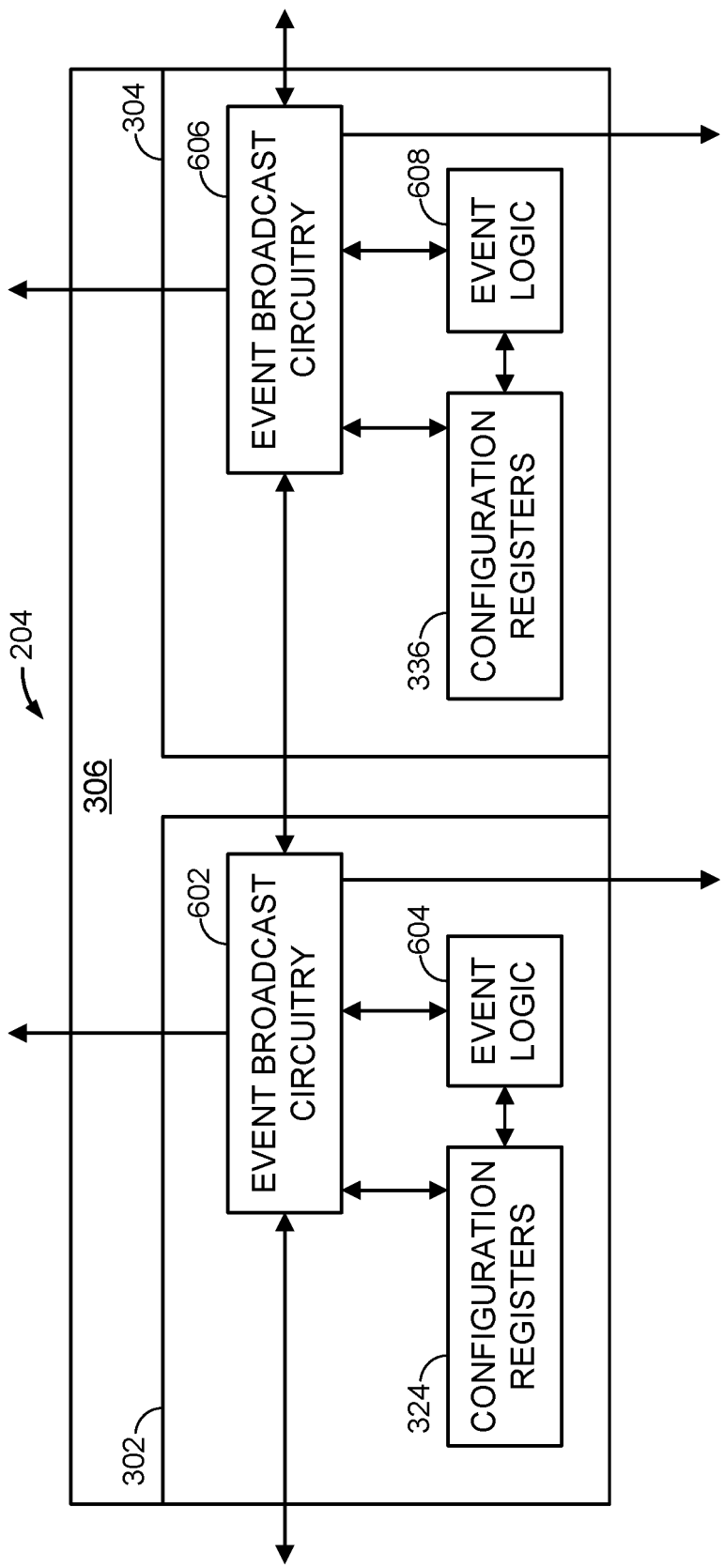
FIG. 6 illustrates an example of event processing circuitry within a DPE.

FIG. 6 illustrates an example of event processing circuitry within a DPE. DPEs may include event processing circuitry that is interconnected to event processing circuitry of other DPEs. In the example of FIG. 6, event processing circuitry is implemented in core 302 and within memory module 304. Core 302 may include event broadcast circuitry 602 and event logic 604. Memory module 304 may include separate event processing circuitry including event broadcast circuitry 606 and event logic 608.

Event broadcast circuitry 602 may be connected to the event broadcast circuitry within each of the cores of the neighboring DPEs above and below the example DPE illustrated in FIG. 6. Event broadcast circuitry 602 may also be connected to the event broadcast circuitry within the memory module of the neighboring DPE to the left of the example DPE illustrated in FIG. 6. As pictured, event broadcast circuitry 602 is connected to event broadcast circuitry 606. Event broadcast circuitry 606 may be connected to the event broadcast circuitry within each of the memory modules of the neighboring DPEs above and below the example DPE illustrated in FIG. 6. Event broadcast circuitry 606 may also be connected to the event broadcast circuitry within the core of the neighboring DPE to the right of the example DPE illustrated in FIG. 6.

In this manner, the event processing circuitry of the DPEs may form an independent event broadcast network within a DPE array. The event broadcast network within the DPE array may exist independently of the DPE interconnect network. Further, the event broadcast network may be individually configurable by loading suitable configuration data into configuration registers 324 and/or 336.

In the example of FIG. 6, event broadcast circuitry 602 and event logic 604 may be configured by configuration registers 324. Event broadcast circuitry 606 and event logic 608 may be configured by configuration registers 336. Configuration registers 324 and 336 may be written via memory mapped switches of DPE interconnect 306. In the example of FIG. 6, configuration registers 324 program event logic 604 to detect particular types of events that occur within core 302. The configuration data loaded into configuration registers 324, for example, determines which of a plurality of different types of predetermined events are detected by event logic 604. Examples of events may include, but are not limited to, starts and/or ends of read operations by core 302, starts and/or ends of write operations by core 302, stalls, and the occurrence of other operations performed by core 302. Similarly, configuration registers 336 program event logic 608 to detect particular types of events that occur within memory module 304. Examples of events may include, but are not limited to, starts and/or ends of read operations by DMA engine 516, starts and/or ends of write operations by DMA engine 516, stalls, and the occurrence of other operations performed by memory module 304. The configuration data loaded into configuration registers 336, for example, determines which of a plurality of different types of predetermined events are detected by event logic 608. It should be appreciated that event logic 604 and/or event logic 608 are capable of detecting events originating from and/or relating to DMA engine 516, memory mapped switch 332, stream switch 326, memory interfaces of memory module 304, core interfaces of core 302, cascade interfaces of core 302, and/or other components located in DPEs.

Configuration registers 324 further are capable of programming event broadcast circuitry 602, while configuration registers 336 are capable of programming event broadcast circuitry 606. For example, the configuration data loaded into configuration registers 324 may determine which of the events received by event broadcast circuitry 602 from other event broadcast circuitries are propagated to yet other event broadcast circuitries and/or to SoC interface block 104. The configuration data may also specify which events generated internally by event logic 604 are propagated to other event broadcast circuitries and/or to SoC interface block 104.

Similarly, the configuration data loaded into configuration registers 336 may determine which of the events received by event broadcast circuitry 606 from other event broadcast circuitries are propagated to yet other event broadcast circuitries and/or to SoC interface block 104. The configuration data may also specify which events generated internally by event logic 608 are propagated to other event broadcast circuitries and/or to SoC interface block 104.

Accordingly, events generated by event logic 604 may be provided to event broadcast circuitry 602 and may be broadcast to other DPEs. In the example of FIG. 6, event broadcast circuitry 602 is capable of broadcasting events, whether internally generated or received from other DPEs, to the DPE above, to the DPE to the left, and to the DPE or SoC interface block 104 below. Event broadcast circuitry 602 is also capable of broadcasting events to event broadcast circuitry 606 within memory module 304.

Events generated by event logic 608 may be provided to event broadcast circuitry 606 and may be broadcast to other DPEs. In the example of FIG. 6, event broadcast circuitry 606 is capable of broadcasting events, whether internally generated or received from other DPEs, to the DPE above, to the DPE to the right, and to the DPE or SoC interface block 104 below. Event broadcast circuitry 606 is also capable of broadcasting events to event broadcast circuitry 602 within core 302.

In the example of FIG. 6, event broadcast circuitries located in cores communicate vertically with event broadcast circuitries located in cores of neighboring DPEs above and/or below. In the case where a DPE is immediately above (or adjacent) SoC interface block 104, the event broadcast circuitry in the core of that DPE is capable of communicating with SoC interface block 104. Similarly, event broadcast circuitry located in memory modules communicate vertically with event broadcast circuitry located in memory modules of neighboring DPEs above and/or below. In the case where a DPE is immediately above (e.g., adjacent) SoC interface block 104, the event broadcast circuitry in the memory module of that DPE is capable of communicating with SoC interface block 104. Event broadcast circuitry is further capable of communicating with the event broadcast circuitry immediately to the left and/or to the right regardless of whether such event broadcast circuitry is located in another DPE and/or within a core or a memory module.

Once configuration registers 324 and 336 are written, event logic 604 and 608 is capable of operating in the background. In particular embodiments, event logic 604 generates events only in response to detecting particular conditions within core 302; and, event logic 608 generates events only in response to detecting particular conditions within memory module 304.

Figure 7:
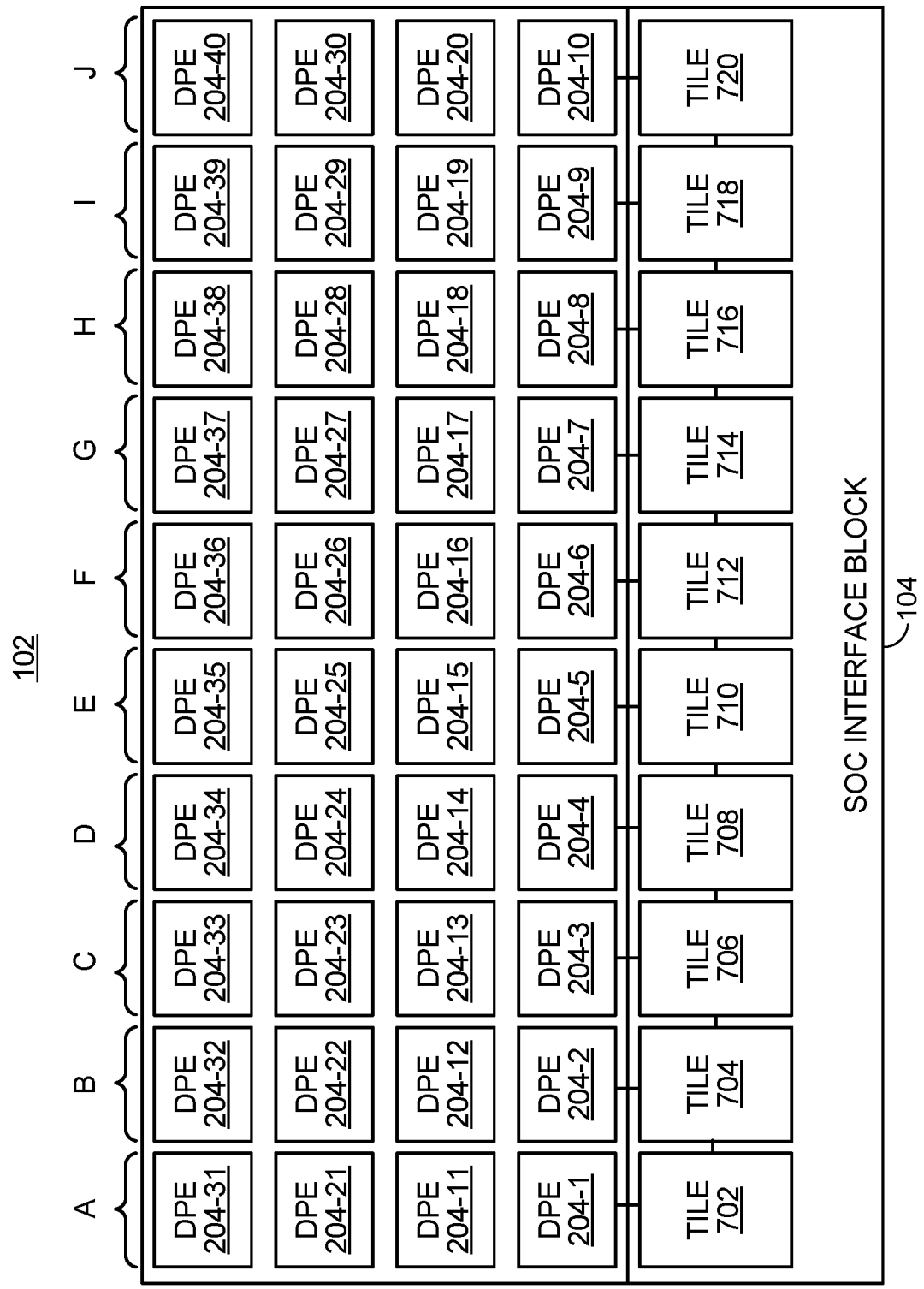
FIG. 7 illustrates an example architecture for a DPE array.

FIG. 7 illustrates an example architecture for DPE array 102 of FIG. 1. In the example of FIG. 7, SoC interface block 104 provides an interface between DPEs 204 and other subsystems of device 100. SoC interface block 104 integrates DPEs into the device. SoC interface block 104 is capable of conveying configuration data to DPEs 204, conveying events from DPEs 204 to other subsystems, conveying events from other subsystems to DPEs 204, generating and conveying interrupts to entities external to DPE array 102, conveying application data between other subsystems and DPEs 204, and/or conveying trace and/or debug data between other subsystems and DPEs 204.

In the example of FIG. 7, SoC interface block 104 includes a plurality of interconnected tiles. For example, SoC interface block 104 includes tiles 702, 704, 706, 708, 710, 712, 714, 716, 718, and 720. In the example of FIG. 7, tiles 702-720 are organized in a row. In other embodiments, tiles may be arranged in a column, in a grid, or in another layout. For example, SoC interface block 104 may be implemented as a column of tiles on the left of DPEs 204, on the right of DPEs 204, between columns of DPEs 204, or the like. In another embodiment, SoC interface block 104 may be located above DPE array 102. SoC interface block 104 may be implemented so that tiles are located in any combination of below DPE array 102, to the left of DPE array 102, to the right of DPE array 102, and/or above DPE array 102. In this regard, FIG. 7 is provided for purposes of illustration and not limitation.

In one or more embodiments, tiles 702-720 have a same architecture. In one or more other embodiments, tiles 702-720 may be implemented with two or more different architectures. In particular embodiments, different architectures may be used to implement tiles within SoC interface block 104 where each different tile architecture supports communication with a different type of subsystem or combination of subsystems of device 100.

In the example of FIG. 7, tiles 702-720 are coupled so that data may be propagated from one tile to another. For example, data may be propagated from tile 702 through tiles 704, 706, and on down the line of tiles to tile 720. Similarly, data may be propagated in the reverse direction from tile 720 to tile 702. In one or more embodiments, each of tiles 702-720 is capable of operating as an interface for a plurality of DPEs. For example, each of tiles 702-720 is capable of operating as an interface for a subset of the DPEs 204 of DPE array 102. The subset of DPEs to which each tile provides an interface may be mutually exclusive such that no DPE is provided with an interface by more than one tile of SoC interface block 104.

In one example, each of tiles 702-720 provides an interface for a column of DPEs 204. For purposes of illustration, tile 702 provides an interface to the DPEs of column A. Tile 704 provides an interface to the DPEs of column B, etc. In each case, the tile includes a direct connection to an adjacent DPE in the column of DPEs, which is the bottom DPE in this example. Referring to column A, for example, tile 702 is directly connected to DPE 204-1. Other DPEs within column A may communicate with tile 702 but do so through the DPE interconnects of the intervening DPEs in the same column.

For example, tile 702 is capable of receiving data from another source such as PS 212, PL 210, and/or another hardwired circuit block, e.g., an ASIC block. Tile 702 is capable of providing those portions of the data addressed to DPEs in column A to such DPEs while sending data addressed to DPEs in other columns (e.g., DPEs for which tile 702 is not an interface) on to tile 704. Tile 704 may perform the same or similar processing where data received from tile 702 that is addressed to DPEs in column B is provided to such DPEs, while sending data addressed to DPEs in other columns on to tile 706, and so on.

In this manner, data may propagate from tile to tile of SoC interface block 104 until reaching the tile that operates as an interface for the DPEs to which the data is addressed (e.g., the "target DPE(s)"). The tile that operates as an interface for the target DPE(s) is capable of directing the data to the target DPE(s) using the memory mapped switches of the DPEs and/or the stream switches of the DPEs.

As noted, the use of columns is an example implementation. In other embodiments, each tile of SoC interface block 104 is capable of providing an interface to a row of DPEs of DPE array 102. Such a configuration may be used in cases where SoC interface block 104 is implemented as a column of tiles, whether on the left, right, or between columns of DPEs 204. In other embodiments, the subset of DPEs to which each tile provides an interface may be any combination of fewer than all DPEs of DPE array 102. For example, DPEs 204 may be apportioned to tiles of SoC interface block 104. The particular physical layout of such DPEs may vary based upon connectivity of the DPEs as established by DPE interconnects. For example, tile 702 may provide an interface to DPEs 204-1, 204-2, 204-11, and 204-12. Another tile of SoC interface block 104 may provide an interface to four other DPEs, and so forth.

Figure 8A:
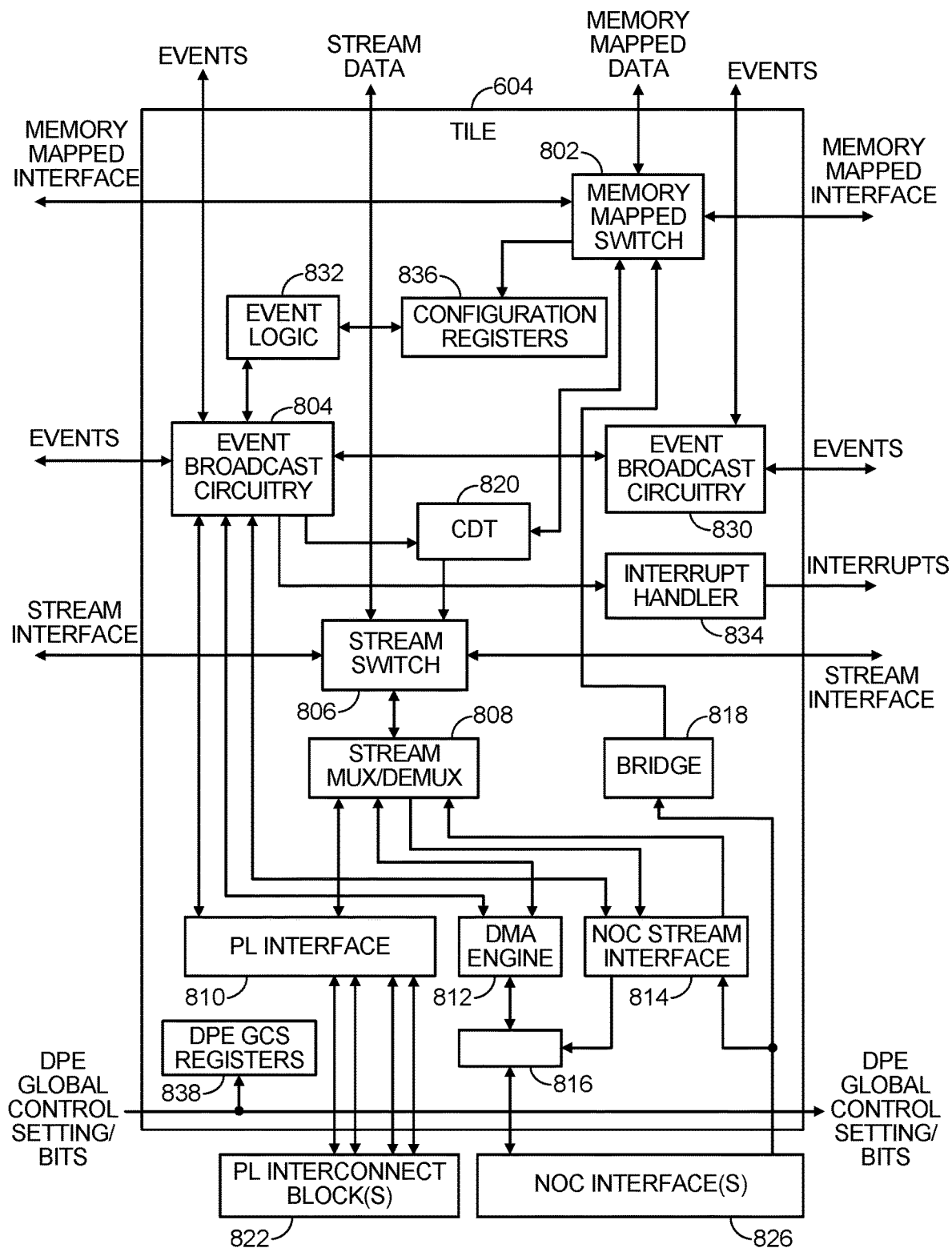
FIGS. 8A, 8B, and 8C illustrate example architectures for implementing tiles of a System-on-Chip (SoC) interface block.
Figure 8B:
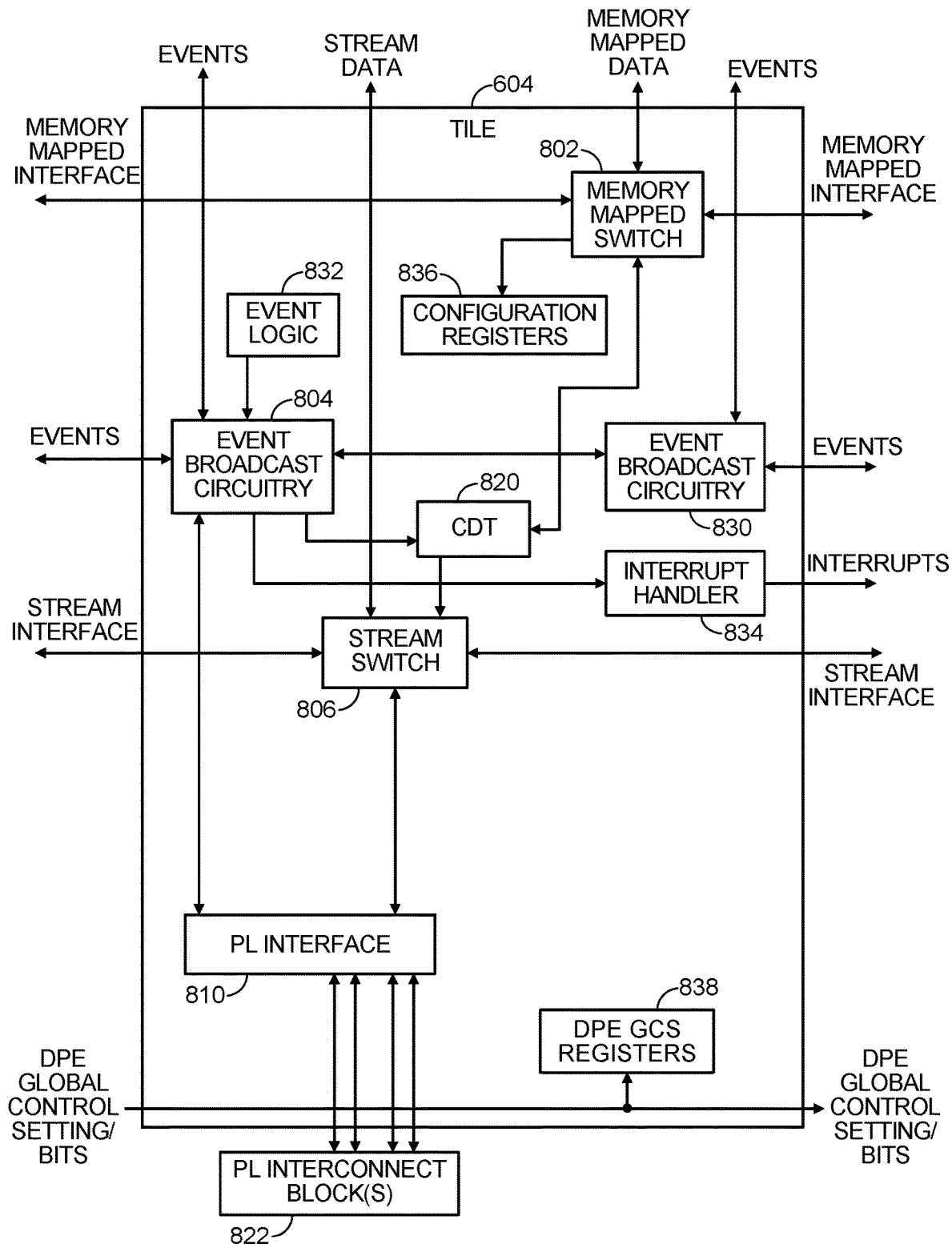
Figure 8C:
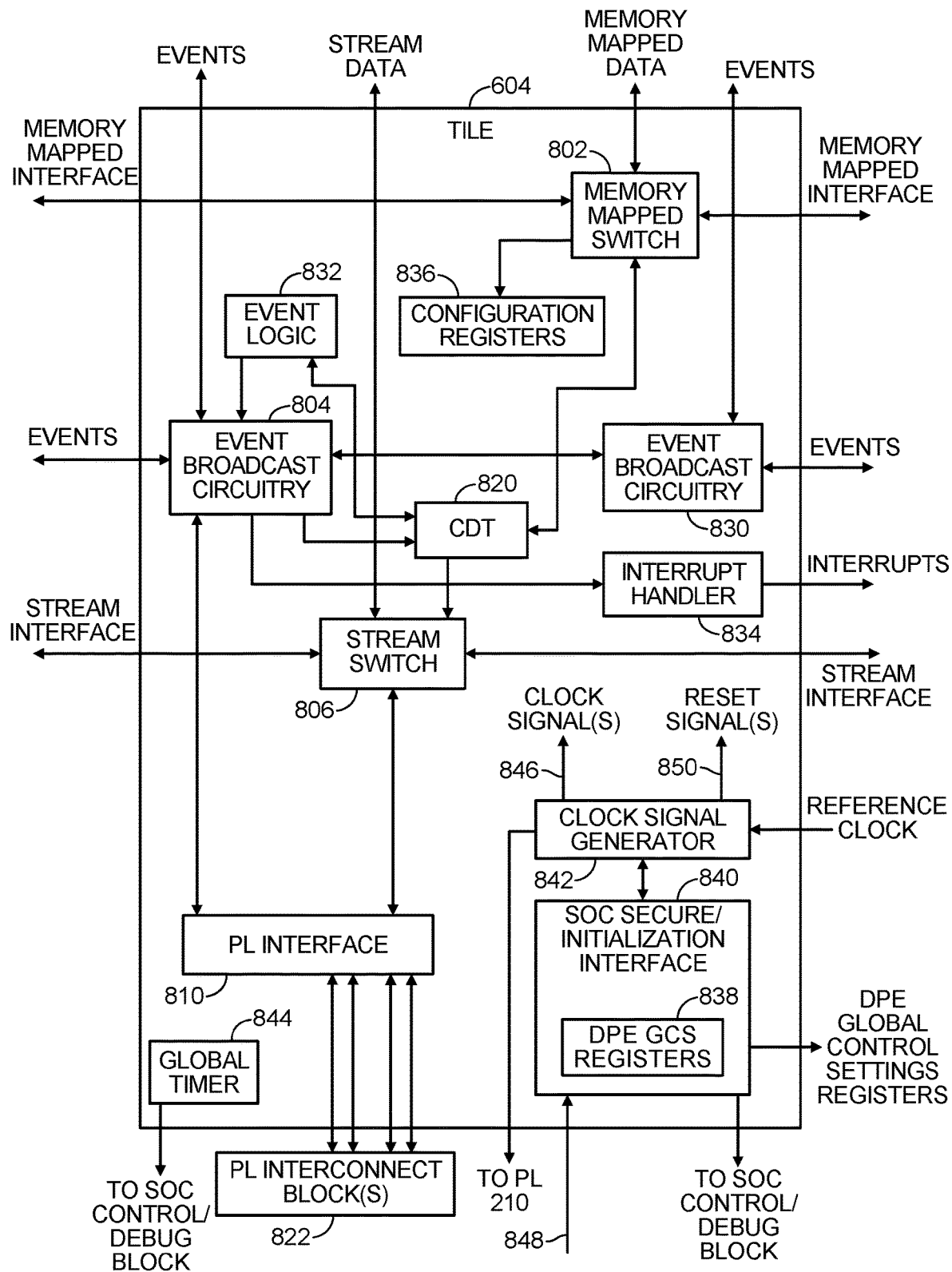

FIGS. 8A, 8B, and 8C illustrate example architectures for implementing tiles of SoC interface block 104. FIG. 8A illustrates an example implementation of tile 704. The architecture illustrated in FIG. 8A may also be used to implement any of the other tiles included in SoC interface block 104.

Tile 704 includes a memory mapped switch 802. Memory mapped switch 802 may include a plurality of memory mapped interfaces for communicating in each of a plurality of different directions. As an illustrative and non-limiting example, memory mapped switch 802 may include one or more memory mapped interfaces where a memory mapped interface has a master that connects vertically to the memory mapped interface of the DPE immediately above. As such, memory mapped switch 802 is capable of operating as a master to the memory mapped interfaces of one or more of the DPEs. In a particular example, memory mapped switch 802 may operate as a master for a subset of DPEs. For example, memory mapped switch 802 may operate as a master for the column of DPEs above tile 704, e.g., column B of FIG. 7. It should be appreciated that memory mapped switch 802 may include additional memory mapped interfaces to connect to a plurality of different circuits (e.g., DPEs) within DPE array 102. The memory mapped interfaces of memory mapped switch 802 may also include one or more slaves capable of communicating with circuitry (e.g., one or more DPE(s)) located above tile 704.

In the example of FIG. 8A, memory mapped switch 802 may include one or more memory mapped interfaces that facilitate communication in the horizontal direction to memory mapped switches in neighboring tiles (e.g., tiles 702 and 706). For purposes of illustration, memory mapped switch 802 may be connected to neighboring tiles in the horizontal direction via memory mapped interfaces, where each such memory mapped interface includes one or more masters and/or one or more slaves. Accordingly, memory mapped switch 802 is capable of moving data (e.g., configuration, control, and/or debug data) from one tile to another to reach a correct DPE and/or subset of a plurality of DPEs and direct the data to the target DPEs, whether such DPEs are in the column above tile 704 or in another subset for which another tile of SoC interface block 104 operates as an interface. If memory mapped transactions are received from NoC 208, for example, memory mapped switch 802 is capable of distributing the transaction(s) horizontally, e.g., to other tiles within SoC interface block 104.

Memory mapped switch 802 may also include a memory mapped interface having one or more masters and/or slaves coupled to configuration registers 836 within tile 704.

Through memory mapped switch 802, configuration data may be loaded into configuration registers 836 to control various functions and operations performed by components within tile 704.

Memory mapped switch 802 may include a memory mapped interface coupled to NoC interface(s) 826 via bridge 818. The memory mapped interface may include one or more masters and/or slaves. Bridge 818 is capable of converting memory mapped data transfers from NoC 208 (e.g., configuration, control, and/or debug data) into memory mapped data that may be received by memory mapped switch 802.

Tile 704 may also include event processing circuitry. For example, tile 704 includes event logic 832. Event logic 832 may be configured by configuration registers 836. The configuration data loaded into configuration registers 836 defines the particular events that may be detected locally within tile 704. Event logic 832 is capable of detecting a variety of different events, per configuration registers 836, originating from and/or relating to, DMA engine 812, memory mapped switch 802, stream switch 806, and/or first-in-first-out (FIFO) memories located within PL interface 810. Examples of events may include, but are not limited to, DMA finished transfer, lock being released, lock being acquired, end of PL transfer, or other events relating to the start or end of data flow through tile 704.

Tile 704 includes event broadcast circuitry 804 and event broadcast circuitry 830. Each of event broadcast circuitry 804 and event broadcast circuitry 830 provide an interface between the event broadcast network of DPE array 102, other tiles of SoC interface block 104, and PL 210 of device 100. Event broadcast circuitry 804 is coupled to event broadcast circuitry in adjacent or neighboring tile 702 and to event broadcast circuitry 830. Event broadcast circuitry 830 is coupled to event broadcast circuitry in adjacent or neighboring tile 706. In one or more other embodiments, where tiles of SoC interface block 104 are arranged in a grid or array, event broadcast circuitry 804 and/or event broadcast circuitry 830 may be connected to event broadcast circuitry located in other tiles above and/or below tile 704.

In the example of FIG. 8A, event broadcast circuitry 804 is coupled to the event broadcast circuitry in the core of the DPE immediately adjacent to tile 704, e.g., DPE 204-2 immediately above tile 704 in column B. Event broadcast circuitry 804 is also coupled to PL interface 810. Event broadcast circuitry 830 is coupled to the event broadcast circuitry in the memory module of the DPE immediately adjacent tile 704, e.g., DPE 204-2 immediately above tile 704 in column B.

Event broadcast circuitry 804 and event broadcast circuitry 830 are capable of sending events generated internally by event logic 832, events received from other tiles of SoC interface block 104, and/or events received from DPEs in column B (or other DPEs of DPE array 102) on to other tiles. Event broadcast circuitry 804 is further capable of sending such events to PL 210 via PL interface 810. In another example, events may be sent from event broadcast circuitry 804 to other blocks and/or subsystems in device 100 such as an ASIC and/or PL circuit blocks located outside of DPE array 102 using PL interface 810. Further, event broadcast circuitry 804 is capable of sending any events received from PL 210 via PL interface 810 to other tiles of SoC interface block 104 and/or to DPEs in column B and/or other DPEs of DPE array 102. In another example, events received from PL 210 may be sent from event broadcast circuitry 804 to other blocks and/or subsystems in device 100 such as an ASIC. Because events may be broadcast among the tiles in SoC interface block 104, events may reach any DPE in DPE array 102 by traversing through tiles in SoC interface block 104 and the event broadcast circuitry to the target (e.g., intended) DPEs. For example, the event broadcast circuitry in the tile of SoC interface block 104 beneath the column (or subset) of DPEs managed by the tile including a target DPE may propagate the events to the target DPEs.

In one or more embodiments, event broadcast circuitry 804 and event broadcast circuitry 830 are capable of gathering broadcast events from one or more or all directions as illustrated in FIG. 8A (e.g., via any of the connections shown in FIG. 8A). In particular embodiments, event broadcast circuitry 804 and/or event broadcast circuitry 830 are capable of performing a logical "OR" of the signals and forwarding the results in one or more or all directions. Each output from event broadcast circuitry 804 and event broadcast circuitry 830 may include a bitmask that is configurable by configuration data loaded into configuration registers 836. The bitmask determines which events are broadcast in each direction on an individual basis. Such bitmasks, for example, may eliminate unwanted or duplicative propagation of events.

Interrupt handler 834 is coupled to event broadcast circuitry 804 and is capable of receiving events that are broadcast from event broadcast circuitry 804. In one or more embodiments, interrupt handler 834 may be configured by configuration data loaded into configuration registers 836 to generate interrupts in response to selected events and/or combinations of events from event broadcast circuitry 804. Interrupt handler 834 is capable of generating interrupts, based upon the configuration data, to PS 212 and/or to other device-level management blocks within device 100. As such, interrupt handler 834 is capable of informing PS 212 and/or such other device-level management blocks of events occurring in DPE array 102, of events occurring in tiles of SoC interface block 104, and/or of events occurring in PL 210 based upon the interrupt(s) that are generated by interrupt handler 834.

In particular embodiments, interrupt handler 834 may be coupled to an interrupt handler or an interrupt port of PS 212 and/or of other device-level management blocks by a direct connection. In one or more other embodiments, interrupt handler 834 may be coupled to PS 212 and/or other device-level management blocks by another interface.

PL interface 810 couples to PL 210 of device 100 and provides an interface thereto. In one or more embodiments, PL interface 810 provides an asynchronous clock-domain crossing between the DPE array clock(s) and the PL clock. PL interface 810 may also provide level shifters and/or isolation cells for integration with PL power rails. In particular embodiments, PL interface 810 may be configured to provide 32-bit, 64-bit, and/or a 128-bit interface with FIFO support to handle back-pressure. The particular width of PL interface 810 may be controlled by configuration data loaded into configuration registers 836. In the example of FIG. 8A, PL interface 810 couples directly to one or more PL interconnect blocks 822. In particular embodiments, PL interconnect blocks 822 are implemented as hardwired circuit blocks that couple to interconnect circuitry located in PL 210.

In one or more other embodiments, PL interface 810 is coupled to other types of circuit blocks and/or subsystems. For example, PL interface 810 may be coupled to an ASIC, analog/mixed signal circuitry, and/or other subsystem. As such, PL interface 810 is capable of transferring data between tile 704 and such other subsystems and/or blocks.

In the example of FIG. 8A, tile 704 includes a stream switch 806. Stream switch 806 is coupled to a stream switch in adjacent or neighboring tile 702 and to a stream switch in adjacent or neighboring tile 706 through one or more stream interfaces. Each stream interface may include one or more masters and/or one or more slaves. In particular embodiments, each pair of neighboring stream switches is capable of exchanging data via one or more streams in each direction. Stream switch 806 is also coupled to the stream switch in the DPE immediately above tile 704 in column B, e.g., DPE 204-2, by one or more stream interfaces. As discussed, a stream interface may include one or more stream slaves and/or stream masters. Stream switch 806 is also coupled to PL interface 810, DMA engine 812, and/or to NoC stream interface 814 via stream multiplexer/demultiplexer 808 (abbreviated as stream mux/demux in FIG. 8A). Stream switch 806, for example, may include one or more stream interfaces used to communicate with each of PL interface 810, DMA engine 812, and/or NoC stream interface 814 through stream multiplexer/demultiplexer 808.

In one or more other embodiments, stream switch 806 may be coupled to other circuit blocks in other directions and/or in diagonal directions depending upon the number of stream interfaces included and/or the arrangement of tiles and/or DPEs and/or other circuit blocks around tile 704.

In one or more embodiments, stream switch 806 is configurable by configuration data loaded into configuration registers 836. Stream switch 806, for example, may be configured to support packet-switched and/or circuit-switched operation based upon the configuration data. Further, the configuration data defines the particular DPE and/or DPEs within DPE array 102 to which stream switch 806 communicates. In one or more embodiments, the configuration data defines the particular DPE and/or subset of DPEs (e.g., DPEs within column B) of DPE array 102 to which stream switch 806 communicates.

Stream multiplexer/demultiplexer 808 is capable of directing data received from PL interface 810, DMA engine 812, and/or NoC stream interface 814 to stream switch 806. Similarly, stream multiplexer/demultiplexer 808 is capable of directing data received from stream switch 806 to PL interface 810, DMA engine 812, and/or to NoC stream interface 814. For example, stream multiplexer/demultiplexer 808 may be programmed by configuration data stored in configuration registers 836 to route selected data to PL interface 810, to route selected data to DMA engine 812 where such data are sent over NoC 208 as memory mapped transactions, and/or to route selected data to NoC stream interface 814 where the data are sent over NoC 208 as a data stream or streams.

DMA engine 812 is capable of operating as a master to direct data into NoC 208 through selector block 816 and on to NoC interface(s) 826. DMA engine 812 is capable of receiving data from DPEs and providing such data to NoC 208 as memory mapped data transactions. In one or more embodiments, DMA engine 812 includes hardware synchronization circuitry that may be used to synchronize multiple channels included in DMA engine 812 and/or a channel within DMA engine 812 with a master that polls and drives the lock requests. For example, the master may be PS 212 or a device implemented within PL 210. The master may also receive an interrupt generated by the hardware synchronization circuitry within DMA engine 812.

In one or more embodiments, DMA engine 812 is capable of accessing an external memory. For example, DMA engine 812 is capable of receiving data streams from DPEs and sending the data stream to external memory through NoC 208 to a memory controller located within the SoC. The memory controller then directs the data received as data streams to the external memory (e.g., initiates reads and/or writes of the external memory as requested by DMA engine 812). Similarly, DMA engine 812 is capable of receiving data from external memory where the data may be distributed to other tile(s) of SoC interface block 104 and/or up into target DPEs.

In particular embodiments, DMA engine 812 includes security bits that may be set using DPE global control settings registers (DPE GCS registers) 838. The External memory may be divided into different regions or partitions where DPE array 102 is only permitted to access particular regions of the external memory. The security bits within DMA engine 812 may be set so that DPE array 102, by way of DMA engine 812, is only able to access the particular region(s) of external memory that are allowed per the security bits. For example, an application implemented by DPE array 102 may be restricted to access only particular regions of external memory, restricted to only reading from particular regions of external memory, and/or restricted from writing to the external memory entirely using this mechanism.

The security bits within DMA engine 812 that control access to the external memory may be implemented to control DPE array 102 as a whole or may be implemented in a more granular way where access to external memory may be specified and/or controlled on a per DPE basis, e.g., core by core, or for groups of cores that are configured to operate in a coordinated manner, e.g., to implement a kernel and/or other application.

NoC stream interface 814 is capable of receiving data from NoC 208 via NoC interface(s) 826 and forwarding the data to stream to multiplexer/demultiplexer 808. NoC stream interface 814 is further capable of receiving data from stream multiplexer/demultiplexer 808 and forwarding the data to NoC interface 826 through selector block 816. Selector block 816 is configurable to pass data from DMA engine 812 or from NoC stream interface 814 on to NoC interface(s) 826.

Control, debug, and trace (CDT) circuit 820 is capable of performing control, debug, and trace operations within tile 704. Regarding debug, each of the registers located in tile 704 is mapped onto the memory map accessible via memory mapped switch 802. CDT circuit 820 is also capable of collecting trace data and outputting the trace data to stream switch 806. In one or more embodiments, CDT circuit 820 is capable of collecting data, e.g., trace and/or debug data, packetizing such data, and then outputting the packetized data through stream switch 806. For example, CDT circuit 820 is capable of outputting packetized data and providing such data to stream switch 806.

In one or more embodiments, CDT circuit 820 is capable of receiving any events propagated by event broadcast circuitry 804 or selected events per the bitmask utilized by the interface of event broadcast circuitry 804 that is coupled to CDT circuit 820. For example, CDT circuit 820 is capable of receiving broadcast events, whether from PL 210, DPEs 204, tile 704, and/or or other tiles of SoC interface block 104. CDT circuit 820 is capable of packing, e.g., packetizing, a plurality of such events together in a packet and associating the packetized events with timestamp(s). CDT circuit 820 is further capable of sending the packetized events over stream switch 806 to destinations external to tile 704.

DPE GCS registers 838 may store DPE global control settings/bits (also referred to herein as "security bits") that are used to enable or disable secure access to and/or from DPE array 102. DPE GCS registers 838 may be programmed via a SoC secure/initialization interface to be described in greater detail below in connection with FIG. 8C. The security bit(s) received from the SoC secure/initialization interface may propagate from one tile to the next of SoC interface block 104 via a bus as illustrated in FIG. 8A.

In one or more embodiments, external memory mapped data transfers into DPE array 102 (e.g., using NoC 208) are not secure or trusted. Without setting the security bits within DPE GCS registers 838, any entity in device 100 that is capable of communicating by way of memory mapped data transfers (e.g., over NoC 208) is capable of communicating with DPE array 102. By setting the security bits within DPE GCS registers 838, the particular entities that are permitted to communicate with DPE array 102 may be defined such that only the specified entities capable of generating secure traffic may communicate with DPE array 102.

For example, the memory mapped interfaces of memory mapped switch 802 are capable of communicating with NoC 208. Memory mapped data transfers may include additional sideband signals, e.g., bits, that specify whether a transaction is secure or not secure. When the security bits within DPE GCS registers 838 are set, then memory mapped transactions entering into SoC interface block 104 must have the sideband signals set to indicate that the memory mapped transaction arriving at SoC interface block 104 from NoC 208 is secure. When a memory mapped transaction arriving at SoC interface block 104 does not have the sideband bits set and the security bits are set within DPE GCS registers 838, then SoC interface block 104 does not allow the transaction to enter or pass to DPEs 204.

In one or more embodiments, the SoC includes a secure agent (e.g., circuit) that operates as a root of trust. The secure agent is capable of configuring the different entities (e.g., circuits) within the SoC with the permissions needed to set the sideband bits within memory mapped transactions in order to access DPE array 102 when the security bits of DPE GCS registers 838 are set. The secure agent, at the time the SoC is configured, gives permissions to the different masters that may be implemented in PL 210 or PS 212 thereby giving such masters the capability of issuing secure transactions over NoC 208 (or not) to DPE array 102.

FIG. 8B illustrates another example implementation of tile 704. The example architecture illustrated in FIG. 8B may also be used to implement any of the other tiles included in SoC interface block 104. The example of FIG. 8B illustrates a simplified version of the architecture illustrated in FIG. 8A. The tile architecture of FIG. 8B provides connectivity among DPEs and other subsystems and/or blocks within device 100. For example, tile 704 of FIG. 8B may provide an interface between DPEs and PL 210, analog/mixed signal circuit blocks, ASICs, or other subsystems as described herein. The tile architecture of FIG. 8B does not provide connectivity to NoC 208. As such, DMA engine 812, NoC stream interface 814, selector block 816, bridge 818, and stream multiplexer/demultiplexer 808 are omitted. Further, as pictured, stream switch 806 is directly coupled to PL interface 810.

The example architecture of FIG. 8B is unable to receive memory mapped data, e.g., configuration data, for purposes of configuring DPEs from NoC 208. Such configuration data may be received from neighboring tiles via memory mapped switch 802 and directed to the subset of DPEs that tile 704 manages (e.g., up into the column of DPEs above tile 704 of FIG. 8B).

FIG. 8C illustrates another example implementation of tile 704. In particular embodiments, the architecture illustrated in FIG. 8C may be used to implement only one tile within SoC interface block 104. For example, the architecture illustrated in FIG. 8C may be used to implement tile 702 within SoC interface block 104. The architecture illustrated in FIG. 8C is similar to the architecture shown in FIG. 8B. In FIG. 8C, additional components such as a SoC secure/initialization interface 840, a clock signal generator 842, and a global timer 844 are included.

In the example of FIG. 8C, SoC secure/initialization interface 840 provides a further interface for SoC interface block 104. In one or more embodiments, SoC secure/initialization interface 840 is implemented as a NoC peripheral interconnect. SoC secure/initialization interface 840 is capable of providing access to global reset registers for DPE array 102 (not shown) and to DPE GCS registers 838. In particular embodiments, DPE GCS registers 838 include the configuration registers for clock signal generator 842. As pictured, SoC secure/initialization interface 840 is capable of providing the security bits to DPE GCS registers 838 and propagating the security bits to other DPE GCS registers 838 in other tiles of SoC interface block 104. In particular embodiments, SoC secure/initialization interface 840 implements a single slave endpoint for SoC interface block 104.

In the example of FIG. 8C, clock signal generator 842 is capable of generating one or more clock signal(s) 846 and/or one or more reset signal 850. Clock signal(s) 846 and/or reset signals 850 may be distributed to each of DPEs 204 and/or to other tiles of SoC interface block 104 of DPE array 102. In one or more embodiments, clock signal generator 842 may include one or more phase lock loop circuits (PLLs). As illustrated, clock signal generator 842 is capable of receiving a reference clock signal generated by another circuit external to DPE array 102 and located on the SoC. Clock signal generator 842 is capable of generating the clock signal(s) 846 based upon the received reference clock signal.

In the example of FIG. 8C, clock signal generator 842 is configured through SoC secure/initialization interface 840. For example, clock signal generator 842 may be configured by loading data into DPE GCS registers 838. As such, the clock frequency or clock frequencies of DPE array 102 and the generation of reset signals 850 may be set by writing appropriate configuration data to DPE GCS registers 838 through SoC secure/initialization interface 840. For test purposes, clock signal(s) 846 and/or reset signals 850 may also be routed directly to PL 210.

SoC secure/initialization interface 840 may be coupled to a SoC control/debug (circuit) block (e.g., a control and/or debug subsystem of device 100 not shown). In one or more embodiments, SoC secure/initialization interface 840 is capable of providing status signals to the SOC control/debug block. As an illustrative and non-limiting example, SoC secure/initialization interface 840 is capable of providing a "PLL lock" signal generated from inside of clock signal generator 842 to the SoC control/debug block. The PLL lock signal may indicate when the PLL acquires lock on the reference clock signal.

SoC secure/initialization interface 840 is capable of receiving instructions and/or data via an interface 848. The data may include the security bits described herein, clock signal generator configuration data, and/or other data that may be written to DPE GCS registers 838.

Global timer 844 is capable of interfacing to CDT circuit 820. For example, global timer 844 may be coupled to CDT circuit 820. Global timer 844 is capable of providing a signal that is used by CDT circuit 820 for time-stamping events used for tracing. In one or more embodiments, global timer 844 may be coupled to CDT circuit 820 within other ones of the tiles of SoC interface block 104. For example, global timer 844 may be coupled to CDT circuit 820 in the example tiles of FIGS. 8A, 8B, and/or 8C. Global timer 844 may also be coupled to the SoC control/debug block.

Referring to the architectures of FIGS. 8A, 8B, and 8C collectively, tile 704 is capable of communicating with DPEs 204 using a variety of different data paths. In an example, tile 704 is capable of communicating with DPEs 204 using DMA engine 812. For example, tile 704 is capable of communicating using DMA engine 812 to the DMA engine (e.g., DMA engine 516) of one or more DPEs of DPE array 102. Communication may flow from a DPE to a tile of SoC interface block 104 or from a tile of SoC interface block 104 to a DPE. In another example, DMA engine 812 is capable of communicating with a core(s) of one or more DPEs of DPE array 102 by way of the stream switches within the respective DPEs. Communication may flow from core(s) to a tile of SoC interface block 104 and/or from a tile of SoC interface block 104 to core(s) of one or more DPEs of DPE array 102.

Figure 9:
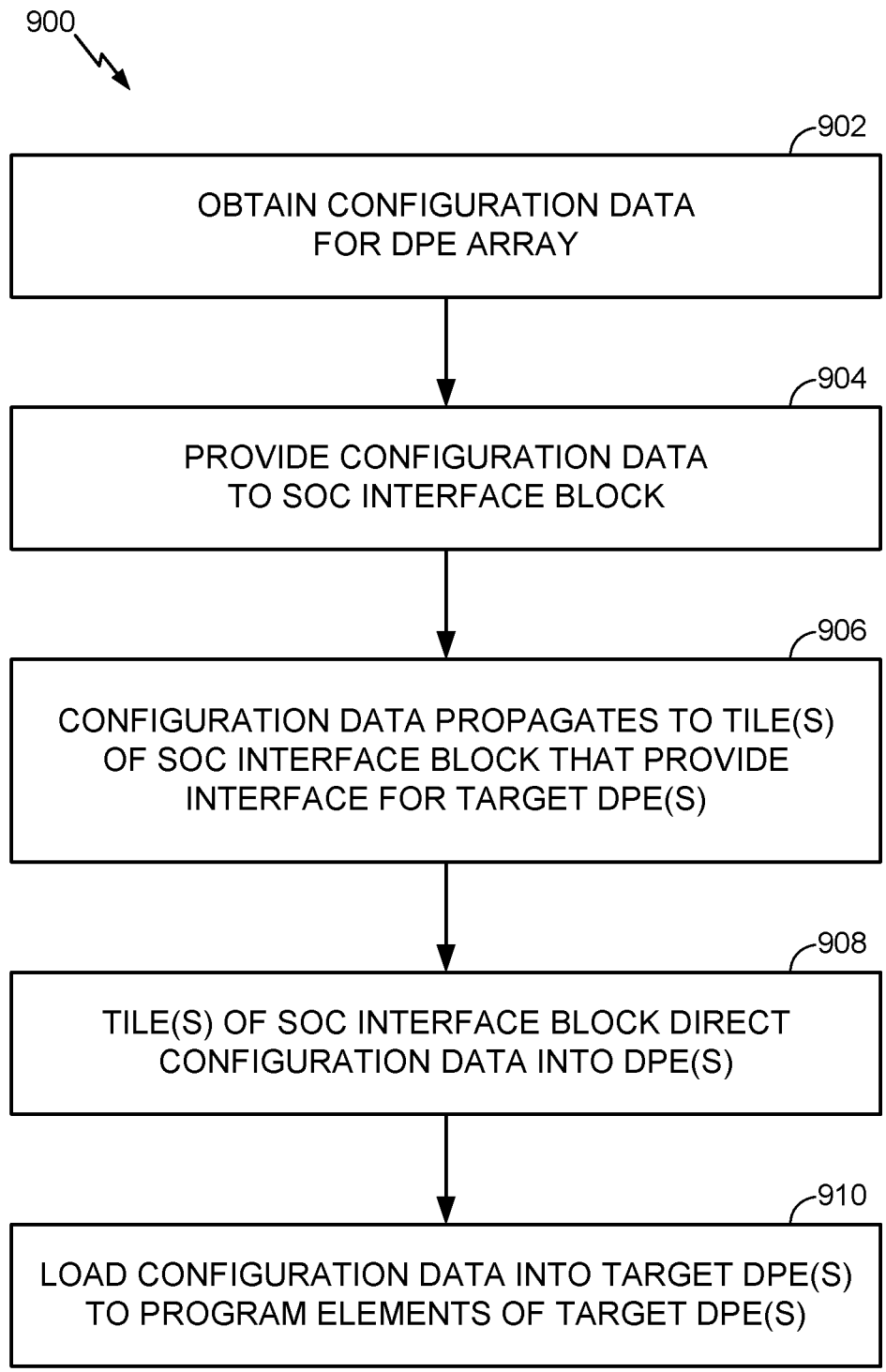
FIG. 9 illustrates an example method of configuring a DPE array.

FIG. 9 illustrates an example method 900 of configuring a DPE array, which can be a configuration for all of the DPE array and/or for part, but not all, of the DPE array. Method 900 is provided for purposes of illustration and is not intended as a limitation of the example arrangements described within this disclosure.

In block 902, optionally, configuration data for the DPE array is obtained. For example, the configuration data for the DPE array may be loaded into the device. The configuration data may be provided from any of a variety of different sources, whether a computer system (e.g., a host), an off-chip memory, or other suitable source. In other examples, the configuration data for the DPE array may be generated by the device at run-time of an application.

In block 904, the configuration data is provided to the SoC interface block. In particular embodiments, the configuration data is provided from the processor system via the NoC. A tile of the SoC interface block is capable of receiving the configuration data and converting the configuration data to memory mapped data, which may be provided to the memory mapped switch contained within the tile.

In block 906, the configuration data propagates between the tile(s) of the SoC interface block to the particular tile(s) that operate as, or provide, interfaces to the target DPE(s). The target DPE(s) are the DPE(s) to which the configuration data is addressed. For example, the configuration data includes addresses specifying the particular DPEs to which the different portions of configuration data should be directed. The memory mapped switches within the tiles of the SoC interface block are capable of propagating the different portions of configuration data to the particular tiles that operate as interfaces for the target DPE(s) (e.g., the subset of DPEs that include the target DPEs).

In block 908, the tile(s) of the SoC interface block that operate as interfaces for the target DPE(s) are capable of directing the portions of configuration data for the target DPE(s) to the target DPE(s). For example, a tile that provides an interface to one or more target DPE(s) is capable of directing the portion(s) of configuration data into the subset of DPEs to which the tile provides an interface. As noted, the subset of DPEs includes the one or more target DPE(s). As each tile receives configuration data, the tile is capable of determining whether any portions of the configuration data are addressed to other DPEs in the same subset of DPEs to which the tile provides an interface. The tile directs any configuration data addressed to DPEs in the subset of DPEs to such DPE(s).

In block 910, the configuration data is loaded into the target DPEs to program the elements of the DPEs included therein. For example, the configuration data is loaded into configuration registers to program elements of the target DPE(s), such as the stream interfaces, the core (e.g., stream interface(s), cascade interfaces, core interfaces), the memory module (e.g., DMA engines, memory interfaces, arbiters, etc.), the broadcast event switch, and/or the broadcast logic. The configuration data may also include executable program code that may be loaded into the program memory of the core and/or data to be loaded into memory banks of the memory module.

It should be appreciated that the received configuration data may also include portions that are addressed to one or more or all of the tiles of SoC interface block 104. In that case, the memory mapped switches within the respective tiles are capable of conveying the configuration data to the appropriate (e.g., target) tiles, extracting such data, and writing such data to the appropriate configuration registers within the respective tiles.

Figure 10:
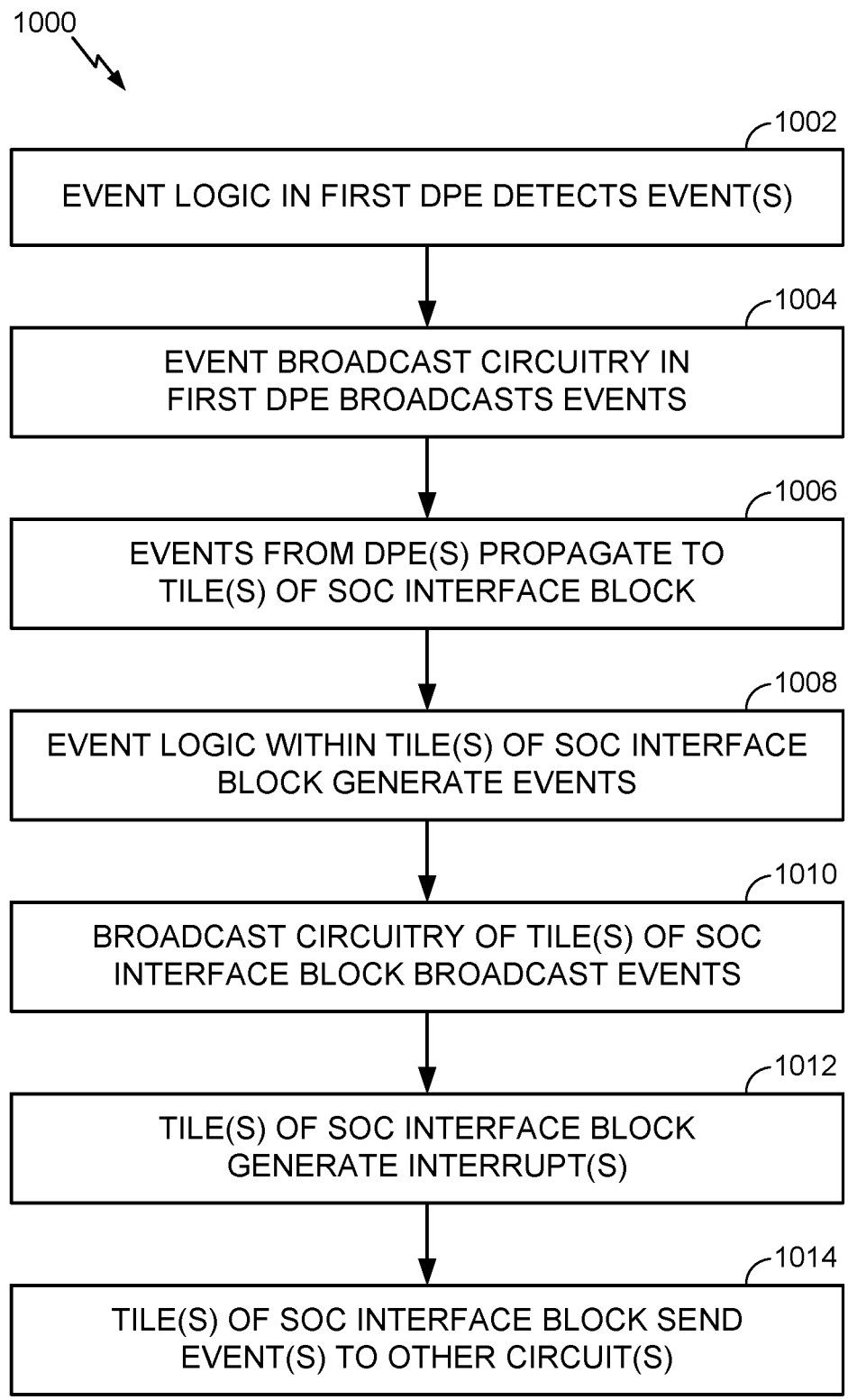
FIG. 10 illustrates an example method of operation of a DPE array.

FIG. 10 illustrates an example method of operation of a DPE array. Method 1000 is provided for purposes of illustration and is not intended as a limitation of the example arrangements described within this disclosure. Method 1000 begins in a state where the DPE array has been loaded with configuration data.

In block 1002, event logic within a first DPE detects one or more events locally within the first DPE. The events may be detected from the core, from the memory module, or from both the core and the memory module. In block 1004, the event broadcast circuitry within the first DPE broadcasts events based upon the configuration data loaded into the first DPE. The broadcast circuitry is capable of broadcasting selected ones of the events generated in block 1002. The event broadcast circuitry is also capable of broadcasting selected events that may be received from one or more other DPEs within DPE array 102.

In block 1006, the events from the DPEs are propagated to tiles within the SoC interface block. For example, events may be propagated in each of the four cardinal directions through the DPEs in patterns and/or routes determined by the configuration data. Broadcast circuitry within particular DPEs may be configured to propagate events down to the tile(s) in the SoC interface block.

In block 1008, the event logic within the tile(s) of the SoC interface block optionally generate events. In block 1010, the tile(s) of the SoC interface block optionally broadcast events to other tiles within the SoC interface block. The broadcast circuitry within the tile(s) of the SoC interface block is capable of broadcasting selected ones of the events generated with the tiles themselves and/or events received from other sources (e.g., whether other tiles of the SoC interface block or DPEs) to other tiles of the SoC interface block.

In block 1012, the tile(s) of the SoC interface block optionally generate one or more interrupts. The interrupt(s) may be generated by interrupt handler 834, for example. The interrupt handler is capable of generating one or more interrupts in response to receiving particular events, combinations of events, and/or sequences of events over time. The interrupt handler may send the interrupt(s) generated to other circuitry such as PS 212 and/or to circuits implemented within PL 210.

In block 1014, the tile(s) of the SoC interface block optionally send the events to one or more other circuits. For example, CDT circuit 820 is capable of packetizing events and sending the events from the tile(s) of the SoC interface block to the PS 212, to circuits within the PL 210, to external memory, or to another destination with the SoC.

In one or more embodiments, PS 212 is capable of responding to interrupts generated by the tile(s) of SoC interface block 104. For example, PS 212 is capable of resetting DPE array 102 in response to receiving particular interrupts. In another example, PS 212 is capable of reconfiguring DPE array 102 or a portion of DPE array 102 (e.g., performing partial reconfiguration) in response to particular interrupts. In another example, PS 212 is capable of taking other actions such as loading new data into different memory modules of DPEs for use by the cores within such DPEs.

In the example of FIG. 10, PS 212 performs operations in response to interrupts. In other embodiments, PS 212 may operate as a global controller for DPE array 102. PS 212 is capable of controlling application parameters stored in the memory modules and used by one or more DPEs of DPE array 102 (e.g., the cores) during runtime. As an illustrative and non-limiting example, one or more DPEs may be operative as a kernel that implements a filter. In that case, PS 212 is capable of executing program code that allows PS 212 to calculate and/or modify coefficients of the filter during runtime of DPE array 102, e.g., dynamically at runtime. PS 212 may calculate and/or update the coefficients in response to particular conditions and/or signals detected within the SoC. For example, PS 212 is capable of computing new coefficients for the filter and/or writing such coefficients to application memory (e.g., to one or more memory modules) in response to some detected condition. Examples of conditions that may cause PS 212 to write data such as coefficients to the memory module(s) may include, but are not limited to, receiving particular data from DPE array 102, receiving interrupts from the SoC interface block, receiving event data from DPE array 102, receiving a signal from a source external to the SoC, receiving another signal from within the SoC, and/or receiving new and/or updated coefficients from a source within the SoC or from external to the SoC. PS 212 is capable of computing the new coefficients and/or writing the new coefficients to the application data, e.g., the memory module utilized by the core and/or cores.

In another example, PS 212 is capable of executing a debugger application that is capable of performing actions such as starting, stopping, and/or single-stepping execution of DPEs. PS 212 may control the starting, stopping, and/or single-stepping of DPEs via NoC 208. In other examples, circuits implemented in PL 210 may also be capable of controlling operation of DPEs using debugging operations.

With the DPE array configured and operating, the DPE array may be partially reconfigured. For example, a kernel may be operating on a subset of the DPE array, and some other subset of the DPE array is to be reconfigured to operate another kernel. A kernel, among other things, may be a function or a subset of functionality of an application. The subset of the DPE array to be reconfigured may be in whole or in part operating one or more kernels and/or may not be operating a kernel. In one or more embodiments, reconfiguring the subset does not modify the operation of other kernels. For example, program code for execution to implement the other kernels is not modified by the reconfiguration of another subset of the DPE array. In some examples, the reconfiguration can stall one or more of the other kernels, while in other examples, other kernels may remain operating while a subset is reconfigured.

In some instances, various conditions may occur when partially reconfiguring the DPE array. One condition may be that the subset of the DPE array to be reconfigured has no shared hardware resources and no data and/or control dependency with another subset of the DPE array operating a kernel. In another condition, the subset of the DPE array to be reconfigured has a shared hardware resource, and no data and/or control dependency, with another subset of the DPE array operating a kernel. In another condition, the subset of the DPE array to be reconfigured has a data and/or control dependency, and no shared hardware resource, with another subset of the DPE array operating a kernel. In another condition the subset of the DPE array to be reconfigured has a shared hardware resource and a data and/or control dependency with another subset of the DPE array operating a kernel. Examples are provided below illustrating these conditions.

In some examples, a shared resource may exist where a first kernel uses or implements a hardware resource of a DPE operating a second, different kernel and where such use or implementation of the hardware resource by the first kernel is logically independent of the second kernel. A shared hardware resource can include a stream switch 326, shared memory, hardware locks of hardware synchronization circuitry 520, others, and any combination thereof.

In some examples, a data and/or control dependency may exist where a first kernel interfaces or communicates application data (e.g., generated by the first kernel) to a second kernel that operates upon the application data, and/or the first kernel interfaces or communicates control data (e.g., generated by the first kernel) to the second kernel, the operation of which is controlled by the control data. The interface or communication between the kernels may be by one or several hardware resources within DPEs, such as stream switch 326, shared memory, a cascade interfaces 522 and 524, others, or a combination thereof.

Although examples provided below show (i) no shared hardware resource and no data and/or control dependency in either the original configuration and the partial reconfiguration, (ii) a shared hardware resource and no data and/or control dependency in the original configuration and the partial reconfiguration, (iii) no shared hardware resource and a data and/or control dependency in the original configuration and the partial reconfiguration, and (iv) a shared hardware resource and a data and/or control dependency in the original configuration and the partial reconfiguration, dependencies may exist or be added or removed between an original configuration and the partial reconfiguration. For example, the original configuration can have no shared hardware resource and no data and/or control dependency, while the configuration result of the partial reconfiguration has a shared hardware resource and no data and/or control dependency. Further, for example, the original configuration can have a shared hardware resource and no data and/or control dependency, while the configuration result of the partial reconfiguration has no shared hardware resource and no data and/or control dependency. A person having ordinary skill in the art will readily understand how such reconfigurations can be implemented in view of the examples provided below.

In the examples herein, each data flow can include a flow of data implemented by various resources in the DPE array 102. For example, a data flow may be implemented by stream switches 326, shared memories, hardware synchronization circuitry 520, the like, or a combination thereof.

Figure 11A:
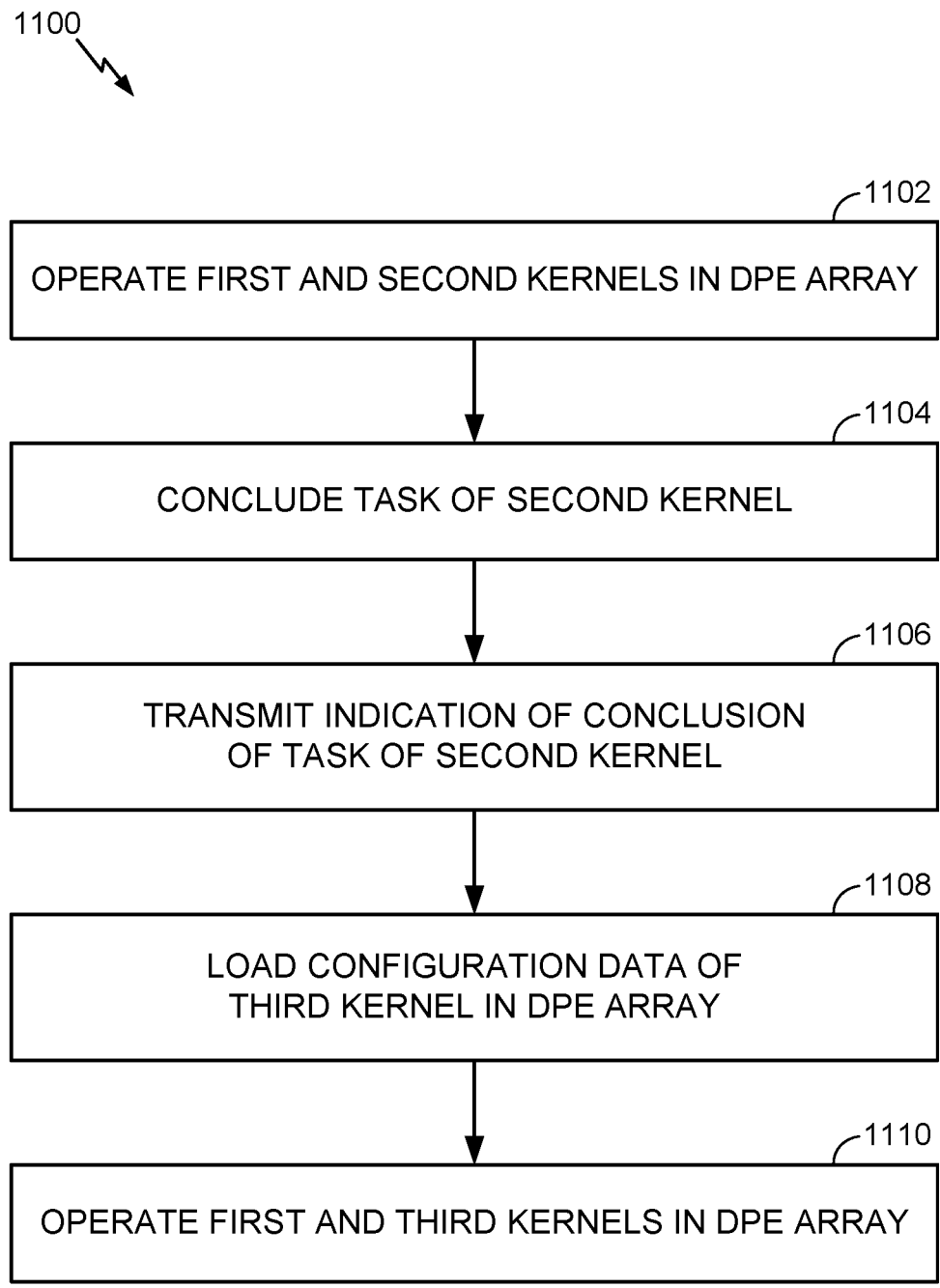
FIGS. 11A, 11B, and 11C illustrate an example of partial reconfiguration, where subsets of a DPE array to be reconfigured have no shared hardware resource and no data and/or control dependency with another subset of the DPE array.
Figure 11B:
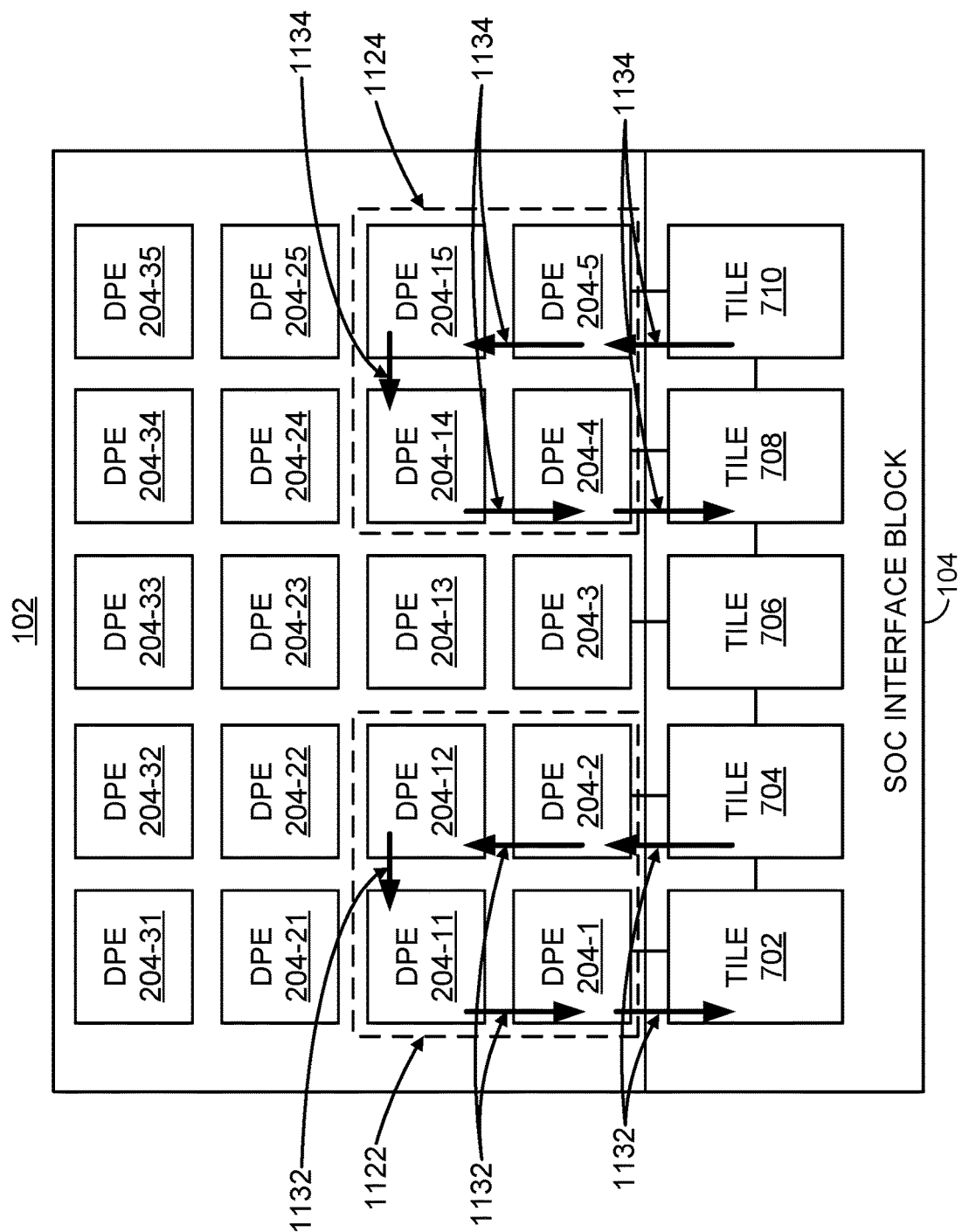
Figure 11C:
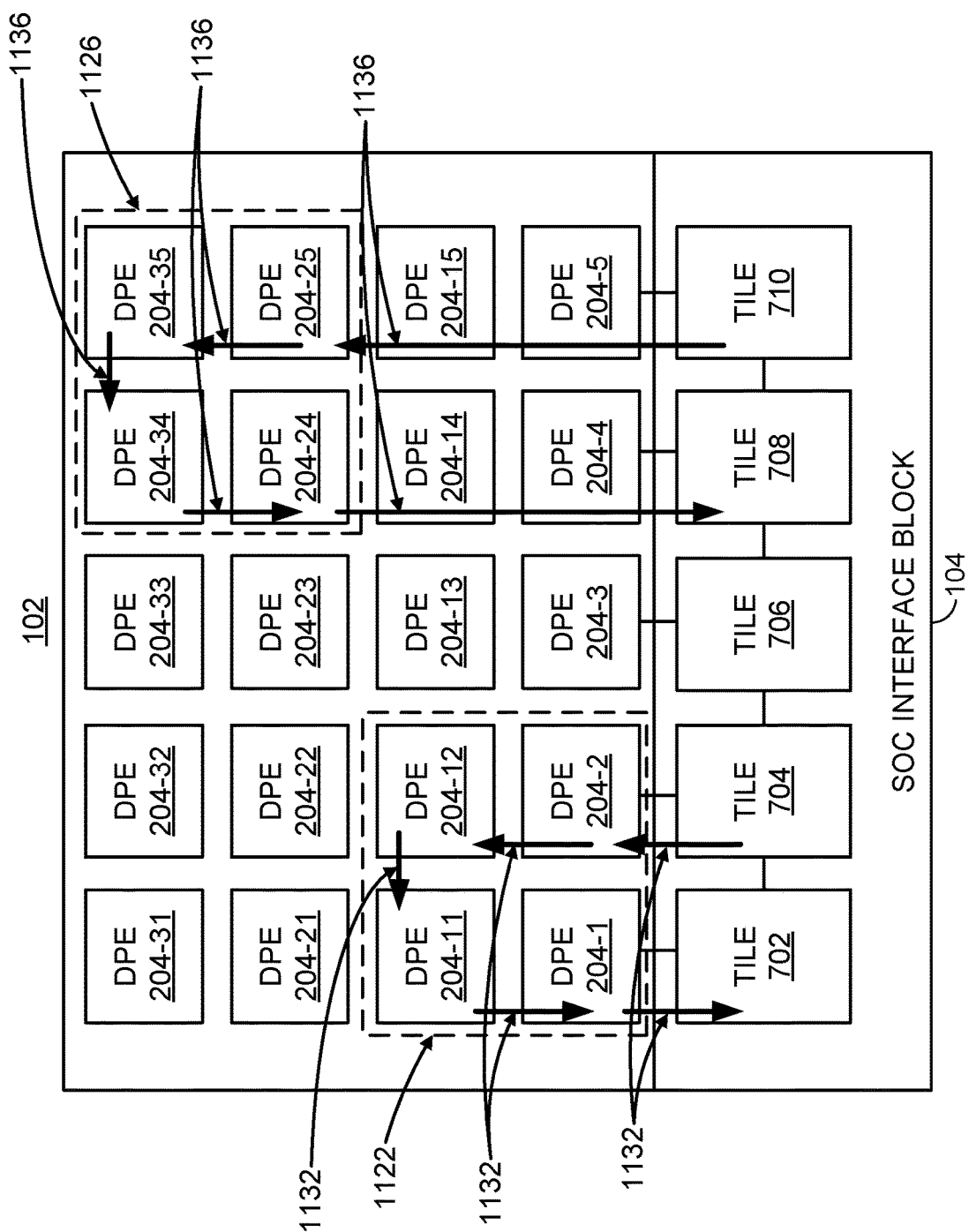

FIGS. 11A, 11B, and 11C illustrate an example where subsets of the DPE array to be reconfigured have no shared hardware resource and no data and/or control dependency with another subset of the DPE array. FIG. 11A is a flow chart of an example method 1100 for the reconfiguration. FIGS. 11B and 11C show a portion of the DPE array 102 of FIG. 7 for illustration purposes.

In block 1102 of the method 1100, first and second kernels are operating in the DPE array. For example, in FIG. 11B, a first kernel 1122 and a second kernel 1124 are configured and operating in respective subsets of the DPE array 102. DPEs 204-1, 204-11, 204-2, and 204-12 are configured to implement and operate the first kernel 1122. DPEs 204-4, 204-14, 204-5, and 204-15 are configured to implement and operate the second kernel 1124.

In this example, the first kernel 1122 has a data flow 1132, and the second kernel 1124 has a data flow 1134. For the first kernel 1122, data flow 1132 is from tile 704 to DPE 204-2, from DPE 204-2 to DPE 204-12, from DPE 204-12 to DPE 204-11, from DPE 204-11 to DPE 204-1, and from DPE 204-1 to tile 702. For the second kernel 1124, data flow 1134 is from tile 710 to DPE 204-5, from DPE 204-5 to DPE 204-15, from DPE 204-15 to DPE 204-14, from DPE 204-14 to DPE 204-4, and from DPE 204-4 to tile 708.

As shown, the first kernel 1122 and the second kernel 1124 have no shared hardware resource. For example, neither data flow 1132 of the first kernel 1122 nor data flow 1134 of the second kernel 1124 uses or implements hardware of DPEs 204 implementing another kernel. For example, the data flow 1132 of the first kernel 1122 is not through stream switches 326 of DPEs 204-4, 204-14, 204-5, and 204-15 that implement the second kernel 1124. Similarly, the data flow 1134 of the second kernel 1124 is not through stream switches 326 of DPEs 204-1, 204-11, 204-2, and 204-12 that implement the first kernel 1122. As indicated above, other shared hardware resources may exist within a DPE array 102, such as shared memory; however, such shared hardware resource does not exist between the first kernel 1122 and the second kernel 1124 in this example.

Further, as shown, the first kernel 1122 and the second kernel 1124 have no data and/or control dependency. For example, the first kernel 1122 and the second kernel 1124 do not receive and do not operate upon application data generated by and received from another kernel. For example, the first kernel 1122 does not receive and does not operate upon application data generated by and received from the second kernel 1124, and the second kernel 1124 does not receive and does not operate upon application data generated by and received from the first kernel 1122. Further, the first kernel 1122 and the second kernel 1124 do not communicate control data to the other kernel to control the operation of the other kernel.

In block 1104 of the method 1100, the second kernel concludes its task, and in block 1106, in response to the conclusion of the task, an indication of the conclusion of the task is transmitted. During operation of the device 100, and more specifically, during operation of the first kernel 1122 and the second kernel 1124, the second kernel 1124 concludes its task. In some examples, the conclusion is detected and the indication of the task is transmitted using event logic and event broadcast circuitry. Event logic within one or more DPEs (e.g., within the core 302 and/or memory module 304) of the subset of the DPE array operating the second kernel detect the conclusion of the task (such as in block 1002 of FIG. 10), such as by a program counter reaching a predetermined value, some parameter reaching a predetermined value, etc. The event logic transmits the detected event (the conclusion of the task) to event broadcast circuitry, which can transmit the detected event to other DPEs and tiles of the SoC interface block (such as in blocks 1004 and 1006 of FIG. 10). In some examples, the detected event propagates to one or more tiles of the SoC interface block, which receives the detected event at event broadcast circuitry 804. The event broadcast circuitry 804 causes the interrupt handler 834 to generate an interrupt (such as in block 1012 of FIG. 10) that is transmitted to the PS 212 (such as in block 1014 of FIG. 10). In other examples, cores within one or more DPEs of the subset of the DPE array operating the second kernel transmit stream data via stream switches in various DPEs and tiles of the SoC interface block and via the NoC interface 826 to the PS 212.

In block 1108 of the method 1100, configuration data of a third kernel is loaded into the DPE array. For example, a third kernel 1126, such as illustrated in FIG. 11C, is loaded in the DPE array 102. In FIG. 11C, the third kernel 1126 is to be configured and is to operate in a subset of the DPE array 102. DPEs 204-24, 204-34, 204-25, and 204-35 are to be configured to implement and operate the third kernel 1126. The third kernel 1126 is to implement a data flow 1136. The data flow 1136 is to be from tile 710 to DPE 204-25 (e.g., through stream switches 326 of DPEs 204-5, 204-15), from DPE 204-25 to DPE 204-35, from DPE 204-35 to DPE 204-34, from DPE 204-34 to DPE 204-24, and from DPE 204-24 to tile 708 (e.g., through stream switches 326 of DPEs 204-4, 204-14). As between the first kernel 1122 and the second kernel 1124 in FIG. 11B, no shared hardware resource and no data and/or control dependency exists between the first kernel 1122 and the third kernel 1126.

To partially reconfigure the DPE array 102 to load the third kernel 1126 while the first kernel 1122 continues operation, the DPEs 204 that implement the third kernel 1126 can be configured as described in FIG. 9 without configuring components of the DPEs 204 of the first kernel 1122 in a way that modifies the operation of the first kernel 1122. The PS 212 or other subsystem can transmit configuration data to the DPE array 102 in response to receiving the indication that the task of the second kernel 1124 has been concluded, e.g., after receiving the corresponding interrupt. For example, after configuration data is received at a tile of the SoC interface block 104, e.g., via the NoC, is converted to memory mapped data (block 904 of FIG. 9), and is propagated to appropriate tiles (e.g., tiles 708 and 710 in this example) (block 906), the respective tiles direct the portions of the configuration data to target DPEs via memory mapped transactions (block 908). At the target DPEs, the program memory 308, memory module 304, and/or configuration registers 324, 334, 336 are written via the memory mapped transactions to load the configuration data (block 910) to implement the third kernel 1126 and data flow 1136, without modifying operation of the first kernel 1122.

For example, the tile 708 receives configuration data (in a memory mapped format), and propagates configuration data for DPEs 204-4, 204-14, 204-24, 204-34 to those DPEs while propagating other configuration data to the tile 710. The configuration data is propagated from a memory mapped switch 802 of the tile 708 to the memory mapped switch 332 of DPE 204-4, which may propagate the configuration data to the memory mapped switch 332 of DPE 204-14. If the configuration data is addressed to a memory space within the receiving DPE, the configuration data may be stored within that receiving DPE without further propagating the configuration data. If the configuration data is not addressed to a memory space within the receiving DPE, the receiving DPE may continue propagating the configuration data to a subsequent DPE until the configuration data is received by an appropriate target DPE. In such a manner configuration data for DPEs 204-4, 204-14, 204-24, 204-34 may be propagated from the tile 708 to the appropriate target DPE 204-4, 204-14, 204-24, 204-34. Similarly, configuration data received by the tile 710 may be propagated to DPEs 204-5, 204-15, 204-25, 204-35 and/or propagated to a subsequent tile.

The configuration data for DPEs 204-4, 204-14, 204-5, 204-15 can overwrite or disable execution (e.g., reset or stall) of executable program code that implemented the second kernel 1124. The configuration data for DPEs 204-24, 204-34, 204-25, 204-35 can write executable program code that is to implement the third kernel 1126 to, e.g., program memory 308, and can write data to configuration registers 334 to pass data among the DPEs 204-24, 204-34, 204-25, 204-35 according to the data flow 1136.

Further, the configuration data for DPEs 204-4 and 204-14 can write data to configuration registers 334 to pass data received at stream switch 326 (e.g., pass data from a DPE above to a DPE or tile below) according to the data flow 1136. Similarly, the configuration data for DPEs 204-5 and 204-15 can write data to configuration registers 334 to pass data received at stream switch 326 (e.g., pass data from a DPE or tile below to a DPE above) according to the data flow 1136.

In block 1110 of the method 1100, the first and third kernels are operated in the DPE array. The PS 212 can transmit (via memory mapped switch(es) 332, 802) a memory mapped transaction to the DPEs configured to operate the third kernel 1126 to write to a configuration register to remove a stall or reset indication, which initiates operation of the third kernel 1126.

In this example, the operation of the first kernel 1122 is not modified and is not interrupted. Executable program code, application data, and data flow 1132 into and within the first kernel 1122 are not modified by the partial reconfiguration of FIGS. 11B and 11C. The operation of the first kernel 1122 can continue while the second kernel 1124 is stopped and the third kernel 1126 is loaded.

Figure 12A:
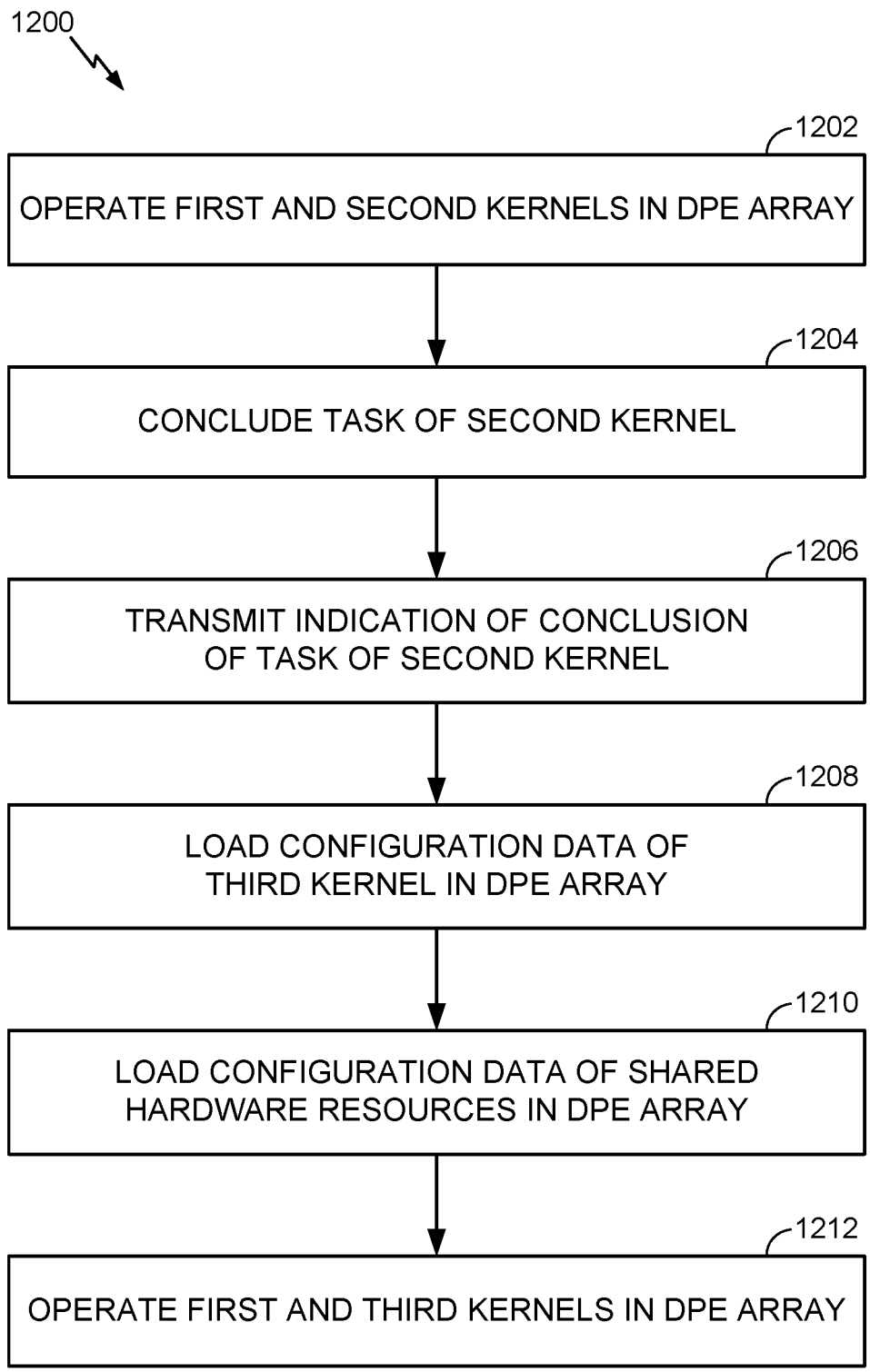
FIGS. 12A, 12B, and 12C illustrate an example of partial reconfiguration, where subsets of a DPE array to be reconfigured have a shared hardware resource, and no data and/or control dependency, with another subset of the DPE array.
Figure 12B:
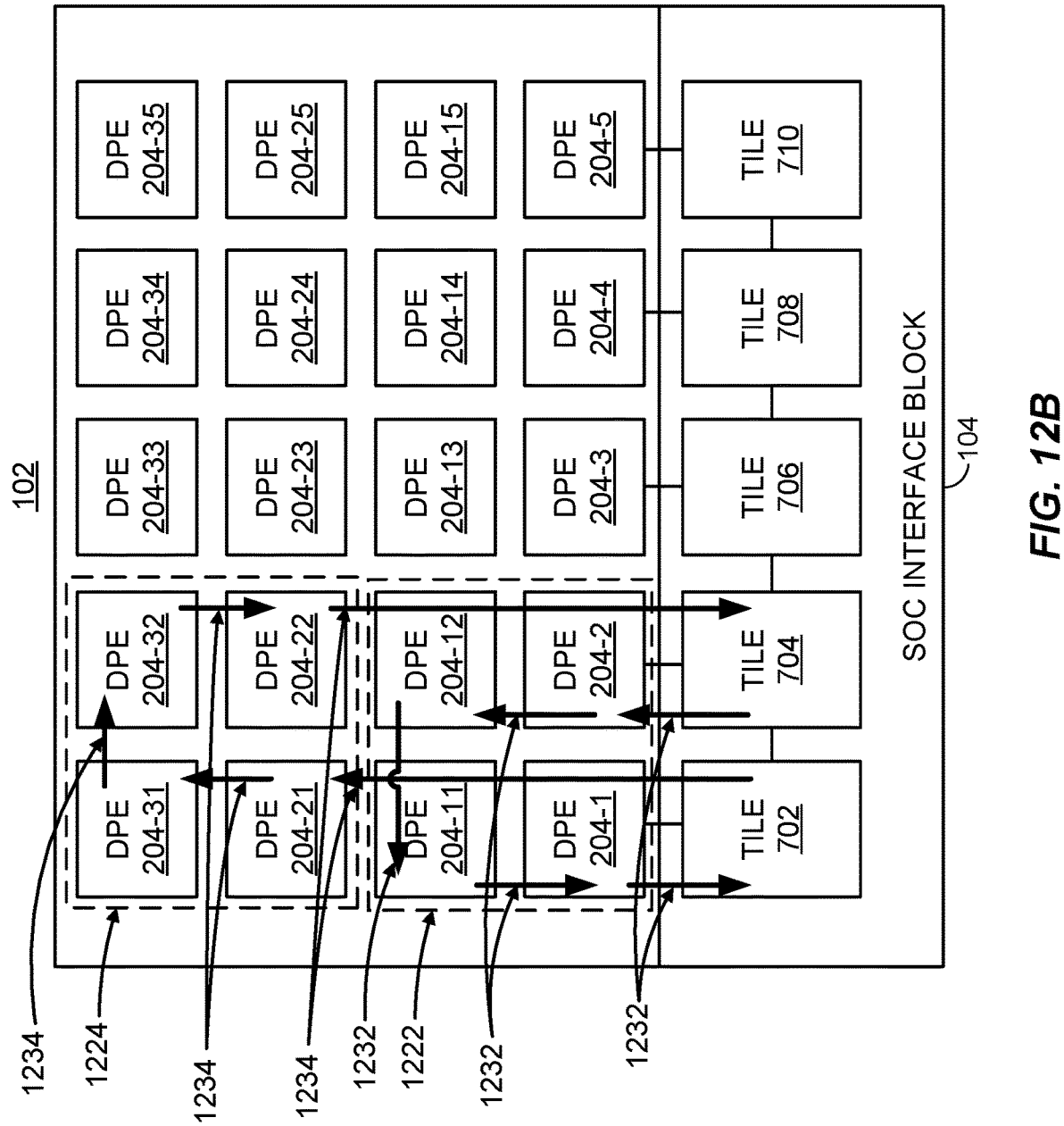
Figure 12C:
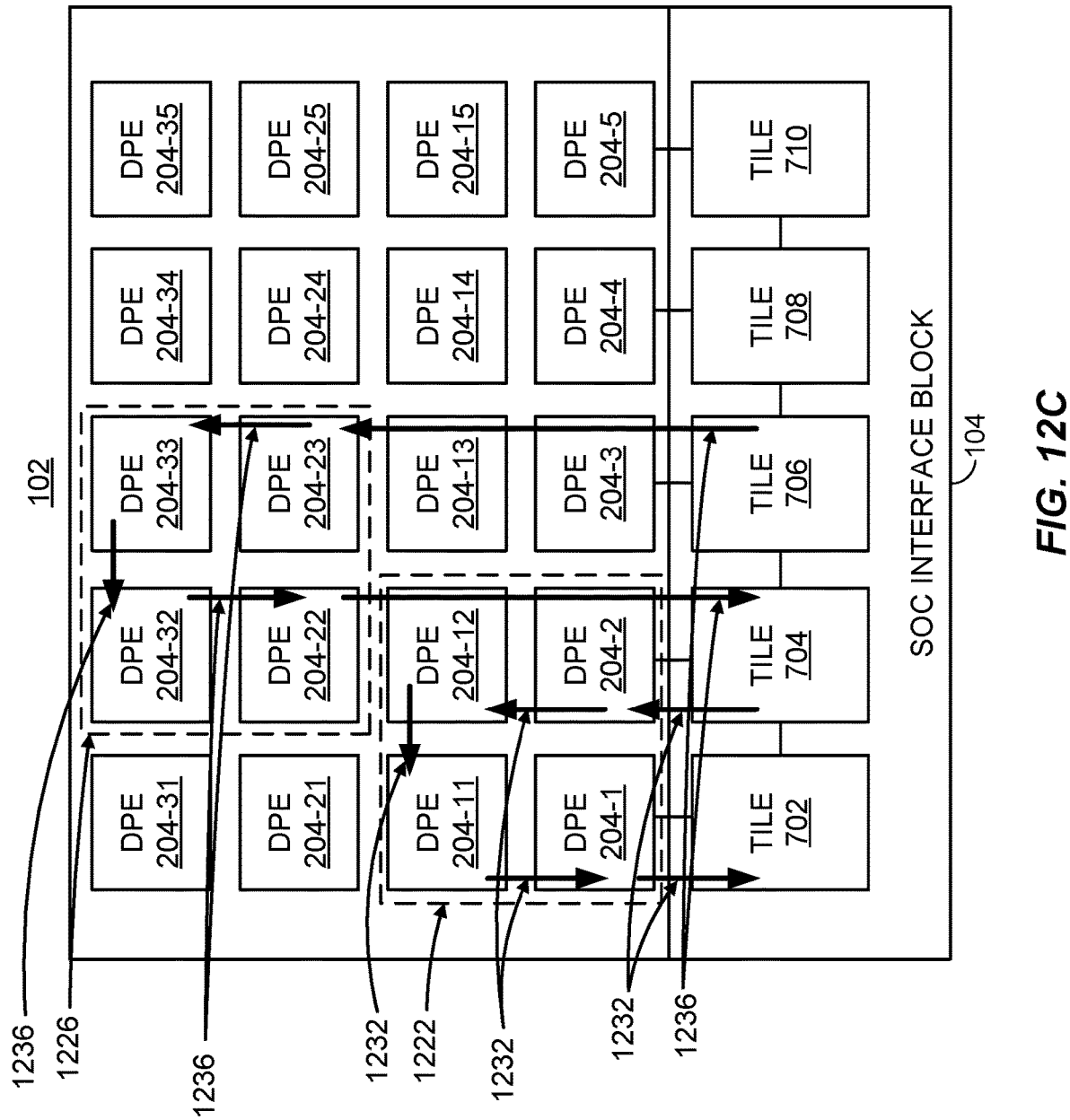

FIGS. 12A, 12B, and 12C illustrate an example where subsets of the DPE array to be reconfigured have a shared hardware resource, and no data and/or control dependency, with another subset of the DPE array. FIG. 12A is a flow chart of an example method 1200 for the reconfiguration. FIGS. 12B and 12C show a portion of the DPE array 102 of FIG. 7 for illustration purposes.

In block 1202 of the method 1200, first and second kernels are operating in the DPE array. For example, in FIG. 12B, a first kernel 1222 and a second kernel 1224 are configured and operating in respective subsets of the DPE array 102. DPEs 204-1, 204-11, 204-2, and 204-12 are configured to implement and operate the first kernel 1222. DPEs 204-21, 204-22, 204-31, and 204-32 are configured to implement and operate the second kernel 1224.

In this example, the first kernel 1222 has a data flow 1232, and the second kernel 1224 has a data flow 1234. For the first kernel 1222, data flow 1232 is from tile 704 to DPE 204-2, from DPE 204-2 to DPE 204-12, from DPE 204-12 to DPE 204-11, from DPE 204-11 to DPE 204-1, and from DPE 204-1 to tile 702. For the second kernel 1224, data flow 1234 is from tile 702 through DPEs 204-1, 204-11 to DPE 204-21, from DPE 204-21 to DPE 204-31, from DPE 204-31 to DPE 204-32, from DPE 204-32 to DPE 204-22, and from DPE 204-22 through DPEs 204-12, 204-2 to tile 704.

As shown, the first kernel 1222 and the second kernel 1224 have a shared hardware resource. For example, data flow 1232 of the first kernel 1222 does not use or implement hardware of DPEs 204 implementing another kernel, but data flow 1234 of the second kernel 1224 does use or implement hardware of DPEs 204-1, 204-11, 204-2, 204-12 that implement the first kernel 1222. For example, the data flow 1234 of the second kernel 1224 is through stream switches 326 of DPEs 204-1, 204-11, 204-2, and 204-12 that implement the first kernel 1222. Further, the data flow 1234 of the second kernel 1224 is logically independent of the first kernel 1222, since for example, the first kernel 1222 does not operate upon and is not controlled by data of the data flow 1234. As indicated above, other shared hardware resources may exist within a DPE array 102, such as shared memory; however, such shared hardware resource does not exist between the first kernel 1222 and the second kernel 1224 in this example.

Further, as shown, the first kernel 1222 and the second kernel 1224 have no data and/or control dependency. For example, the first kernel 1222 and the second kernel 1224 do not receive and do not operate upon application data generated by and received from another kernel. For example, the first kernel 1222 does not receive and does not operate upon application data generated by and received from the second kernel 1224, and the second kernel 1224 does not receive and does not operate upon application data generated by and received from the first kernel 1222. Further, the first kernel 1222 and the second kernel 1224 do not communicate control data to the other kernel to control the operation of the other kernel.

In block 1204 of the method 1200, the second kernel concludes its task, and in block 1206, in response to the conclusion of the task, an indication of the conclusion of the task is transmitted. During operation of the device 100, and more specifically, during operation of the first kernel 1222 and the second kernel 1224, the second kernel 1224 concludes its task. The conclusion can be detected and/or transmitted as described above in the context of the method 1100 of FIG. 11A.

In block 1208 of the method 1200, configuration data of a third kernel is loaded into the DPE array, and in block 1210, configuration data of shared hardware resources is loaded into the DPE array. For example, a third kernel 1226, such as illustrated in FIG. 12C, is loaded in the DPE array 102. In FIG. 12C, the third kernel 1226 is to be configured and is to operate in a subset of the DPE array 102. DPEs 204-22, 204-32, 204-23, and 204-33 are to be configured to implement and operate the third kernel 1226. The third kernel 1226 is to implement a data flow 1236. The data flow 1236 is to be from tile 706 to DPE 204-23 (e.g., through stream switches 326 of DPEs 204-3, 204-13), from DPE 204-23 to DPE 204-33, from DPE 204-33 to DPE 204-32, from DPE 204-32 to DPE 204-22, and from DPE 204-22 to tile 704 (e.g., through stream switches 326 of DPEs 204-12, 204-2). As between the first kernel 1222 and the second kernel 1224 in FIG. 12B, no data and/or control dependency exists between the first kernel 1222 and the third kernel 1226, but the first kernel 1222 and the third kernel 1226 have a shared hardware resource (e.g., stream switches 326 of DPEs 204-2, 204-12).

To partially reconfigure the DPE array 102 to load the third kernel 1226 while the first kernel 1222 continues operation, the DPEs 204 that implement the third kernel 1226 can be configured as described in FIG. 9 without configuring components of the DPEs 204 of the first kernel 1222 in a way that modifies the operation of the first kernel 1222. The PS 212 or other subsystem can transmit configuration data to the DPE array 102 in response to receiving the indication that the task of the second kernel 1224 has been concluded, e.g., after receiving the corresponding interrupt. For example, after configuration data is received at a tile of the SoC interface block 104, e.g., via the NoC, is converted to memory mapped data (block 904 of FIG. 9), and is propagated to appropriate tiles (e.g., tiles 702, 704, 706 in this example) (block 906), the respective tiles direct the portions of the configuration data to target DPEs via memory mapped transactions (block 908). At the target DPEs, the program memory 308, memory module 304, and/or configuration registers 324, 334, 336 are written via the memory mapped transactions to load the configuration data (block 910) to implement the third kernel 1226 and data flow 1236, without modifying operation of the first kernel 1222.

For example, the tile 702 receives configuration data (in a memory mapped format), and propagates configuration data for DPEs 204-1, 204-11, 204-21, 204-31 to those DPEs while propagating other configuration data to the tile 704. The configuration data is propagated from a memory mapped switch 802 of the tile 702 to the memory mapped switch 332 of DPE 204-1, which may propagate the configuration data to the memory mapped switch 332 of DPE 204-11. If the configuration data is addressed to a memory space within the receiving DPE, the configuration data may be stored within that receiving DPE without further propagating the configuration data. If the configuration data is not addressed to a memory space within the receiving DPE, the receiving DPE may continue propagating the configuration data to a subsequent DPE until the configuration data is received by an appropriate target DPE. In such a manner configuration for DPEs 204-1, 204-11, 204-21, 204-31 may be propagated from the tile 702 to the appropriate target DPE 204-1, 204-11, 204-21, 204-31. Similarly, configuration data received by the tile 704 may be propagated to DPEs 204-2, 204-12, 204-22, 204-32 and/or propagated to a subsequent tile, and configuration data received by the tile 706 may be propagated to DPEs 204-3, 204-13, 204-23, 204-33 and/or propagated to a subsequent tile.

The configuration data for DPEs 204-21, 204-31, 204-22, 204-32 can overwrite or disable execution (e.g., reset or stall) of executable program code that implemented the second kernel 1224. The configuration data for DPEs 204-1, 204-11, 204-2, 204-12 can overwrite or disable data written to configuration registers 334 of stream switches 326 to disable the data flow 1234 through those DPEs.

The configuration data for DPEs 204-22, 204-32, 204-23, 204-33 can write executable program code that is to implement the third kernel 1226 to, e.g., program memory 308, and can write data to configuration registers 334 to pass data among the DPEs 204-22, 204-32, 204-23, 204-33 according to the data flow 1236. The configuration data for DPEs 204-2, 204-12 can write data to configuration registers 334 to pass data received at stream switch 326 (e.g., pass data from a DPE above to a DPE or tile below) according to the data flow 1236. In some instances, data written to the configuration registers 334 of DPEs 204-2, 204-12 may not need to be modified to implement a data flow for a subsequently instantiated kernel. Further, the configuration data for DPEs 204-3 and 204-13 can write data to configuration registers 334 to pass data received at stream switch 326 (e.g., pass data from a DPE or tile below to a DPE above) according to the data flow 1236.

In block 1212 of the method 1200, the first and third kernels are operated in the DPE array. The PS 212 can transmit (via memory mapped switch(es) 332, 802) a memory mapped transaction to the DPEs configured to operate the third kernel 1226 to write to a configuration register to remove a stall or reset indication, which initiates operation of the third kernel 1226.

In this example, the operation of the first kernel 1222 is not modified and is not interrupted. Executable program code, application data, and data flow 1232 into and within the first kernel 1222 are not modified by the partial reconfiguration of FIGS. 12B and 12C. Although data written to configuration registers 334 for stream switches 326 of DPEs 204-1, 204-11, 204-2, 204-12 may be modified to disable data flow 1234 and enable data flow 1236, the modification of data written to these configuration registers 334 is by memory mapped transactions via the memory mapped switch 332, which can avoid interruption of data flows through stream switches 326 for the first kernel 1222. Other executable program code and configuration data is not modified or interrupted. Hence, the operation of the first kernel 1222 can continue while the second kernel 1224 is stopped and the third kernel 1226 is loaded.

Figure 13A:
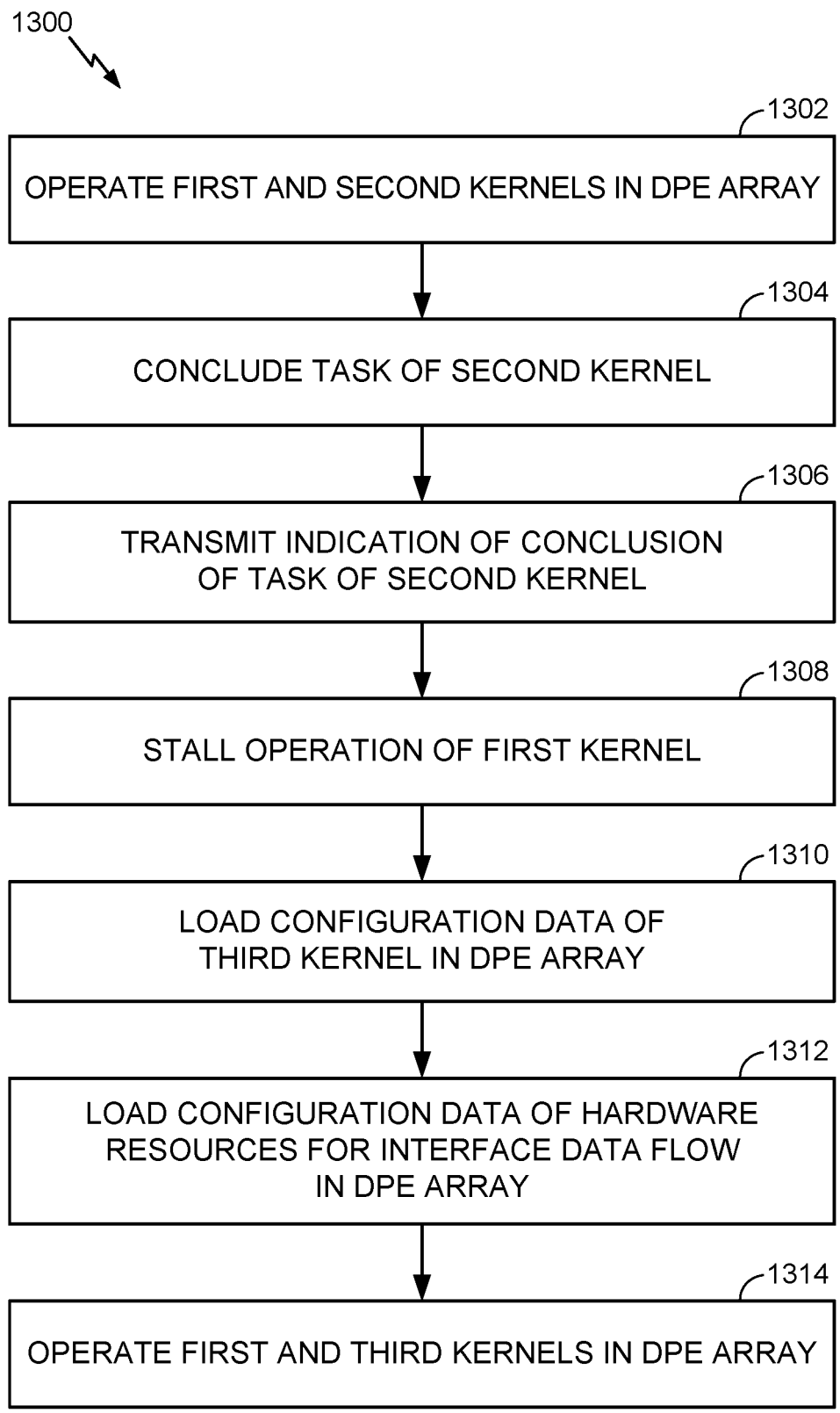
FIGS. 13A, 13B, and 13C illustrate an example of partial reconfiguration, where subsets of a DPE array to be reconfigured have no shared hardware resource but a data and/or control dependency with another subset of the DPE array.
Figure 13B:
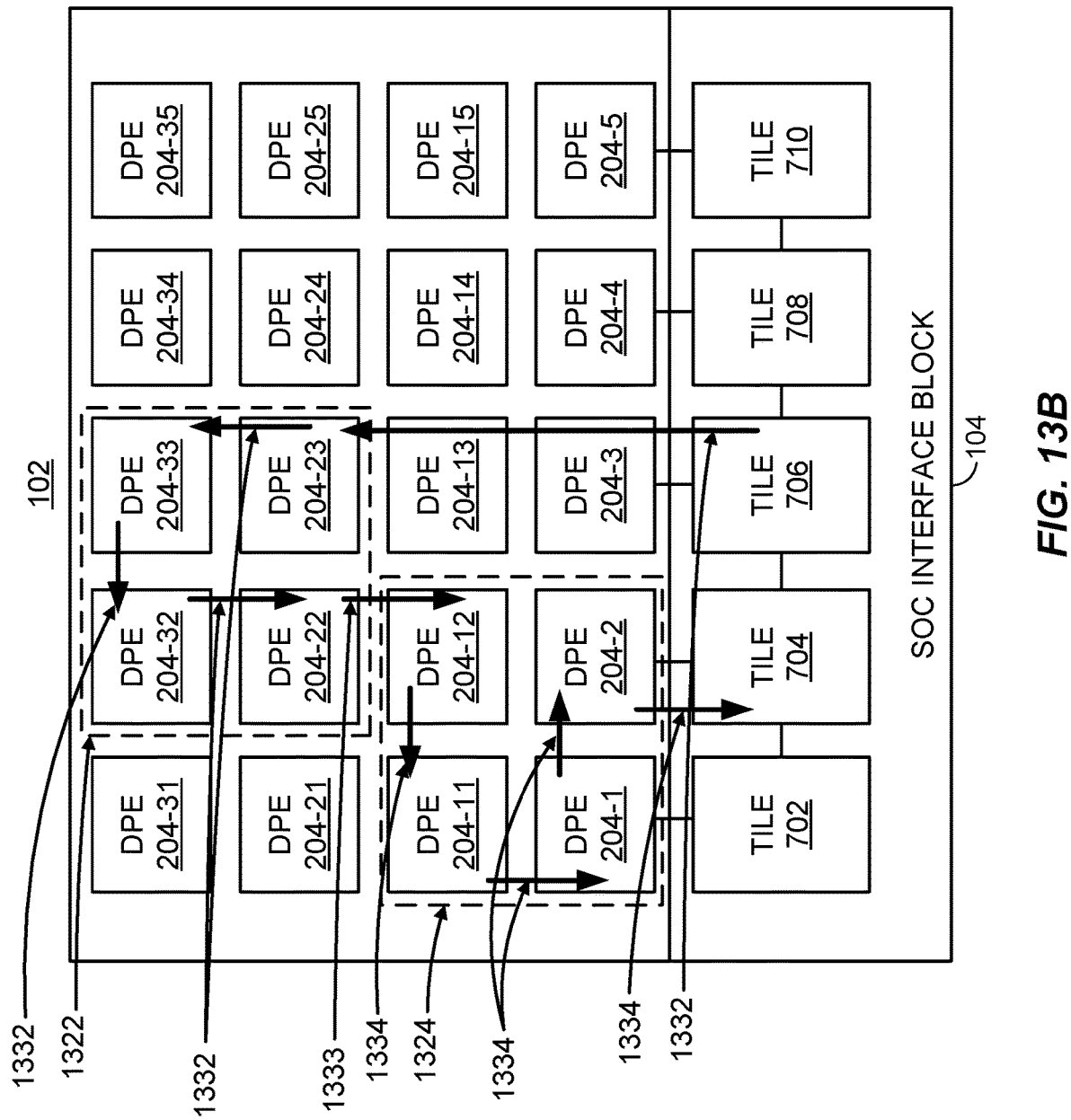
Figure 13C:
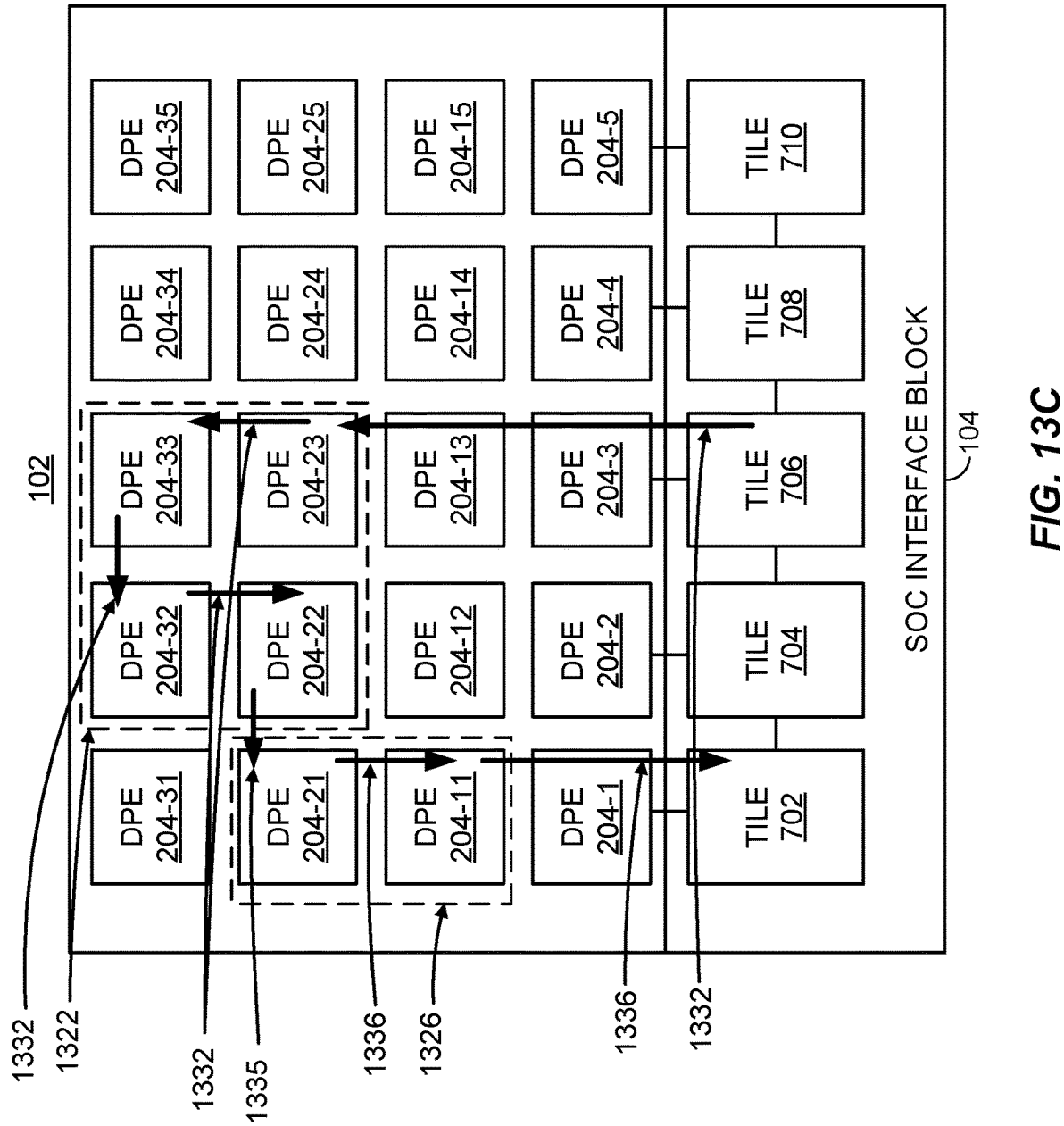

FIGS. 13A, 13B, and 13C illustrate an example where subsets of the DPE array to be reconfigured have no shared hardware resource but a data and/or control dependency with another subset of the DPE array. FIG. 13A is a flow chart of an example method 1300 for the reconfiguration. FIGS. 13B and 13C show a portion of the DPE array 102 of FIG. 7 for illustration purposes.

In block 1302 of the method 1300, first and second kernels are operating in the DPE array. For example, in FIG. 13B, a first kernel 1322 and a second kernel 1324 are configured and operating in respective subsets of the DPE array 102. DPEs 204-22, 204-32, 204-23, and 204-33 are configured to implement and operate the first kernel 1322. DPEs 204-1, 204-11, 204-2, and 204-12 are configured to implement and operate the second kernel 1324.

In this example, the first kernel 1322 has a data flow 1332, and the second kernel 1324 has a data flow 1334. For the first kernel 1322, data flow 1332 is from tile 706 through DPEs 204-3, 204-13 to DPE 204-23, from DPE 204-23 to DPE 204-33, from DPE 204-33 to DPE 204-32, and from DPE 204-32 to DPE 204-22. An interface data flow 1333 is between the first kernel 1322 and the second kernel 1324, e.g., from DPE 204-22 to DPE 204-12. For the second kernel 1324, data flow 1334 is from DPE 204-12 to DPE 204-11, from DPE 204-11 to DPE 204-1, from DPE 204-1 to DPE 204-2, and from DPE 204-2 to tile 704.

As shown, the first kernel 1322 and the second kernel 1324 have no shared hardware resource. For example, neither data flow 1332 of the first kernel 1322 nor data flow 1334 of the second kernel 1324 uses or implements hardware of DPEs 204 implementing another kernel. For example, the data flow 1332 of the first kernel 1322 is not through stream switches 326 of DPEs 204-1, 204-11, 204-2, and 204-12 that implement the second kernel 1324. Similarly, the data flow 1334 of the second kernel 1324 is not through stream switches 326 of DPEs 204-23, 204-33, 204-22, and 204-32 that implement the first kernel 1322. Interface data flow 1333 is not logically independent between the first kernel 1322 and second kernel 1324 (e.g., because data flows from the first kernel 1322 to the second kernel 1324 through the interface data flow 1333), and hence, is not considered a shared hardware resource. As indicated above, other shared hardware resources may exist within a DPE array 102, such as shared memory; however, such shared hardware resource does not exist between the first kernel 1322 and the second kernel 1324 in this example.

Further, as shown, a data and/or control dependency exists between the first kernel 1322 and the second kernel 1324. For example, operations of the second kernel 1324 receive and operate upon application data generated by and received from the first kernel 1322 (e.g., via interface data flow 1333), although operations of the first kernel 1322 do not receive and do not operate upon application data generated by and received from another kernel, such as the second kernel 1324.

In block 1304 of the method 1300, the second kernel concludes its task, and in block 1306, in response to the conclusion of the task, an indication of the conclusion of the task is transmitted. During operation of the device 100, and more specifically, during operation of the first kernel 1322 and the second kernel 1324, the second kernel 1324 concludes its task. The conclusion can be detected and/or transmitted as described above in the context of the method 1100 of FIG. 11A.

In block 1308, operation of the first kernel is stalled. The operation of the first kernel 1322 can be stalled by event logic in one or more DPEs of the subset of the DPE array 102 configured to implement the first kernel 1322. The event logic can receive the transmitted indication of the conclusion of the task by the second kernel 1324, and the event logic can responsively stall the execution of the DPEs of the subset of the DPE array 102 configured to implement the first kernel 1322. The execution can be stalled by writing to an appropriate configuration register that can halt the execution of the respective DPE. In other examples, the PS 212 or other subsystem may write to a configuration register of DPEs that implement the first kernel 1322 to stall the operation of the first kernel 1322. By stalling the execution of the first kernel 1322, data integrity may be maintained.

In block 1310 of the method 1300, configuration data of a third kernel is loaded into the DPE array, and in block 1312, configuration data of hardware resources for interface data flow is loaded into the DPE array. For example, a third kernel 1326, such as illustrated in FIG. 13C, is loaded in the DPE array 102. In FIG. 13C, the third kernel 1326 is to be configured and is to operate in a subset of the DPE array 102. DPEs 204-11, 204-21 are to be configured to implement and operate the third kernel 1326. The third kernel 1326 is to implement a data flow 1336 and with interface data flow 1335. The interface data flow 1335 is to be from DPE 204-22 to DPE 204-21, and the data flow 1336 is to be from DPE 204-21 to DPE 204-11, from DPE 204-11 to tile 702 (e.g., through stream switch 326 of DPE 204-1). As between the first kernel 1322 and the second kernel 1324 in FIG. 13B, no shared hardware resource but a data and/or control dependency exists between the first kernel 1322 and the third kernel 1326 (e.g., through sending application data from stream switch 326 of DPE 204-22 to stream switch 326 of DPE 204-21 via interface data flow 1335).

To partially reconfigure the DPE array 102 to load the third kernel 1326 while the first kernel 1322 is stalled, the DPEs 204 that implement the third kernel 1326 can be configured as described in FIG. 9 without configuring components of the DPEs 204 of the first kernel 1322 in a way that modifies the operation of the first kernel 1322. The PS 212 or other subsystem can transmit configuration data to the DPE array 102 in response to receiving the indication that the task of the second kernel 1324 has been concluded, e.g., after receiving the corresponding interrupt. For example, after configuration data is received at a tile of the SoC interface block 104, e.g., via the NoC, is converted to memory mapped data (block 904 of FIG. 9), and is propagated to appropriate tiles (e.g., tiles 702, 704, 706 in this example) (block 906), the respective tiles direct the portions of the configuration data to target DPEs via memory mapped transactions (block 908). At the target DPEs, the program memory 308, memory module 304, and/or configuration registers 324, 334, 336 are written via the memory mapped transactions to load the configuration data (block 910) to implement the third kernel 1326, interface data flow 1335, and data flow 1336, without modifying operation of the first kernel 1322.

For example, the tile 702 receives configuration data (in a memory mapped format), and propagates configuration data for DPEs 204-1, 204-11, 204-21 to those DPEs while propagating other configuration data to the tile 704. The configuration data is propagated from a memory mapped switch 802 of the tile 702 to the memory mapped switch 332 of DPE 204-1, which may propagate the configuration data to the memory mapped switch 332 of DPE 204-11. If the configuration data is addressed to a memory space within the receiving DPE, the configuration data may be stored within that receiving DPE without further propagating the configuration data. If the configuration data is not addressed to a memory space within the receiving DPE, the receiving DPE may continue propagating the configuration data to a subsequent DPE until the configuration data is received by an appropriate target DPE. In such a manner configuration for DPEs 204-1, 204-11, 204-21 may be propagated from the tile 702 to the appropriate target DPE 204-1, 204-11, 204-21. Similarly, configuration data received by the tile 704 may be propagated to DPEs 204-2, 204-12, 204-22 and/or propagated to a subsequent tile.

The configuration data for DPEs 204-1, 204-11, 204-2, 204-12 can overwrite or disable execution (e.g., reset or stall) of executable program code that implemented the second kernel 1324. The configuration data for DPE 204-22 can overwrite or disable data written to configuration registers 334 of stream switch 326 to disable the interface data flow 1333 from DPE 204-22 to DPE 204-12.

The configuration data for DPEs 204-11, 204-21 can further write executable program code that is to implement the third kernel 1326 to, e.g., program memory 308, and can write data to configuration registers 334 to pass data among the DPEs 204-11, 204-21 according to the data flow 1336. The configuration data for DPE 204-22 can write data to configuration registers 334 to pass data out stream switch 326 (e.g., pass data to a DPE 204-21) according to the interface data flow 1335. The configuration data for DPE 204-1 can write data to configuration registers 334 to pass data received at stream switch 326 (e.g., pass data from the DPE 204-11 above to the tile 702 below) according to the data flow 1336.

In block 1314 of the method 1300, the first and third kernels are operated in the DPE array. The PS 212 can transmit (via memory mapped switch(es) 332, 802) a memory mapped transaction to the DPEs configured to operate the third kernel 1326 and the first kernel 1322 to write to a respective configuration register to remove a stall or reset indication, which initiates operation of the third kernel 1326 and/or resumes operation of the first kernel 1322.

In this example, the operation of the first kernel 1322 is halted, but otherwise, the operation of the first kernel 1322 is not modified. Executable program code, application data, and data flow 1332 into and within the first kernel 1322 are not modified by the partial reconfiguration of FIGS. 13B and 13C. Although data written to configuration registers 334 for stream switch 326 of DPE 204-22 are modified to change the interface data flow 1333, the modification of data written to these configuration registers 334 is by memory mapped transactions via the memory mapped switch 332, which can avoid interruption of data flows through stream switches 326 into and/or internal to the first kernel 1322. Other executable program code and configuration data is not modified.

Although not illustrated, the first kernel 1322 in the example of FIGS. 13B and 13C may be implemented in another subsystem, such as in PL 210, PS 212, another hardwired circuit block 214, 216, 218, 220, and/or 222 (which may be an ASIC, for example), or the like. Further, in other examples, the reconfiguration may occur in another subsystem (e.g., PL 210, PS 212, etc.) while a kernel operating in DPE array 102 receives data, e.g., application data, from the kernel of the original configuration and the kernel of the reconfiguration in the other subsystem.

Figure 14A:
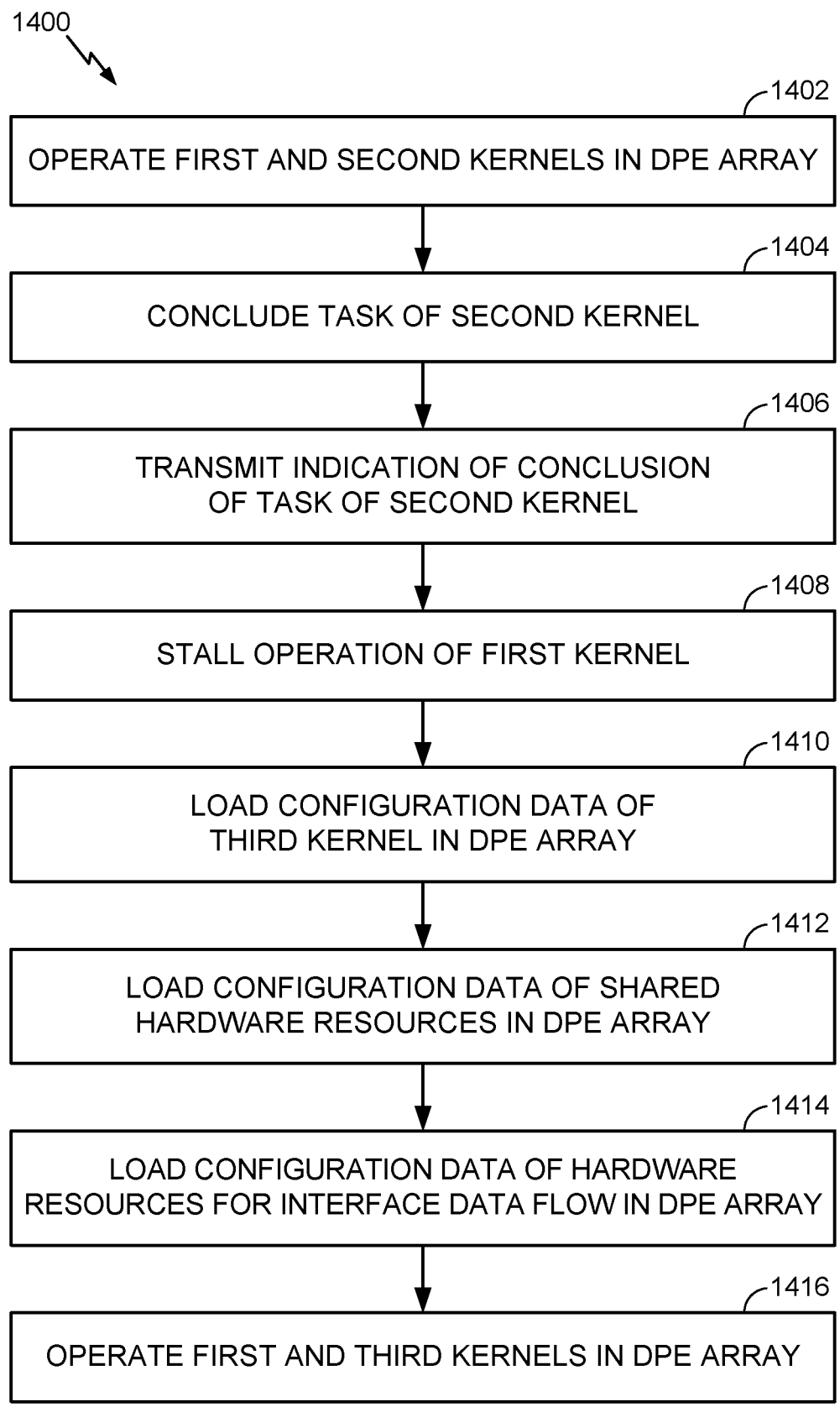
FIGS. 14A, 14B, and 14C illustrate an example of partial reconfiguration, where subsets of a DPE array to be reconfigured have a shared hardware resource and a data and/or control dependency with another subset of the DPE array.
Figure 14B:
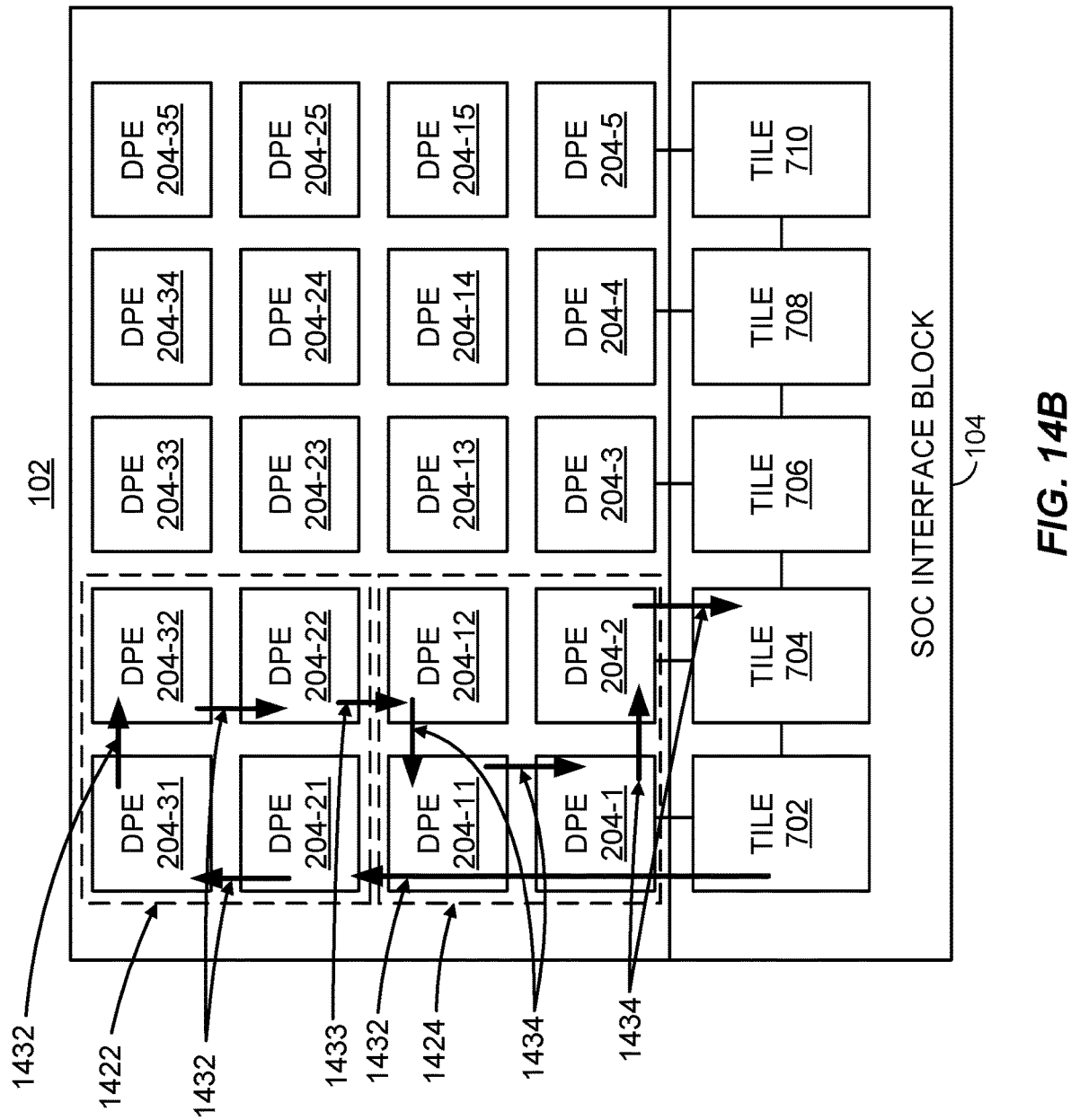
Figure 14C:
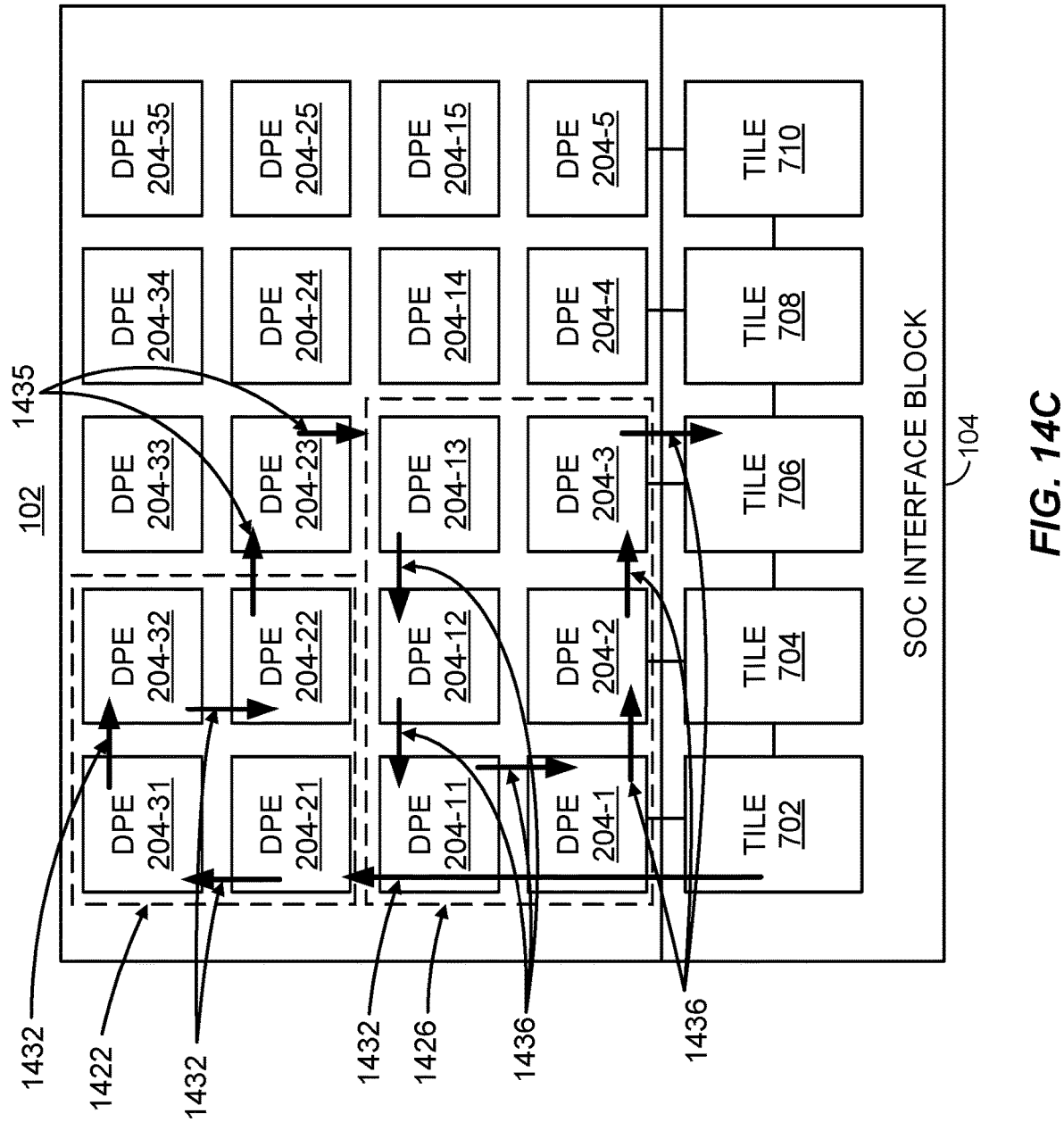

FIGS. 14A, 14B, and 14C illustrate an example where subsets of the DPE array to be reconfigured has a shared hardware resource and a data and/or control dependency with another subset of the DPE array. FIG. 14A is a flow chart of an example method 1400 for the reconfiguration. FIGS. 14B and 14C show a portion of the DPE array 102 of FIG. 7 for illustration purposes.

In block 1402 of the method 1400, first and second kernels are operating in the DPE array. For example, in FIG. 14B, a first kernel 1422 and a second kernel 1424 are configured and operating in respective subsets of the DPE array 102. DPEs 204-21, 204-31, 204-22, and 204-32 are configured to implement and operate the first kernel 1422. DPEs 204-1, 204-11, 204-2, and 204-12 are configured to implement and operate the second kernel 1424.

In this example, the first kernel 1422 has a data flow 1432, and the second kernel 1424 has a data flow 1434. For the first kernel 1422, data flow 1432 is from tile 702 through DPEs 204-1, 204-11 to DPE 204-21, from DPE 204-21 to DPE 204-31, from DPE 204-31 to DPE 204-32, and from DPE 204-32 to DPE 204-22. An interface data flow 1433 is between the first kernel 1422 and the second kernel 1424, e.g., from DPE 204-22 to DPE 204-12. For the second kernel 1424, data flow 1434 is from DPE 204-12 to DPE 204-11, from DPE 204-11 to DPE 204-1, from DPE 204-1 to DPE 204-2, from DPE 204-2 to tile 704.

As shown, the first kernel 1422 and the second kernel 1424 have a shared hardware resource. For example, data flow 1432 of the first kernel 1422 implements or uses hardware of DPEs 204-1, 204-11 that implement the second kernel 1424, although data flow 1434 of the second kernel 1424 does not implement or use hardware of DPEs 204 implementing another kernel. For example, the data flow 1432 of the first kernel 1422 is through stream switches 326 of DPEs 204-1 and 204-11 that implement the second kernel 1424. Further, the data flow 1432 of the first kernel 1422 is logically independent of the second kernel 1424, since for example, the second kernel 1424 does not operate upon and is not controlled by data of the data flow 1432. As indicated above, other shared hardware resources may exist within a DPE array 102, such as shared memory, which may be implemented in this example.

Further, as shown, a data and/or control dependency exists between the first kernel 1422 and the second kernel 1424. For example, operations of the second kernel 1424 receive and operate upon application data generated by and received from the first kernel 1422, although operations of the first kernel 1422 do not receive and do not operate upon application data generated by and received from another kernel, such as the second kernel 1424.

In block 1404 of the method 1400, the second kernel concludes its task, and in block 1406, in response to the conclusion of the task, an indication of the conclusion of the task is transmitted. During operation of the device 100, and more specifically, during operation of the first kernel 1422 and the second kernel 1424, the second kernel 1424 concludes its task. The conclusion can be detected and/or transmitted as described above in the context of the method 1100 of FIG. 11A.

In block 1408, operation of the first kernel is stalled. The operation of the first kernel 1422 can be stalled by event logic in one or more DPEs of the subset of the DPE array 102 configured to implement the first kernel 1422. The event logic can receive the transmitted indication of the conclusion of the task by the second kernel 1424, and the event logic can responsively stall the execution of the DPEs of the subset of the DPE array 102 configured to implement the first kernel 1422. The execution can be stalled by writing to an appropriate configuration register that can halt the execution of the respective DPE. In other examples, the PS 212 or other subsystem may write to a configuration register of DPEs that implement the first kernel 1422 to stall the operation of the first kernel 1422. By stalling the execution of the first kernel 1422, data integrity may be maintained.

In block 1410 of the method 1400, configuration data of a third kernel is loaded into the DPE array; in block 1412, configuration data of shared hardware resources is loaded into the DPE array; and in block 1414, configuration data of hardware resources for interface data flow is loaded into the DPE array. For example, a third kernel 1426, such as illustrated in FIG. 14C, is loaded in the DPE array 102. In FIG. 14C, the third kernel 1426 is to be configured and is to operate in a subset of the DPE array 102. DPEs 204-1, 204-11, 204-2, 204-12, 204-3, 204-13 are to be configured to implement and operate the third kernel 1426. The third kernel 1426 is to implement a data flow 1436 and with interface data flow 1435. The interface data flow 1435 is to be from DPE 204-22 to DPE 204-23 and from DPE 204-23 to DPE 204-13, and the data flow 1436 is to be from DPE 204-13 to DPE 204-12, from DPE 204-12 to DPE 204-11, from DPE 204-11 to DPE 204-1, from DPE 204-1 to DPE 204-2, from DPE 204-2 to DPE 204-3, and from DPE 204-3 to tile 706. As between the first kernel 1422 and the second kernel 1424 in FIG. 14B, a shared hardware resource and a data and/or control dependency exist between the first kernel 1422 and the third kernel 1426 (e.g., through sending application data from stream switch 326 of DPE 204-22, through stream switch 326 of DPE 204-23, and to stream switch 326 of DPE 204-21 via interface data flow 1435).

To partially reconfigure the DPE array 102 to load the third kernel 1426 while the first kernel 1422 is stalled, the DPEs 204 that implement the third kernel 1426 can be configured as described in FIG. 9 without configuring components of the DPEs 204 of the first kernel 1422 in a way that modifies the operation of the first kernel 1422. The PS 212 or other subsystem can transmit configuration data to the DPE array 102 in response to receiving the indication that the task of the second kernel 1424 has been concluded, e.g., after receiving the corresponding interrupt. For example, after configuration data is received at a tile of the SoC interface block 104, e.g., via the NoC, is converted to memory mapped data (block 904 of FIG. 9), and is propagated to appropriate tiles (e.g., tiles 702, 704, 706 in this example) (block 906), the respective tiles direct the portions of the configuration data to target DPEs via memory mapped transactions (block 908). At the target DPEs, the program memory 308, memory module 304, and/or configuration registers 324, 334, 336 are written via the memory mapped transactions to load the configuration data (block 910) to implement the third kernel 1426, interface data flow 1435, and data flow 1436, without modifying operation of the first kernel 1422.

For example, the tile 702 receives configuration data (in a memory mapped format), and propagates configuration data for DPEs 204-1, 204-11 to those DPEs while propagating other configuration data to the tile 704. The configuration data is propagated from a memory mapped switch 802 of the tile 702 to the memory mapped switch 332 of DPE 204-1, which may propagate the configuration data to the memory mapped switch 332 of DPE 204-11. If the configuration data is addressed to a memory space within the receiving DPE, the configuration data may be stored within that receiving DPE without further propagating the configuration data. If the configuration data is not addressed to a memory space within the receiving DPE, the receiving DPE may continue propagating the configuration data to a subsequent DPE until the configuration data is received by an appropriate target DPE. In such a manner configuration for DPEs 204-1, 204-11 may be propagated from the tile 702 to the appropriate target DPE 204-1, 204-11. Similarly, configuration data received by the tile 704 may be propagated to DPEs 204-2, 204-12 and/or propagated to a subsequent tile.

The configuration data for DPEs 204-1, 204-11, 204-2, 204-12 can overwrite or disable execution (e.g., reset or stall) of executable program code that implemented the second kernel 1424. The configuration data for DPE 204-22 can overwrite or disable data written to configuration registers 334 of stream switch 326 to disable the interface data flow 1433 from DPE 204-22 to DPE 204-12.

The configuration data for DPEs 204-1, 204-11, 204-2, 204-12, 204-3, 204-13 can further write executable program code that is to implement the third kernel 1426 to, e.g., program memory 308, and can write data to configuration registers 334 to pass data among the DPEs 204-1, 204-11, 204-2, 204-12, 204-3, 204-13 according to the data flow 1436. The configuration data for DPE 204-22, 204-23 can write data to configuration registers 334 to pass data out stream switch 326 (e.g., pass data from DPE 204-22 to DPE 204-23 and from DPE 204-23 to DPE 204-13) according to the interface data flow 1435. Further, the configuration data for DPEs 204-1, 204-11 can maintain and/or write data to configuration registers 334 to continue passing data received at stream switch 326 (e.g., pass data received at the respective DPE 204-1, 204-11 to the DPE above) according to the data flow 1432.

In block 1416 of the method 1400, the first and third kernels are operated in the DPE array. The PS 212 can transmit (via memory mapped switch(es) 332, 802) a memory mapped transaction to the DPEs configured to operate the third kernel 1426 and the first kernel 1422 to write to a respective configuration register to remove a stall or reset indication, which initiates operation of the third kernel 1426 and/or resumes operation of the first kernel 1422.

In this example, the operation of the first kernel 1422 is halted, but otherwise, the operation of the first kernel 1422 is not modified. Executable program code, application data, and data flow 1432 into and within the first kernel 1422 are not modified by the partial reconfiguration of FIGS. 14B and 14C. Although data written to configuration registers 334 for stream switch 326 of DPE 204-22 are modified to change the interface data flow 1433, the modification of data written to these configuration registers 334 is by memory mapped transactions via the memory mapped switch 332, which can avoid interruption of data flows through stream switches 326 into and/or internal to the first kernel 1422. Other executable program code and configuration data is not modified or interrupted.

For purposes of explanation, specific nomenclature is set forth to provide a thorough understanding of the various example concepts disclosed herein. The terminology used herein, however, is for the purpose of describing particular aspects of the example arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The flowchart and block diagrams in the Figures illustrate the architecture, functionality, and operation of possible implementations of systems, devices, and/or methods according to various aspects of the example arrangements. In some alternative implementations, the operations noted in the blocks may occur out of the order noted in the figures.

For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow.

The corresponding structures, materials, acts, and equivalents of all means or step plus function elements that may be found in the claims below are intended to include any structure, material, or act for performing the function in combination with other claimed elements as specifically claimed.

The description of the example arrangements provided herein is for purposes of illustration and is not intended to be exhaustive or limited to the form and examples disclosed. The terminology used herein was chosen to explain the principles of the example arrangements, the practical application or technical improvement over technologies found in the marketplace, and/or to enable others of ordinary skill in the art to understand the example arrangements disclosed herein. Modifications and variations may be apparent to those of ordinary skill in the art without departing from the scope and spirit of the described example arrangements. Accordingly, reference should be made to the following claims, rather than to the foregoing disclosure, as indicating the scope of such features and implementations.

What is claimed is:

1. A device comprising:
    a processor system; and
    an array of data processing engines (DPEs) communicatively coupled to the processor system, each of the DPEs comprising a DPE processor and a DPE interconnect, the DPE processor having an architecture configured to support an instruction set and being configured to execute executable program code according to the instruction set, the processor system being configured to transmit configuration data to the array of DPEs, each of the DPEs being independently configurable based on the configuration data received at the respective DPE via the DPE interconnect of the respective DPE, the array of DPEs enabling, without modifying operation of a first kernel of a first subset of the DPEs of the array of DPEs, reconfiguration of a second subset of the DPEs of the array of DPEs.

2. The device of claim 1, wherein the DPE interconnect of each of the DPEs includes:
    a stream switch operable to be configured to communicate application data with a neighboring array component; and
    a memory mapped switch configured to communicate the configuration data via memory mapped transactions with a neighboring array component.

3. The device of claim 1 further comprising:
    a network coupled to the processor system; and
    a system interface circuit coupled to the network and to the array of DPEs, the system interface circuit comprising tiles, each tile being coupled to a column of DPEs of the array of DPEs, the processor system being configured to transmit the configuration data to the array of DPEs via the network and the system interface circuit.

4. The device of claim 1, wherein each of the DPEs comprises:
    program memory configured to store executable program code that is according to the instruction set and is executable by the DPE processor of the respective DPE; and
    configuration registers configured to store interconnect data that configures the DPE interconnect of the respective DPE for routing communications via the DPE interconnect.

5. The device of claim 1, wherein a first kernel implemented by the first subset of the DPEs of the array of DPEs and a second kernel implemented by the second subset of the DPEs of the array of DPEs do not have a shared hardware resource, and no data and/or control dependency exists between the first kernel and the second kernel.

6. The device of claim 1, wherein the first kernel implemented by the first subset of the DPEs of the array of DPEs and a second kernel implemented by the second subset of the DPEs of the array of DPEs have a shared hardware resource, and no data and/or control dependency exists between the first kernel and the second kernel.

7. The device of claim 1, wherein the first kernel implemented by the first subset of the DPEs of the array of DPEs and a second kernel implemented by the second subset of the DPEs of the array of DPEs do not have a shared hardware resource, and a data and/or control dependency exists between the first kernel and the second kernel.

8. The device of claim 1, wherein the first kernel implemented by the first subset of the DPEs of the array of DPEs and a second kernel implemented by the second subset of the DPEs of the array of DPEs have a shared hardware resource, and a data and/or control dependency exists between the first kernel and the second kernel.

9. The device of claim 1, wherein after reconfiguring the second subset of the DPEs of the array of DPEs:
    a data flow to or from one of the first subset of the DPEs or the second subset of the DPEs is through the DPE interconnect of respective one or more of the DPEs of the other one of the first subset of the DPEs or the second subset of the DPEs.

10. The device of claim 1, wherein after reconfiguring the second subset of the DPEs of the array of DPEs:
    application and/or control data generated by one of the first subset of the DPEs or the second subset of the DPEs is received and processed by the other one of the first subset of the DPEs or the second subset of the DPEs.

11. A method for operating a device, the method comprising:
    configuring a first subset of an array of data processing engines (DPEs), using a processor system, to implement a first kernel, each of the DPEs comprising a DPE processor and a DPE interconnect, the DPE processor having an architecture configured to support an instruction set and being configured to execute executable program code according to the instruction set, each of the DPEs being independently configurable based on configuration data received at the respective DPE via the DPE interconnect of the respective DPE;
    operating the first kernel on the first subset of the array of DPEs; and
    without modifying operation of the first kernel on the first subset of the array of DPEs, configuring a second subset of the array of DPEs, using the processor system, to implement a second kernel.

12. The method of claim 11, wherein:
the processor system is coupled to the array of DPEs via a network and a system interface circuit;
the system interface circuit comprises tiles, and each tile is connected to a column of DPEs of the array of DPEs;
the DPE interconnect of each of the DPEs includes a memory mapped switch connected to respective neighboring DPEs and/or tile in the respective column, and includes a stream switch connected to respective neighboring DPEs and/or tile;
each of the DPEs comprises:
  program memory configured to store executable program code that is according to the instruction set and is executable by the DPE processor of the respective DPE; and
  configuration registers configured to store interconnect data that configures the stream switch of the respective DPE for routing communications via the stream switch; and
configuring the second subset comprises:
  transmitting configuration data from the processor system via the network to the system interface circuit;
  propagating the configuration data to one or more of the tiles corresponding to respective columns of the second subset;
  communicating the configuration data from the respective one or more of the tiles to target ones of the DPEs of the second subset via the memory mapped switches of the target ones of the DPEs and intervening DPEs between the target ones of the DPEs and the respective one or more of the tiles; and
  storing executable program code of the configuration data in the program memory of the target ones of the DPEs and interconnect data of the configuration data in the configuration registers of the target ones of the DPEs, the stored executable program code being according to the instruction set.

13. The method of claim 11 further comprising operating the second kernel, wherein while operating the second kernel:
data flow to or from the first kernel is not through the second subset of the array of DPEs;
data flow to or from the second kernel is not through the first subset of the array of DPEs;
data flow to and processed by the first kernel is not generated by the second kernel operating on the second subset of the array of DPEs; and
data flow to and processed by the second kernel is not generated by the first kernel operating on the first subset of the array of DPEs.

14. The method of claim 11 further comprising operating the second kernel, wherein while operating the second kernel:
data flow to or from one of the first kernel or the second kernel is through the second subset of the array of DPEs or the first subset of the array of DPEs, respectively.

15. The method of claim 11 further comprising operating the second kernel, wherein while operating the second kernel, data flow to and processed by one of the first kernel or the second kernel is generated by the other one of the first kernel or the second kernel.

16. A device comprising:
an array of data processing engines (DPEs), each of the DPEs comprising a DPE processor, program memory, a DPE interconnect, and configuration registers, wherein:
  the DPE processor has an architecture configured to support an instruction set and is configured to execute executable program code according to the instruction set;
  the program memory is configured to store executable program code that is according to the instruction set and is executable by the DPE processor of the respective DPE;
  the DPE interconnect includes a stream switch and a memory mapped switch;
  the memory mapped switch is configured to route a memory mapped transaction based on an address of a memory space; and
  the configuration registers are configured to store interconnect data that configures the stream switch of the respective DPE for routing communications via the stream switch of the respective DPE; and
a system interface circuit comprising tiles, each tile being connected to a respective adjacent DPE of the array of DPEs; and
a processor system coupled to the system interface circuit, the processor system being operable to configure a first subset of the DPEs independently of a second subset of the DPEs, wherein:
  the processor system is operable to transmit configuration data to the system interface circuit;
  the system interface circuit is operable to propagate the configuration data to one or more of the tiles that provide an interface for the first subset of the DPEs;
  the one or more of the tiles is operable to direct the configuration data to target ones of the DPEs of the first subset of the DPEs via the memory mapped switches of the target ones of the DPEs and intervening DPEs between the target ones of the DPEs and the respective one or more of the tiles;
  executable program code of the configuration data is written to the program memory of the target ones of the DPEs; and
  interconnect data of the configuration data is written to the configuration registers of the target ones of the DPEs.

17. The device of claim 16 further comprising a network, wherein the processor system is connected to the network, and the network is connected to the system interface circuit.

18. The device of claim 16, wherein after configuring the first subset of the DPEs:
no stream switch of the second subset of the DPEs is configured to pass application data through the respective stream switch towards or from the first subset of the DPEs; and
no stream switch of the first subset of the DPEs is configured to pass application data through the respective stream switch towards or from the second subset of the DPEs.

19. The device of claim 16, wherein after configuring the first subset of the DPEs:
at least one stream switch of the first subset of the DPEs is configured to pass application data through the respective stream switch towards or from the second subset of the DPEs; or
at least one stream switch of the second subset of the DPEs is configured to pass application data through the respective stream switch towards or from the first subset of the DPEs.

20. The device of claim 16, wherein after configuring the first subset of the DPEs:
   the first subset of the DPEs is configured to receive and process application data generated by the second subset of the DPEs; or
   the second subset of the DPEs is configured to receive and process application data generated by the first subset of the DPEs.

* * * * *